(12) United States Patent
Kinoshita

(10) Patent No.: US 9,942,460 B2
(45) Date of Patent: Apr. 10, 2018

(54) IMAGE PROCESSING DEVICE, IMAGE PROCESSING METHOD, AND PROGRAM

(71) Applicant: Sony Corporation, Tokyo (JP)

(72) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/655,626

(22) PCT Filed: Nov. 12, 2013

(86) PCT No.: PCT/JP2013/080605
§ 371 (c)(1),
(2) Date: Jun. 25, 2015

(87) PCT Pub. No.: WO2014/109124
PCT Pub. Date: Jul. 17, 2014

(65) Prior Publication Data
US 2015/0350524 A1    Dec. 3, 2015

(30) Foreign Application Priority Data

Jan. 9, 2013  (JP) ................ 2013-001799

(51) Int. Cl.
*G03B 13/00* (2006.01)
*H04N 5/232* (2006.01)
(Continued)

(52) U.S. Cl.
CPC ..... *H04N 5/23212* (2013.01); *G06K 9/00228* (2013.01); *H04N 5/2353* (2013.01);
(Continued)

(58) Field of Classification Search
None
See application file for complete search history.

(56) References Cited

U.S. PATENT DOCUMENTS 5,649,239 A * 7/1997 Tamekuni ........... G02B 7/28
396/104
6,081,668 A * 6/2000 Furuyama ........... G02B 7/28
396/104
(Continued)

FOREIGN PATENT DOCUMENTS

JP  2008-028758 A  2/2008
JP  2008-205650 A  9/2008
(Continued)

OTHER PUBLICATIONS

Extended European Search Report dated Jun. 8, 2016 for corresponding European Application No. 13870437.4.
(Continued)

*Primary Examiner* — Twyler Haskins
*Assistant Examiner* — Wesley Chiu
(74) *Attorney, Agent, or Firm* — Michael Best & Friedrich LLP

(57) ABSTRACT

There is provided an image processing device including a camerawork determination unit configured to determine camerawork at a time of imaging and set a determination start timing of a main subject in image data on the basis of the determination, and a main subject determination unit configured to determine the main subject among subjects contained in the image data from the image data from the determination start timing.

21 Claims, 33 Drawing Sheets

(51) Int. Cl.
*H04N 5/374* (2011.01)
*H04N 5/372* (2011.01)
*H04N 5/235* (2006.01)
*G06K 9/00* (2006.01)

(52) U.S. Cl.
CPC ..... *H04N 5/23219* (2013.01); *H04N 5/23296* (2013.01); *H04N 5/372* (2013.01); *H04N 5/374* (2013.01)

(56) References Cited

U.S. PATENT DOCUMENTS

| | | | | |
|---|---|---|---|---|
| 2008/0199056 | A1 | 8/2008 | Tokuse | |
| 2008/0205869 | A1* | 8/2008 | Nose | G03B 17/20 396/77 |
| 2008/0252744 | A1* | 10/2008 | Suto | G02B 7/365 348/222.1 |
| 2008/0278589 | A1* | 11/2008 | Thorn | H04N 5/23212 348/208.14 |
| 2009/0022486 | A1* | 1/2009 | Muramatsu | G02B 7/08 396/104 |
| 2009/0148146 | A1* | 6/2009 | Maeda | G02B 7/38 396/89 |
| 2010/0097515 | A1 | 4/2010 | Ishii | |
| 2010/0208126 | A1 | 8/2010 | Uenishi | |
| 2011/0038508 | A1* | 2/2011 | Teoh | G06F 1/3203 382/103 |
| 2011/0261225 | A1* | 10/2011 | Niinami | G06T 7/204 348/223.1 |
| 2011/0267499 | A1* | 11/2011 | Wan | H04N 5/232 348/231.99 |
| 2012/0105647 | A1* | 5/2012 | Yoshizumi | G03B 17/38 348/169 |
| 2012/0206619 | A1* | 8/2012 | Nitta | H04N 5/23219 348/222.1 |
| 2012/0219278 | A1* | 8/2012 | Suzuki | G02B 7/28 396/95 |
| 2012/0249813 | A1* | 10/2012 | Miyasako | H04N 5/232 348/208.4 |

FOREIGN PATENT DOCUMENTS

| | | |
|---|---|---|
| JP | 2010-191073 A | 9/2010 |
| JP | 2011-146826 A | 7/2011 |
| JP | 2011-146827 A | 7/2011 |
| JP | 2011-160379 A | 8/2011 |
| JP | 2011-166305 A | 8/2011 |

OTHER PUBLICATIONS

International Search Report; International Application No. PCT/JP2013/080605; International Filing Date: Nov. 12, 2013; Date of completion of the international search: dated Nov. 28, 2013.
Written Opinion of the International Searching Authority; International Application No. PCT/JP2013/080605; International Filing Date: Nov. 12, 2013; Date of Written Opinion: dated Dec. 10, 2013.
Chinese Office Action dated Sep. 5, 2017 for corresponding Chinese Application No. 201380069160.5.
Japanese Office Action dated Sep. 5, 2017 for corresponding Japanese Application No. 2014-556330.

* cited by examiner

FIG. 5
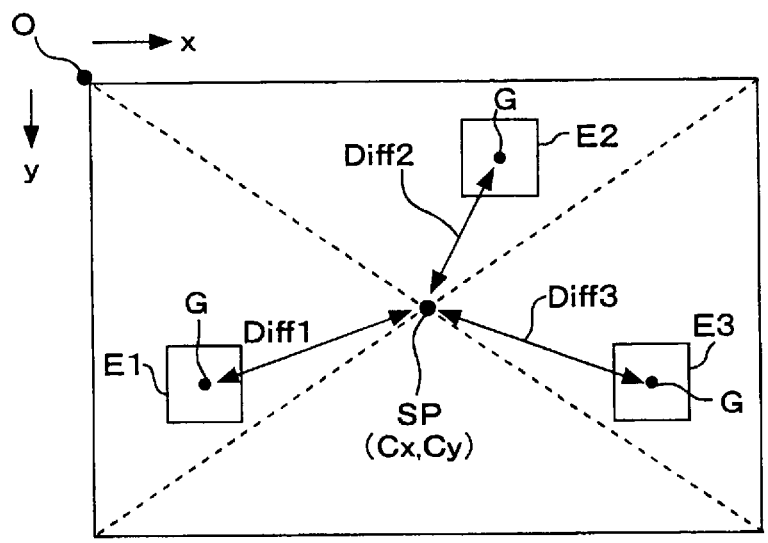
A
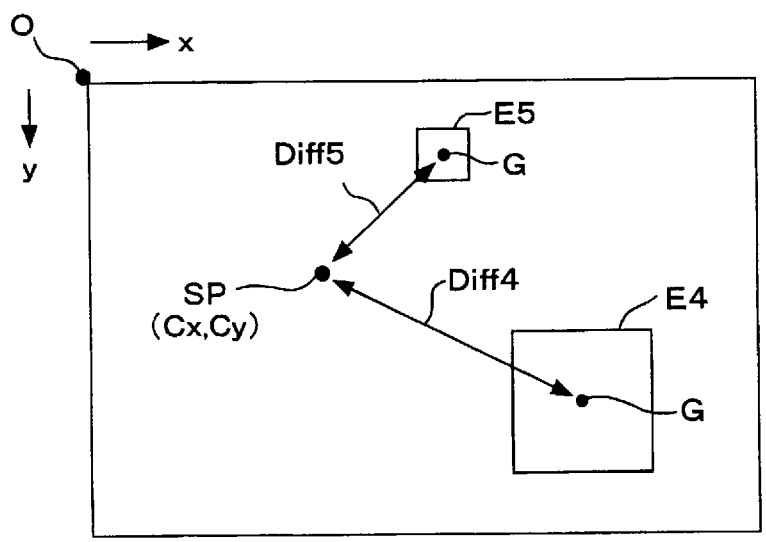
B

<CAMERAWORK DETERMINATION PROCESS (POST-PAN DETERMINATION)>

CAMERAWORK DETERMINATION PROCESS (POST-PAN DETERMINATION)

<CAMERAWORK DETERMINATION PROCESS (POST-ZOOM DETERMINATION)>

<CAMERAWORK DETERMINATION PROCESS (POST-PAN ZOOM OPERATION DETERMINATION)>

<CAMERAWORK DETERMINATION PROCESS (POST-PAN ZOOM OPERATION DETERMINATION)>

<CAMERAWORK DETERMINATION PROCESS (POST-MANUAL-FOCUS DETERMINATION)>

<MAIN SUBJECT DETERMINATION PROCESS>

IMAGE PROCESSING DEVICE, IMAGE PROCESSING METHOD, AND PROGRAM

TECHNICAL FIELD

The present disclosure relates to an image processing device, an image processing method, and a program for performing a process of determining a main subject in an image.

BACKGROUND ART

Recent digital still cameras and digital video cameras normally have a facial detection function, and have a function of optimally matching various parameters (focus, brightness and the like) of the camera according to facial position and area.

On the other hand, Patent Literature 1 discloses a technique in which a user designates and selects a "main subject" that is a target subject to be tracked in a captured image.

In addition, if the techniques disclosed in Patent Literatures 2, 3, and 4 described above are used, for example, subject tracking that encompasses a frame of the whole body of an arbitrary subject can be realized.

In addition, there are also functions of controlling an optical system and the like such as autofocus and automatic exposure such that a desired area in a captured image is detected and traced so as to optimize the area.

As described above, technologies of tracking an image designated by a user as a main subject, for example, an image area such as a face in a captured image, focusing on the face area, and the like are known.

CITATION LIST

Patent Literature

Patent Literature 1: JP 2011-166305A
Patent Literature 2: JP 2011-146826A
Patent Literature 3: JP 2011-146827A
Patent Literature 4: JP 2011-160379A

SUMMARY OF INVENTION

Technical Problem

However, in a captured image, a desired area that is subject to tracking or focusing, i.e., a "main subject," is decided by a photographer by directly selecting one candidate from "a plurality of candidate areas" obtained from various detectors using any method at present.

In a state of holding a camera, for example, a main subject is chosen through an action of selecting an arbitrary face from a plurality of faces projected on a through image displayed on a screen (a monitoring image of a subject displayed at times other than at a time of manipulating a shutter) on a touch panel. Alternatively, a subject present in a predetermined area is set to be a main subject at a time designated by a user (half-pressing of a shutter or the like).

However, when a user interface is considered in actual use examples, there are cases in which the action of "selecting a main subject by a photographer" itself is difficult.

For example, when a user wants to use a function of maintaining focus on a subject that is moving around, it is difficult for the user to select the subject using his or her finger holding a camera while targeting the subject.

For example, there are cases in which designation is difficult due to a speed of a reaction of a user to changes (movements) of a subject. For example, there is a case in which it is difficult to precisely designate a subject that is moving around on a screen of a through image.

In addition, in a situation in which a user holds a camera in his or her hand in the first place and turns the camera toward the subject to choose the subject, it is difficult for the user to perform the action of selecting a main subject using his or her finger on a screen. Particularly, in a situation in which a subject is tracked, for example, in which a user changes an imaging direction to cause a camera to move for panning or tilting, it is almost not possible to select a main subject.

In addition, there is a case in which it is difficult for a use to select a subject in resolution of a display screen in which a touch panel is arranged.

In addition, there is also a case in which it is difficult to properly designate a desired subject depending on a size of the subject on a display screen in which a touch panel is arranged and a size (thickness) of a user's finger.

In addition, there is also a case in which it is difficult for a user to properly designate a subject due to a time lag of a camera system, for example, a time lag between actual scenery and a through image of a captured image.

Furthermore, when such a designation manipulation is to be performed during imaging and recording of a dynamic image, there may be cases where image shaking caused by an action of selecting a main subject may be recorded as it is, or an user may be forced to take an action of re-selection at the time of frame-out or tracking loss (failure) caused by temporary shielding, or the like.

As described above, hand-held type cameras have a problem in that the action of selecting a main subject itself is difficult in many use examples that require the function, which is stressful for photographers.

Therefore, the present disclosure aims to realize a technology of determining a target subject desired by a user such as a photographer and setting the subject as a main subject without an action of the user intentionally selecting the subject.

Solution to Problem

According to the present disclosure, an image processing device includes a camerawork determination unit configured to determine camerawork at a time of imaging and set a determination start timing of a main subject in image data on the basis of the determination, and a main subject determination unit configured to determine the main subject among subjects contained in the image data from the image data from the determination start timing.

According to the present disclosure, an image processing method includes determining camerawork at a time of imaging and setting a determination start timing of a main subject in image data on the basis of the determination, and determining the main subject among subjects contained in the image data from the image data from the determination start timing.

A program according to an embodiment of the present disclosure is a program causing an arithmetic processing device to execute a process of realizing the image processing device or the image processing method.

According to an embodiment of the present disclosure, the main subject determination process of determining the main subject automatically in the image data is performed.

For example, when a user holds an imaging device to perform imaging, the user normally performs camerawork so that a subject considered to be a main subject, that is, a subject desired to be imaged as a still image or a subject desired to be continuously imaged as a moving image, is captured in a captured image. The camerawork may be operations or manipulations performed so that the user who is a photographer captures a subject in a captured image or operations or manipulations performed so that the user searches for an intended composition or a focus state. Specifically, the camerawork is, for example, panning, tilting, zooming, and manual focus. Panning (pan) refers to an operation or a manipulation of a photographer holding an imaging device and moving the imaging device in a substantially horizontal direction or installing the imaging device on a tripod, a platform, or the like and moving an imaging direction in the horizontal direction. Tilting (tilt) refers to an operation or a manipulation of a photographer holding an imaging device and moving the imaging device in a substantially vertical direction or installing the imaging device on a tripod, a platform, or the like and moving an imaging direction in the vertical direction. Zooming (zoom) refers to an operation or a manipulation of a photographer manipulating a zoom lever (a wide key or a tele key) or performing a manual manipulation to move a zoom lens and change an angle of view. Manual focus refers to an operation or a manipulation of a photographer moving a focus lens to change a focus position.

When the user performs such camerawork, the user can be considered to aim at a subject for a certain purpose and adjust an imaging direction, an angle of view, a focus position, or the like. That is, a subject considered to be a main subject can be estimated to be present in a captured image (for example, a through image).

Accordingly, in the image processing device, camerawork determination is performed and a determination start timing for the main subject in the image data is set based on the determination. Then, a main subject is determined among subjects contained in the image data from the image data of one frame or the plurality of frames from the determination start timing. Thus, determination of high accuracy can be performed as automatic main subject determination.

Advantageous Effects of Invention

According to the present disclosure, a main subject is automatically determined in a captured image, and thus it is not necessary for a user such as a photographer to perform an action of selecting the main subject. Accordingly, enhancement of product-added value including improvement of operability when imaging is performed using the imaging apparatus in which the image processing device of the present disclosure is mounted held in a hand, a reduction of stress on users, and further realization of various functions caused by automatic main subject determination can be realized. Further, main subject determination is performed automatically at an appropriate timing, and thus determination accuracy can be improved.

BRIEF DESCRIPTION OF DRAWINGS

FIG. 5 is an explanatory diagram of a distance between a candidate image frame and a determination reference point of the embodiment.

DESCRIPTION OF EMBODIMENTS

Hereinafter, embodiments will be described in the following order.

<1. Configuration of image processing device of embodiment>
<2. Configuration of imaging device of embodiment>
<3. Opportunity and objective of main subject determination, etc.>
<4. First process example (pan operation determination)>
<5. Second process example (post-pan determination)>
<6. Third process example (zoom operation determination)>
<7. Fourth process example (post-zoom determination)>
<8. Fifth process example (post-pan zoom operation determination)>
<9. Sixth process example (post-pan post-zoom determination)>
<10. Seventh process example (post-zoom pan operation determination)>
<11. Eighth process example (post-zoom post pan determination)>
<12. Ninth process example (focusing determination)>
<13. Application to program and computer device>
<14. Modification examples>

<1. Configuration of Image Processing Device of Embodiment>

Figure 1:
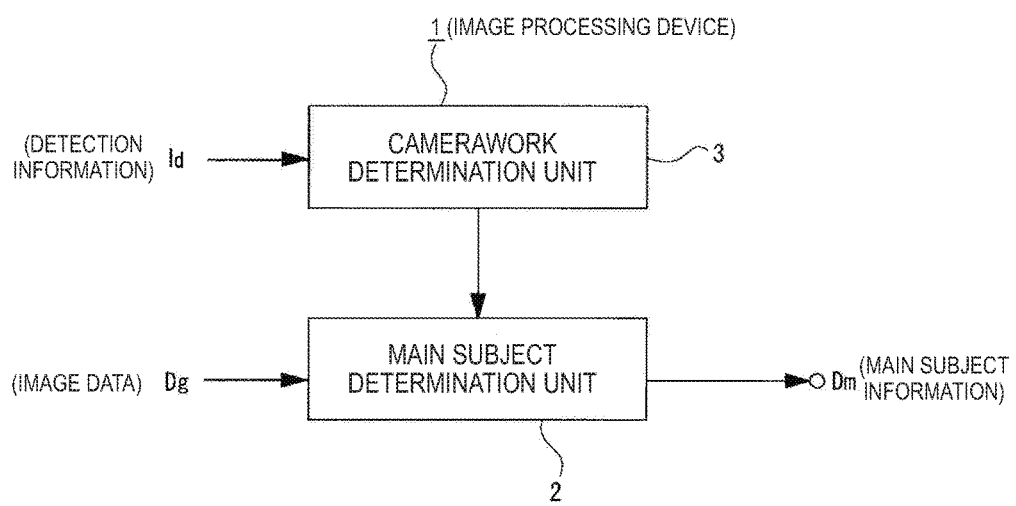
FIG. 1 is a block diagram of a configuration example of an image processing device of an embodiment of the present disclosure.

FIG. 1 illustrates a configuration example of an image processing device according to the embodiment.

An image processing device 1 includes a main subject determination unit 2 and a camerawork determination unit 3.

The camerawork determination unit 3 determines camerawork at the time of imaging and sets a determination start timing of a main subject in image data based on the determination. The camerawork determination unit 3 inputs detection information Id regarding camerawork at the time of imaging and determines the camerawork based on the detection information Id. Then, according to the determination result, the main subject determination unit 2 is notified of a timing of the start of main subject determination.

The camerawork may be operations or manipulations of the user or photographer capturing a subject in a captured image or operations or manipulations of searching for an intended composition or a focus state. Specifically, the camerawork is, for example, panning, tilting, zooming, and manual focus. Accordingly, the detection information Id is detection information regarding a manipulation such as zoom or manual focus performed by a photographer or detection information of a sensor detecting a motion of an imaging device, such as an angular velocity sensor (gyro sensor) or an acceleration sensor.

Further, "camerawork at the time of imaging" refers to camerawork at the present time or camerawork from when image data was captured previously. For example, the camerawork at the time of imaging refers to camerawork performed at the present time by a photographer when the image processing device 1 is a device included in an imaging apparatus 10 to be described below or is a device which is connected to an imaging apparatus and is supplied with captured image data in real time. Further, the camerawork at the time of imaging refers to camerawork from previous imaging when main subject determination is performed on previously captured image data.

The main subject determination unit 2 performs a main subject determination process on input image data Dg based on the determination start timing set by the camerawork determination unit 3. For example, the main subject determination unit 2 observes a position state of a subject in image data of a plurality of frames from the determination start timing of a main subject and determines the main subject among subjects conforming to a specific position condition. For example, the main subject determination unit 2 observes a focus state of a subject in image data of at least one frame from the determination start timing and determines a main subject among subjects conforming to a specific focus condition. The main subject determination unit 2 sets one subject or a plurality of subjects as the main subject through such processes.

Then, the main subject determination unit 2 outputs main subject information Dm as the determination result.

The image processing device 1 including the main subject determination unit 2 and the camerawork determination unit 3 described above can be realized by a central processing unit (CPU) or a digital signal processor (DSP) which is an arithmetic processing device.

Realizing the function of the main subject determination unit 2 by a CPU or the like and the function of the camerawork determination unit 3 by an image processing DSP or the like connected to the CPU or as a cooperation process can also be considered.

Figure 2:
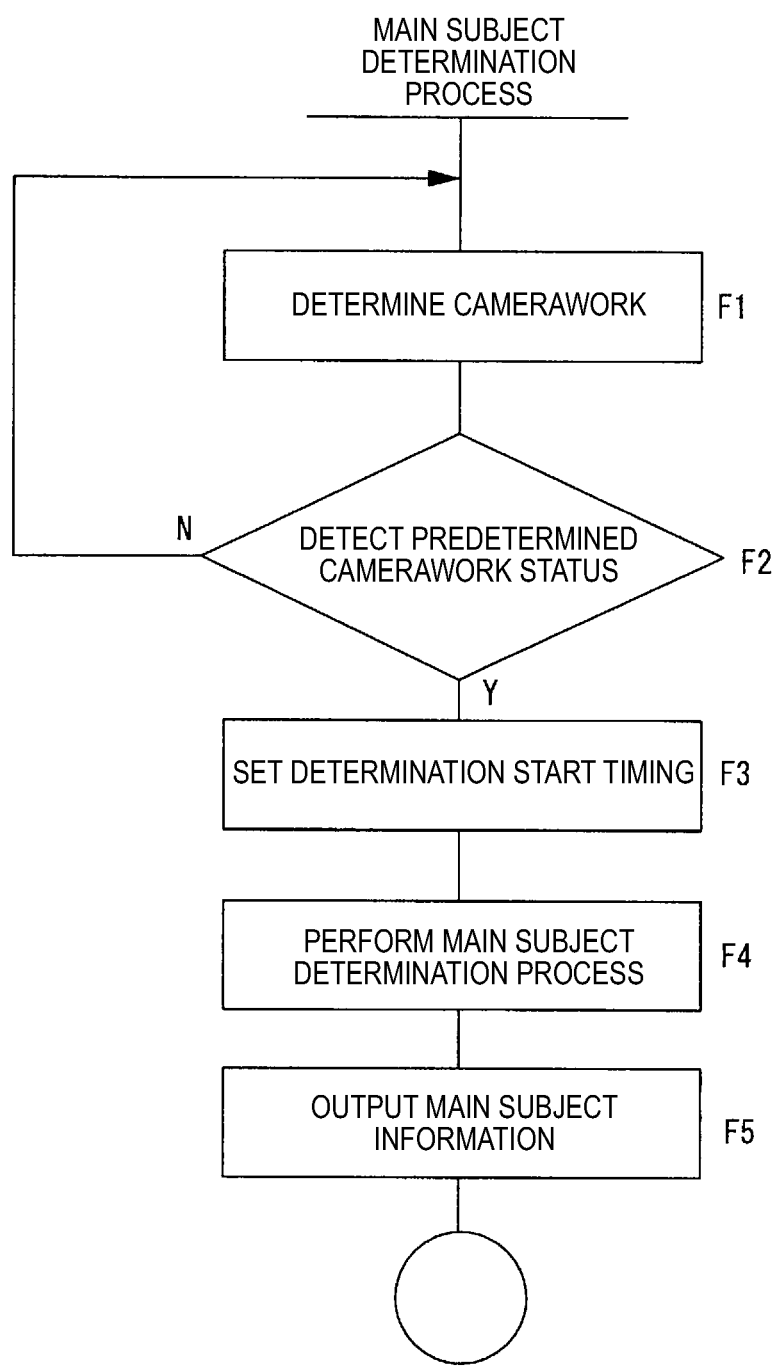
FIG. 2 is a flowchart of a main subject determination process of the image processing device of the embodiment.

The flow of a process for the main subject determination performed by the image processing device 1 is illustrated in FIG. 2.

In Step F1, the camerawork determination unit 3 determines camerawork performed by a photographer. Then, when a predetermined camerawork situation is detected in Step F2, the camerawork determination unit 3 sets the determination start timing in Step F3. For example, a determination execution flag is set to be turned on.

Accordingly, the main subject determination unit 2 performs the main subject determination process in Step F4 and determines that a subject conforming to a predetermined condition is a main subject.

In Step F5, the main subject determination unit 2 outputs the main subject information Dm which is a main subject determination result to transmit and receive the main subject information Dm to and from an application program or the like.

The application program or the like performs a process according to the fact that a main subject image is specified. For example, focus control, a tracking process, or an image effect process is performed.

The processes of Steps F1 to F3 performed by the camerawork determination unit 3 are considered to be diverse. Specific examples are described below as process examples of the imaging apparatus 10, in which the following situations are determined and the determination start timing is set:

1. Pan operation determination: it is determined that a pan operation starts, and then the determination start timing is set so that the main subject determination process is performed during the pan operation;

2. Post-pan determination: it is determined that a pan operation is performed and ends, and then the determination start timing is set so that the main subject determination process is performed after the end of the pan operation;

3. Zoom operation determination: it is determined that a zoom operation starts, and then the determination start timing is set so that the main subject determination process is performed during the zoom operation;

4. Post-zoom determination: it is determined that a zoom operation is performed and ends, and then the determination start timing is set so that the main subject determination process is performed after the end of the zoom operation;

5. Post-pan zoom operation determination: it is determined that a pan operation is performed and ends and a zoom operation subsequently starts, and then the determination start timing is set so that the main subject determination process is performed during the zoom;

6. Post-pan post-zoom determination: it is determined that a pan operation is performed and ends and a zoom operation is subsequently performed and ends, and then the determination start timing is set so that the main subject determination process is performed after the end of the zoom;

7. Post-zoom pan operation determination: it is determined that a zoom operation is performed and ends and a pan operation starts, and then the determination start timing is set so that the main subject determination process is performed during the pan;

8. Post-zoom post-pan determination: it is determined that a zoom operation is performed and ends and a pan operation is subsequently performed and ends, and then the determination start timing is set so that the main subject determination process is performed after the pan; and 9. Post-manual-focus determination: it is determined that a manual focus operation is performed and ends, and then the determination start timing is set so that the main subject determination process is performed after the end of the manual focus operation.

The details of the above-described processes will be described as first to ninth process examples of the imaging apparatus 10.

The image processing device 1 in FIG. 1 can estimate a subject intended as a target by a photographer through camerawork and automatically perform the main subject determination by performing the camerawork determination and the main subject determination as in the example of FIG. 2 described above. Accordingly, the main subject determination can be performed without dependency on a manual manipulation of a user, and thus operability of the user is considerably improved by mounting the image processing device 1 in FIG. 1 on various electronic apparatuses performing an operation according to main subject setting.

<2. Configuration of an Imaging Device>

Hereinafter, the main subject determination operation will be described in detail exemplifying the imaging apparatus 10 including the above-described image processing device.

Figure 3:
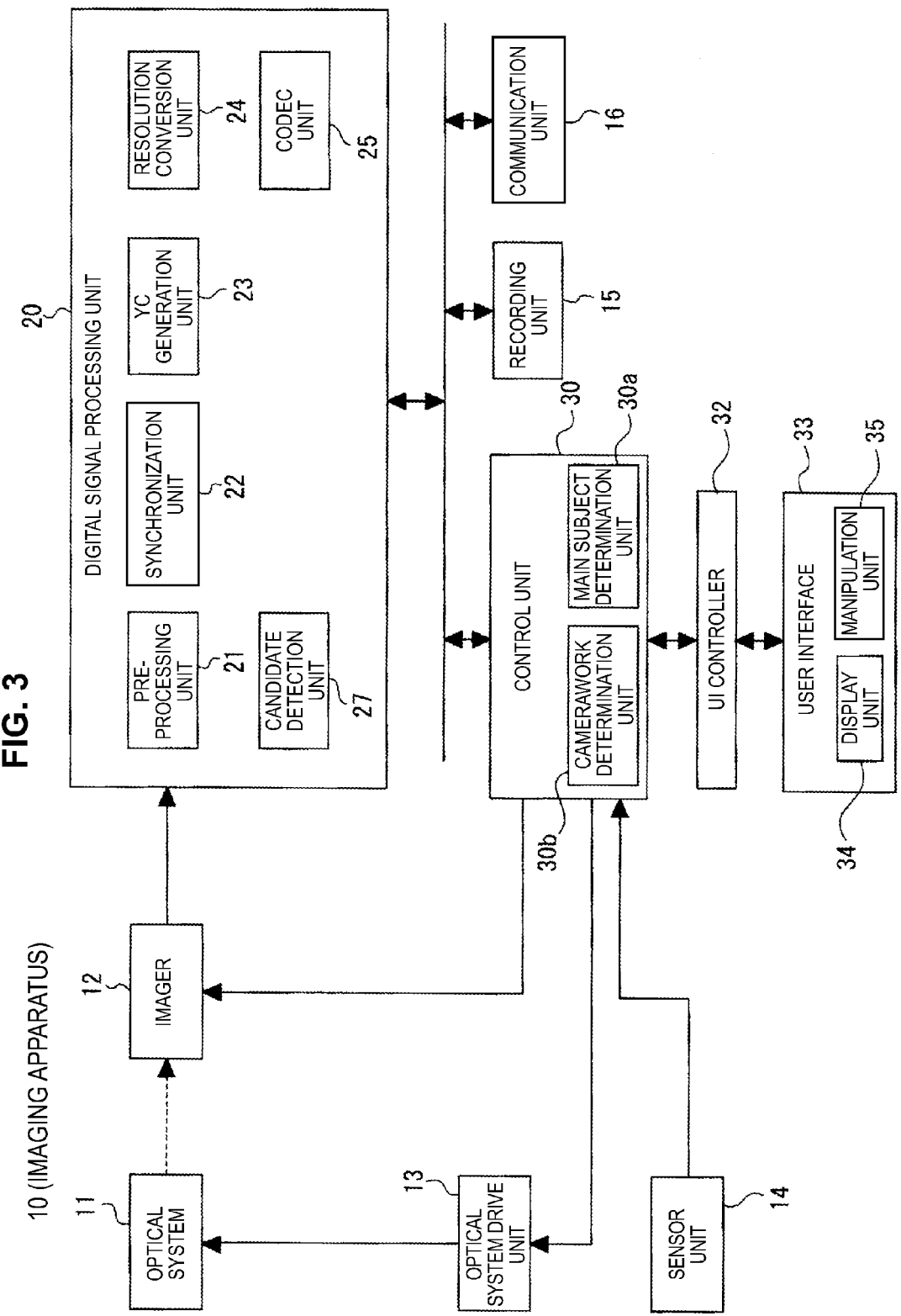
FIG. 3 is a block diagram of the configuration of an imaging device of the embodiment.

A configuration example of the imaging apparatus 10 according to the embodiment is illustrated in FIG. 3. This configuration example is appropriate for first to eighth process examples to be described below. A configuration example of the imaging apparatus 10 in the case of the ninth process example will be described below.

The imaging apparatus 10 is considered to be a so-called digital still camera or a digital video camera and is an apparatus that performs capturing and recording of a still image or a moving image and includes the imaging processing device described in the claims.

The imaging apparatus 10 shown in FIG. 3 has an optical system 11, an imager 12, an optical system drive unit 13, a sensor unit 14, a recording unit 15, a communication unit 16, a digital signal processing unit 20, a control unit 30, a user interface controller (hereinafter, "UI controller") 32, and a user interface 33.

The optical system 11 has lenses such as a cover lens, a zoom lens, and a focus lens and a throttle mechanism. By this optical system 11, light from a subject is collected in the imager 12.

The imager 12, for example, has a CCD (Charge Coupled Device) type or CMOS (Complementary Metal OxideSemiconductor) type image sensor.

The imager 12, for example, performs a CDS (Correlated Double Sampling) process, an AGC (Automatic Gain Control) process and the like for an electrical signal obtained through photoelectric conversion in the image sensor, and further performs an A-D (Analog-Digital) conversion process. Then, the imager 12 outputs an imaging signal as digital data to the digital signal processing unit 20 of a rear stage.

The optical system drive unit 13 drives the focus lens in the optical system 11 under the control of the control unit 30 to perform a focus operation. Thus, for example, an autofocus operation is performed.

For the focus lens, lens movement is also possible through manual focus according to a user's manipulation. The user can arbitrarily set a focus position by manipulating a focus lens transport mechanism formed in a lens barrel.

The optical system drive unit 13 drives the throttle mechanism of the optical system 11 under the control of the control unit 30 to perform exposure adjustment.

The optical system drive unit 13 drives the zoom lens of the optical system 11 under the control of the control unit 30 to perform a zoom operation. The user can give an instruction for a zoom operation by manipulating a zoom lever of the manipulation unit 35 to be described below. Thus, the user can obtain any angle-of-view state.

The digital signal processing unit 20, for example, is configured as an image processor by a DSP and the like. The digital signal processing unit 20 performs various types of signal processes for a digital signal (captured image signal) from the imager 12.

For example, the digital signal processing unit 20 includes a pre-processing unit 21, a synchronization unit 22, a YC generation unit 23, a resolution conversion unit 24, a codec unit 25, and a candidate detection unit 27.

The pre-processing unit 21 performs a clamping process of clamping a black level of R, G, and B to a predetermined level, or a correction process among color channels of R, G, and B with respect to the captured image signal from the imager 12.

The synchronization unit 22 performs a demosaicing process such that image data for each pixel has color components of all of R, G, and B.

The YC generation unit 23 generates (separates) a luminance (Y) signal and a color (C) signal from the image data of R, G, and B.

The resolution conversion unit 24 executes a resolution conversion process on the image data on which various types of signal processes have been performed.

The codec unit 25, for example, performs a coding process for recording or communication with respect to the image data for which the resolution conversion has been performed.

The candidate detection unit 27 performs an image analysis process in units of frames (or per intermittent frame) for a captured image signal (luminance signal and color signal) obtained by, for example, the YC generation unit 23, and then extracts a candidate image. In other words, face image detection, human body detection, and the like are performed for image data continuously input on a time axis, and then images serving as candidates for a main subject are extracted.

Note that face detection, human body detection, and the like can be performed using techniques of pattern matching and the like in image analysis performed with respect to captured image data, but if only a dictionary used in pattern matching is replaced, other detectors can also be realized in principle. For example, extraction of candidate images of a main subject for dog detection (of a certain breed), cat detection, and the like is possible.

In addition, for example, detecting a moving body and setting the moving body to be a candidate image using a technique of moving body detection based on a frame difference can also be considered, and a technique of extracting an area of interest that is called saliency (Saliency) may be used. Various techniques of extracting and selecting candidate images are considered.

The candidate detection unit 27, for example, a face image is detected, and an area in which the face image is present is extracted as a candidate image frame.

With regard to the extracted candidate image, position information of the candidate image frame (x and y coordinate values on a screen, information of a subject distance, and the like) or size information (for example, the width, height, and number of pixels of the candidate image frame, and the like) are transferred to the control unit 30 as candidate image information. Note that, here, since the candidate image information is information indicating a frame of an image area serving as a candidate image, the term of candidate image information is also referred to as "candidate image frame information."

In addition, the candidate detection unit 27 may perform a smoothing process, an outlier (outlier) removal process, or the like for the image to generate candidate image frame information.

A functional configuration in which the candidate detection unit 27 is implemented in the digital signal processing unit 20 is set in the example of FIG. 3, but this is an example, and the control unit 30 may execute the process of the candidate detection unit 27.

The control unit 30 is configured by a micro-computer (arithmetic processing device) that has a CPU, a ROM (Read Only Memory), a RAM (Random Access Memory), a flash memory, and the like.

By executing a program stored in the ROM, the flash memory, and the like, the CPU comprehensively controls the entire imaging apparatus 10.

The RAM serving as a work area when the CPU performs various kinds of data processes is used for temporarily storing data, programs, and the like.

The ROM and the flash memory (non-volatile memory) are used for storing an OS (Operating System) necessary for control of each unit by the CPU, content files such as image files, application programs for various operations, firmware, and the like. For example, programs for executing the main subject determination process that will be described later in the present example, and further application programs that use main subject determination results, and the like are stored therein.

The control unit 30 described above controls operations of necessary units relating to instruction of various signal processes in the digital signal processing unit 20, imaging operations and recording operations according to a user manipulation, a reproducing operation of recorded image files, camera operations such as zooming, focusing, and exposure adjustment, user interface operations, and the like.

In the case of the present embodiment, the control unit 30 has the functions of the main subject determination unit 30a and the camerawork determination unit 30b and performs a camerawork determination process and a main subject determination process to be described below.

In the case of the configuration in FIG. 3, the camerawork determination unit 30b performs any one of the pan operation determination, the post-pan determination, the zoom operation determination, the post-zoom determination, the post-pan zoom operation determination, the post-pan post-zoom determination, the post-zoom pan operation determination, and the post-zoom post-pan determination described above. Then, the start timing of the main subject determination process is set. Specifically, a determination execution flag (a determination execution flag FDon to be described below) is turned on.

The main subject determination unit 30a performs a process of determining a main subject in a candidate image according to the setting of the start timing which is based on the determination result of the camerawork determination unit 30b.

The user interface 33 executes display output and audio output to a user, and receives input of a user manipulation. For this reason, the user interface has a display device, a manipulation device, a speaker device, a microphone device, and the like. Herein, a display unit 34 and a manipulation unit 35 are shown.

The display unit 34 is a display unit that performs various types of display for a user (a photographer and the like), and for example, is formed using a display device, such as an LCD (Liquid Crystal Display) or an organic EL (Electro-Luminescence) display, which is formed on a housing of the imaging apparatus 10. In addition, the display unit may be formed using the LCD or the organic EL display in a so-called view finder form.

This display unit 34 includes the display device and a display driver that allows the display device to perform display. The display driver allows various types of display to be performed on the display device based on the instruction of the control unit 30. For example, the display driver reproduces and displays a still image or a dynamic image captured and recorded in a recording medium, or displays a through image (subject monitoring image) as a dynamic image based on captured image data of each frame, which is captured during release (a shutter manipulation) standby, on a screen of the display device. Furthermore, the display driver allows various manipulation menus, icons, messages and the like, that is, a GUI (Graphical User Interface), to be displayed on the screen. In the case of the present embodiment, for example, display that helps the user to ascertain a determination result obtained from main subject determination on the through image or reproduced image is also performed.

The manipulation unit 35 has an input function of receiving a user manipulation, and sends a signal corresponding to the input manipulation to the control unit 30.

The manipulation unit 35, for example, is realized by various manipulators provided on the housing of the imaging apparatus 10, a touch panel formed on the display unit 34, and the like.

As the manipulator on the housing, a reproduction menu start button, a decision button, an arrow key, a cancellation button, a zoom lever, a slide key, a shutter button (a release button) and the like are provided.

Furthermore, by a touch panel manipulation using the icons and menus displayed on the touch panel and the display unit 34, various kinds of manipulation may be possible.

An operation of the display unit 34 of the user interface 33 and the like is controlled by the UI controller 32 according to instructions of the control unit 30. In addition, information of manipulations by the manipulation unit 35 is transmitted to the control unit 30 by the UI controller 32.

In the case of the present embodiment, for example, a manipulation of a zoom lever (a wide key or a tele key) is used for the camerawork determination. The control unit 30 detects a manipulation of the zoom lever via the UI controller 32 and controls the optical system drive unit 13 according to information regarding the manipulation to perform the zoom lens drive.

The recording unit 15 includes, for example, a non-volatile memory, and serves as a storage area for storing image files (content files) such as still image data or dynamic image data, attribute information of the image files, thumbnail images and the like.

The image files are stored in the form of, for example, a JPEG (Joint Photographic Experts Group), a TIFF (Tagged Image File Format), a GIF (Graphics Interchange Format) and the like.

The actual form of the recording unit 15 can be variously considered. For example, the recording unit 15 may be a flash memory that is embedded in the imaging apparatus 10, or may have a form based on a memory card (for example, a portable flash memory) attachable to and detachable from the imaging apparatus 10 and a card recording and reproduction unit that performs recording and reproduction access to the memory card. Furthermore, the recording unit may be realized in the form of an HDD (Hard Disk Drive) and the like that is embedded in the imaging apparatus 10.

Furthermore, in the present example, a program for performing the camerawork determination process and the main subject determination process that will be described later may be stored in the recording unit 15.

The communication unit 16 performs data communication or network communication with an external device in a wired or wireless manner.

For example, the communication unit performs communication of the captured image data (still image files or dynamic image files) with an external display apparatus, a recording apparatus, a reproduction apparatus and the like.

Furthermore, as a network communication unit, the communication unit may perform communication through various networks, for example, the Internet, a home network, or a LAN (Local Area Network), or perform various types of data transmission and reception with a server, a terminal and the like on the network.

The sensor unit 14 comprehensively indicates various sensors. Any of the various sensors of the sensor unit 14 delivers each of the detected information to the control unit 30. The control unit 30 can perform various kinds of control using the information detected by the sensor unit 14.

For example, a gyro sensor (angular velocity sensor) or an acceleration sensor detecting all of the motions of the imaging apparatus 10, such as camera shaking or a posture or a movement (a pan movement, a tilt movement, or the like) of the imaging apparatus 10 is provided as the sensor unit 14. For example, the control unit 30 can detect panning or tilting of the imaging apparatus 10 based on a signal detected by the gyro sensor.

A zoom lens position sensor detecting the position of a zoom lens and a focus lens position sensor detecting the position of a focus lens in the optical system 11 is provided as the sensor unit 14. Alternatively, a sensor detecting a manual manipulation (manipulation of a lens barrel ring) of a focus lens is provided in some cases. The control unit 30 can detect a manual focus manipulation of the user based on information detected by the focus lens position sensor or information of the sensor detecting the manual manipulation of the focus lens.

A sensor detecting an opening amount of a mechanical iris (throttle mechanism) is provided as the sensor unit 14 in some cases.

An illuminance sensor detecting outside illuminance through exposure adjustment or the like or a ranging sensor measuring a subject distance may be provided as the sensor unit 14.

In the imaging apparatus 10, the configuration portion of the image processing device 1 described in FIG. 1 is as follows.

A configuration corresponding to the main subject determination unit 2 of the image processing device 1 in FIG. 1 is mounted as the main subject determination unit 30*a* on the control unit 30 of the imaging apparatus 10 by software. A configuration corresponding to the camerawork determination unit 3 is mounted as the camerawork determination unit 30*b* on the control unit 30 by software.

The control unit 30 controls execution of an operation which is an image processing method described in the claims by performing a process based on a program described in the claims.

<3. Opportunity and Objective of Main Subject Determination, Etc.>

In the present embodiment, main subject determination is performed as described in the first to the ninth process examples to be described later, and an opportunity, objective, etc. for performing main subject determination in the imaging apparatus 10 will be described.

First, an example of using a main subject determination result will be described.

Main subject determination is executed when, for example, a user (photographer) aims at a shutter timing (release timing), but the control unit 30 can perform the following process after a main subject is automatically determined.

Tracking Process

A main subject set in each captured frame is tracked. For example, a main subject is specified on a through image display for the user, and provided for adjusting an angle of view performed by the user (for example, for decision of a subject in a state in which a camera is held in a hand).

Note that, as presentation of a main subject, highlight display of the frame of the main subject on the through image display by the display unit 34 is considered. In addition, the highlight display or the like may be performed for a given period immediately after the determination, or may be performed as long as the main subject is present within the through image.

Focusing

Auto focus is controlled for a main subject. In addition, in accordance with the tracking process, focus is adjusted tracking the main subject even when the main subject moves around.

Exposure Adjustment

Automatic exposure adjustment is performed based on brightness (luminance) of a main subject.

Directivity Adjustment

When sound collection is performed using a microphone together with capturing (for example, dynamic image capturing), directivity adjustment is performed according to a direction of a main subject within a field of view.

Zoom Control

Auto zoom is controlled with respect to a main subject. For example, the zoom lens is automatically driven so that the main subject is projected in a captured image in a predetermined size or greater at all times. Together with the tracking process, an angle of view may be set to be adjusted using zoom according to a change in a distance to the main subject.

Recording Start Control

Main subject determination may be set to trigger a start of dynamic image capturing. For example, dynamic image capturing and recording are started according to decision of a main subject.

In addition, a main subject can also be used in various signal processes performed with respect to a captured image signal.

Image Effect Process

Image processes including image quality adjustment, noise reduction, skin color adjustment, and the like are performed only on the area of a main subject in each captured frame.

Alternatively, adding an image effect, for example, a mosaicing process, an airbrushing process, a paint-out process, or the like in an area other than the area of the main subject is also considered.

Image Editing Process

An editing process such as framing, cropping, or the like is performed on a captured image or a recorded image.

For example, a process of cropping, enlarging, or the like of a partial area within a frame in which a main subject is included can be performed.

In addition, cutting of image peripheral portions of captured image data or the like can be performed so that a main subject is disposed at the center of the image, and composition adjustment can be performed.

These are merely examples, and various processes of application programs or automatic adjustment functions included in the imaging apparatus to use a set main subject are considered in addition to them.

Next, various time points at which the camerawork determination and the main subject determination process are performed are considered.

For example, when the imaging apparatus 10 is considered to be turned on to perform imaging (a period in which a through image is displayed on the display unit 34), the camerawork determination and the main subject determination process at a timing based on the camerawork determination may be performed.

When a main subject is determined and a tracking process is performed, the camerawork determination and the main subject determination process may be performed again at a time point at which the tracking fails.

The camerawork determination and the main subject determination process may be configured to start according to a user's manipulation. Further, the camerawork determination and the main subject determination process may be configured to start, for example, when the user selects a determination execution mode and the camerawork determination and the main subject determination process are normally performed or when the tracking fails. Furthermore, the camerawork determination and the main subject determination process can also be considered to start automatically without a user's manipulation.

The following effects are achieved by performing the main subject determination process.

As previously described, it is naturally difficult to perform a manipulation of designating a main subject when a photographer aims at the subject holding the imaging apparatus 10.

Particularly, when an imaging direction is continuously changed in a fixed direction as in panning and tilting, or when an imaging direction is changed not in a fixed direction, the manipulation of designating a main subject is difficult.

In addition, the action of designating a main subject many times is bothersome.

If main subject determination is set to be automatically performed, such troubles are overcome, and the effect of reduced stress on the user is obtained.

In addition, the imaging apparatus 10 that is carried and used by a user, such as a digital still camera, a camera included in a mobile telephone, or the like used by general users, has the display unit 34 of a small size, and thus it is difficult for the user to perform an accurate manipulation of designating a main subject on a screen. The problem of erroneous designation is resolved by performing automatic determination as described in the present embodiment.

In addition, if the imaging apparatus 10 is set to automatically perform main subject determination, a user executes the main subject determination in a situation in which he or she holds the imaging apparatus 10 to aim at a subject, or changes an imaging direction to track the subject, and thus effects of enhancement of a feeling of intelligence of the apparatus that the user senses from the apparatus and enhancement of added value are obtained.

In addition, since the user can use the imaging apparatus 10 with a feeling of being able to image a main figure only by naturally using the apparatus, imaging opportunities and use cases associated therewith can increase, and accordingly, a user-friendly camera can be provided to the user.

Based on the above points, as a camera of hand-held type, the imaging apparatus 10 of the present embodiment that automatically performs main subject determination is particularly preferred.

<4. First Process Example Pan Operation Determination>

The camerawork determination and main subject determination operations will be described as a first process example of the imaging apparatus 10 according to the embodiment. This is an example in which the main subject determination is performed during the pan operation. That is, the camerawork determination unit 30b determines a pan operation in which the user moves the imaging apparatus 10 in the substantially horizontal direction. Then, the main subject determination unit 30a performs the main subject determination process during the pan operation.

A process of extracting a candidate image in the image data and determining that the candidate image consistently close to a predetermined determination reference point is a main subject can be exemplified as the main subject determination process.

Figure 4:
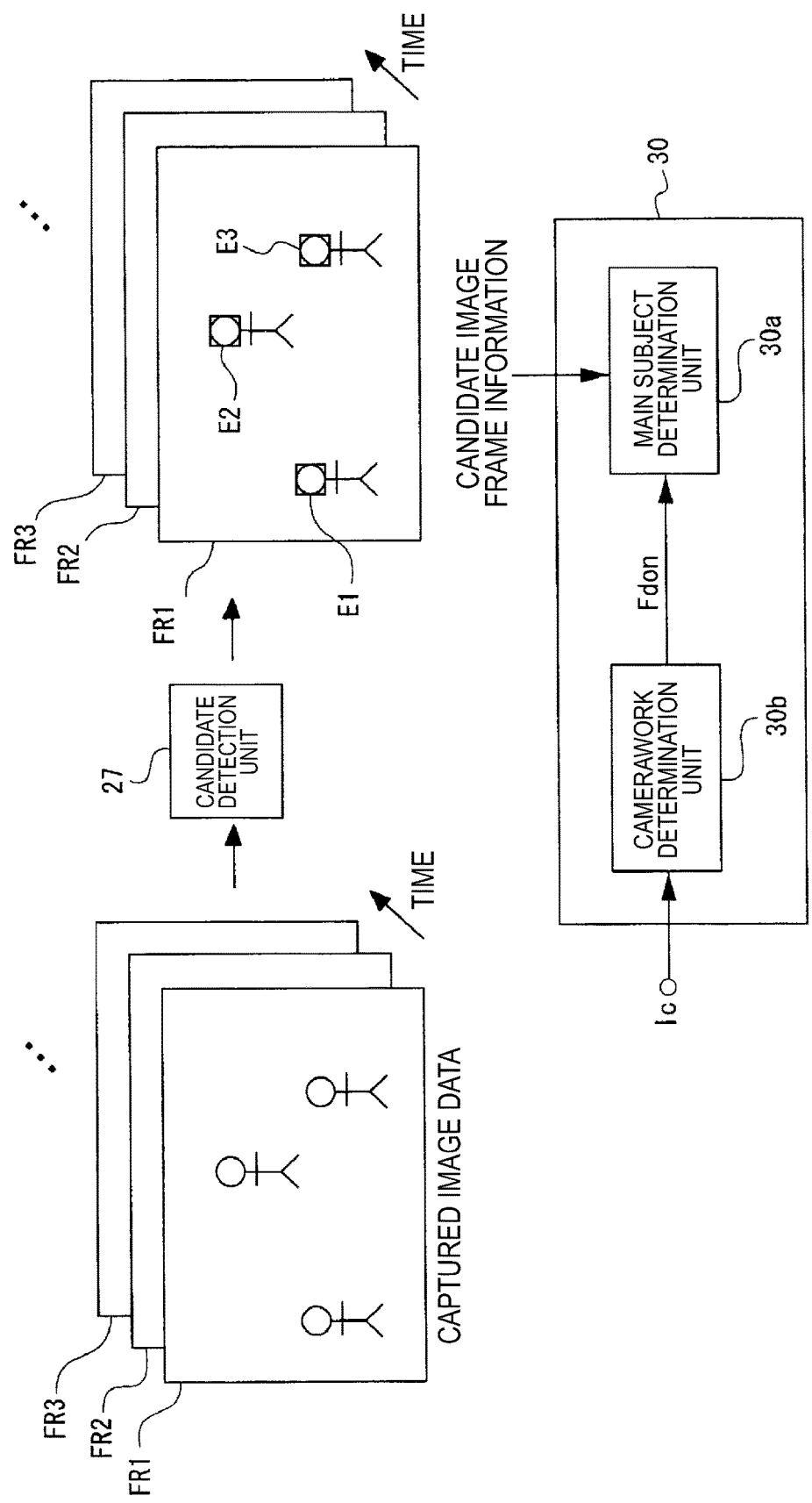
FIG. 4 is an explanatory diagram of an overview of candidate image extraction and main subject determination of the embodiment.

FIG. 4 schematically shows a candidate image frame extraction operation performed in the candidate detection unit 27 and the operation of the control unit 30 shown in FIG. 3.

FIG. 4 shows each of frames FR1, FR2, FR3, . . . of a captured image signal input to the digital signal processing unit 20 through an operation of the optical system 11 and the imager 12 of the imaging apparatus 10. The detection unit 27 performs detection of candidate images for each of the continuous frames sequentially input as above (or for each of intermittent frames). For example, when there are three persons in the frame FR1 as shown in the drawing, each of the face image portions of the persons is extracted as a candidate image, and then candidate image frame information of candidate image frames E1, E2, and E3 are output. For example, the candidate image frame information of the candidate image frame E1 includes, for example, position information (x and y position information and subject distance information), within the image of the candidate image frame E1, and size information (the width, height and the number of pixels of the frame) and attribute information of the frame, and the like.

The candidate detection unit 27 also generates such candidate image frame information with regard to the candidate image frames E2 and E3, and then transfers the information to the control unit 30 (main subject determination unit 30a).

In the same manner, the candidate detection unit 27 extracts candidate images of the following frames FR2, FR3, . . . , generates candidate image frame information for each of candidate image frames of the images, and then transfers the information to the control unit 30 (main subject determination unit 30a). On the other hand, the control unit 30 (the camerawork determination unit 30b) detects camerawork (for example, pan or zoom) based on the detection information Ic and sets the determination start timing according to the camerawork. Specifically, the determination execution flag Fdon is set to "1." Accordingly, the control unit 30 (the main subject determination unit 30a) performs the main subject determination process using candidate image frame information.

The control unit 30 (the main subject determination unit 30a) computes a distance to the determination reference point as a positional state of each of the candidate image frames each time the control unit takes the candidate image frame information of each frame.

FIG. 5A shows an example of the determination reference point SP. This is an example in which the center of an image is set to be the determination reference point SP. x and y coordinate values of the determination reference point SP are set to (Cx, Cy).

When the candidate image frame information of each of the candidate image frames E1, E2, and E3 is taken at the time of the frame FR1, for example, the control unit 30 computes the distances Diff1, Diff2, and Diff3 from each of the centers of gravity G of the candidate image frames E1, E2, and E3 shown in the drawing to the determination reference point SP.

Note that setting the determination reference point SP at the center of a screen is an example.

The determination reference point SP may be set at a position, for example, on a slightly upper-left side of the center as shown in FIG. 5B. This is because there are many cases to be considered in which a main subject is better to be disposed at a position that is not the center when, for example, composition of a still image is considered.

Also in the case of FIG. 5B, the distances between each of candidate image frames (for example, E4 or E5) and the determination reference point SP (for example, Diff4 and Diff5) are computed as shown in FIG. 6B.

The determination reference point SP may be set at, for example, such fixed positions as shown in FIGS. 15A and 15B, or may be arbitrarily designated by a user through a touch manipulation on a display screen or the like. In addition, several candidate points for the determination reference point may be presented on the screen of the display unit 34 to a user so that the user can select one. Furthermore, the control unit 30 is considered to determine an optimum position in consideration of composition and the like according to the content of an image, an image analysis result, and the like for automatic setting.

In other words, the following conditions are considered with regard to the determination reference point SP;
  being set at a pre-decided fixed position such as the position of the center of an image, a position deviated from the center, or the like;
  being arbitrarily designated by a user;
  being set such that several candidate points are presented to a user so that the user can select one;
  being flexibly set in an automatic manner by the control unit 30 determining an optimum position according to the content of an image; and the like.

The distance Diff(n) as a positional state of a candidate image frame E(n) is obtained at a time point of each frame.

Figure 6:
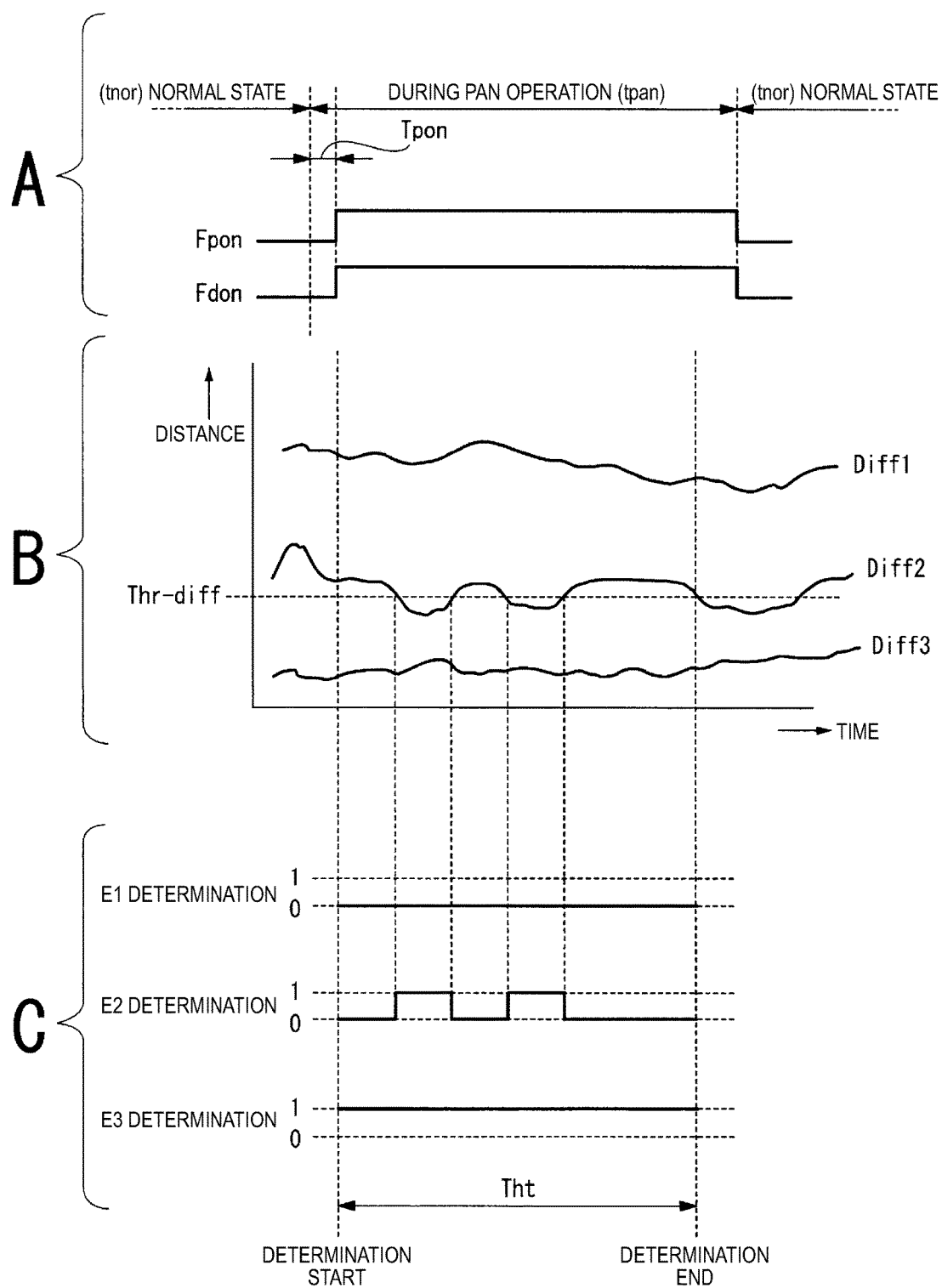
FIG. 6 is a flowchart of a camerawork determination process and a main subject determination process of a first process example.

The control unit 30 (the main subject determination unit 30a) monitors a distance Diff(n) as a positional state of the candidate image frame E(n) during the pan operation, determines the candidate image frame close to the determination reference point SP on average, cumulatively, or continuously, and sets the candidate image frame as the main subject. The main subject determination unit 30a performs this process according to the detection of the pan operation by the camerawork determination unit 30b. This operation is illustrated in FIG. 6.

First, FIG. 6A shows the process of the detection of the pan operation by the camerawork determination unit 30b and the process of the determination execution flag Fdon. The camerawork determination unit 30b performs the camerawork from a normal state (period tnor). The normal state mentioned here refers to a state in which the user normally carries or holds the camera. That is, the normal state is assumed to be a period in which none of the pan, the tilt, the zoom, and the manual focus is performed. The normal state is referred to as the normal period tnor for description.

The user is assumed to perform a pan operation of moving the imaging apparatus 10 in the substantially horizontal direction at a certain time point (pan period tpan). After the pan starts, the camerawork determination unit 30b detects the pan operation during a pan determination period Tpon and the pan execution flag Fpon is set to "1." In the first process example, the determination execution flag Fdon is set to "1" according to the pan execution flag Fpon.

According to the setting of the determination execution flag Fdon=1, the main subject determination unit 30a starts the main subject determination process. The main subject determination process starting at this timing is an actual process performed for the determination. A routine of the main subject determination process may start beforehand. For example, in a process example of FIG. 8 to be described below, for example, only the taking of the candidate image frame information is performed before the determination execution flag Fdon=1 is set. Of course, the main subject determination process may start according to the setting of the determination execution flag Fdon=1, including the taking of the candidate image frame information.

FIG. 6 shows the state of changes of the computed distances Diff1, Diff2, and Diff3 on the assumption that the candidate image frames E1, E2, and E3 are continuously present in frames (FR1, FR2, . . . ) during the pan operation for a certain period of time. For example, a case in which a photographer is capturing three subjects for a given period of time using the imaging apparatus 10 is assumed. Because each of the three persons moves independently, the photographer moves a subject distance of the imaging apparatus 10, camera shaking or the like occurs, and each of the computed distances Diff1, Diff2, and Diff3 changes on a time axis.

In the process example of FIG. 8 to be described below, the main subject determination is performed based on a cumulative time of the state of being close to the determination reference point SP. Therefore, a distance threshold value Thr-diff is used for determination of "close or not close."

FIG. 6C shows a determination result regarding whether a distance is within the distance threshold value Thr-diff at each time point of the distances Diff1, Diff2, and Diff3. When the distance Diff(n) is equal to or less than the distance threshold value Thr-diff, close="1" is assumed to be set. A subject for which a value obtained by cumulatively adding the determination result "1" at each time point exceeds a time threshold value is determined to be a main subject.

A period from the start of the determination to the end of the determination differs according to a specific process example. In the process example of FIG. 8 to be described below, a cumulatively added value of the determination result "1" equal to or less than the distance threshold value Thr-diff is a cumulative time indicating a state in which the candidate image frame is stably close to the determination reference point SP up to that time point. When a candidate image for which the cumulative time reaches a predetermined value (a count threshold value Tht to be described below) is found, a timing of the end of the main subject determination is set.

For example, in the example of FIG. 6C, the candidate image frame E3 is determined to be continuously set to "1 (=close to the determination reference point SP)." However, when the cumulatively added value reaches a certain predetermined value, the determination ends and the candidate image frame E3 is determined to be the main subject.

Figure 7:
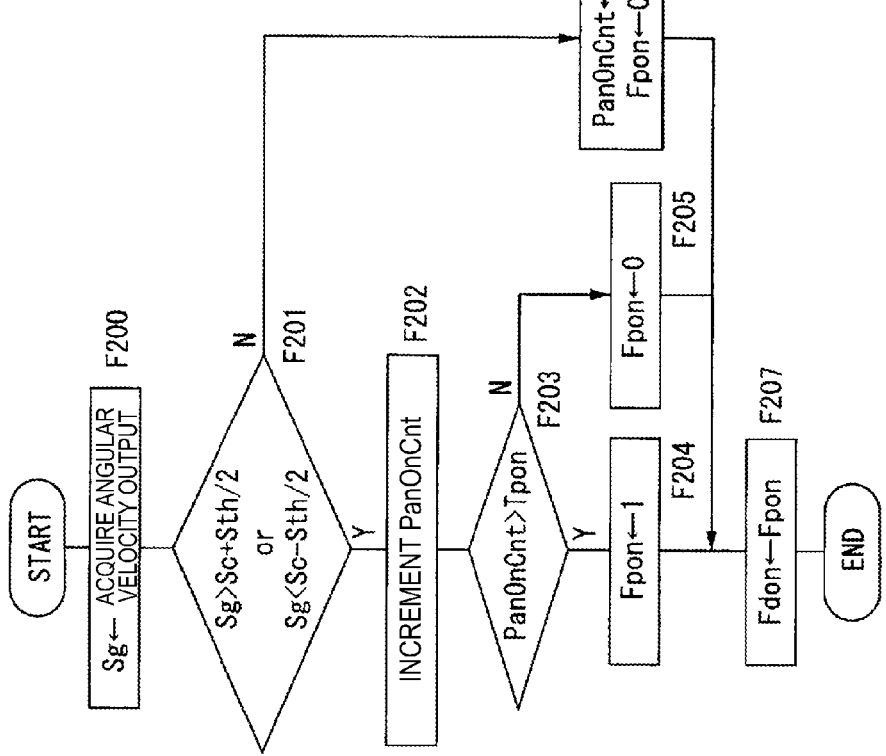
FIG. 7 is a flowchart and an explanatory diagram of a camerawork determination process of the first process example.

A specific process example will be described. First, the camerawork determination process performed by the control unit 30 (the camerawork determination unit 30b) will be described with reference to FIG. 7. This process is a process of detecting that the pan operation is being performed and turning on the determination execution flag Fdon.

FIG. 7B illustrates an operation of detecting that the pan operation is being performed. When an output (detection signal Sg) of the gyro sensor in the sensor unit 14 does not considerably move, the output is near a reference level Sc (for example, a zero level). When the pan operation is being performed (for example, the user moves the imaging apparatus 10 in the substantially horizontal direction), the detection signal Sg continuously indicates a substantially constant value at a certain positive or negative level. Thus, a threshold value range Sth is set in a range of positive and negative values centering on the reference level Sc.

During the normal period tnor, the detection signal Sg is near the reference level Sc. During the pan period tpan, however, a level at which the detection signal Sg exceeds the threshold value range Sth is continuously observed.

Thus, when the detection signal Sg exceeds the threshold value range Sth continuously for a time equal to or greater than a certain time set as the pan determination period Tpon, the pan is determined to be performed and the pan execution flag Fpon is set to "1." Accordingly, the determination execution flag Fdon for controlling the start of the main subject determination is set to "1." When the determination execution flag Fdon=1 is set, the main subject determination process is performed.

The pan determination period Tpon is a period provided so that a state in which the detection signal Sg instantaneously increases is not erroneously determined to be the pan operation. That is, the pan determination period Tpon is a period provided to determine the pan in a state in which the detection signal Sg is continuously high.

The process of the determination execution flag Fdon is performed as in FIG. 7A. The control unit 30 (the camerawork determination unit 30b) detects the pan operation by repeating the process of FIG. 7A.

In Step F200, the control unit 30 acquires angular velocity information detected by the gyro sensor of the sensor unit 14 as the detection signal Sg.

In Step F201, the control unit 30 determines whether one of Sg>Sc+Sth/2 and Sg<Sc−Sth/2 is established. That is, this process is a process of determining whether the detection signal Sg is changed to a positive or negative value and exceeds the threshold value range Sth, using the values of the reference level Sc and the threshold value range Sth illustrated in FIG. 7B.

When the detection signal Sg does not exceed the threshold value range Sth, the process proceeds to Step F206, a count value PanOnCnt is set to zero, and the pan execution flag Fpon is set to zero. The count value PanOnCnt is a count value for determining whether to exceed the pan determination period Tpon.

Then, in Step F207, the value of the pan execution flag Fpon is substituted to the determination execution flag Fdon. That is, in this case, the determination execution lag Fdon=0.

When the detection signal Sg exceeds the threshold value range Sth, the control unit 30 causes the process to proceed from Step F201 to Step F202 and the count value PanOnCnt is incremented.

Then, in Step F203, the control unit 30 compares the count value PanOnCnt to the pan determination period Tpon. When the count value PanOnCnt does not reach the pan determination period Tpon, the pan execution flag Fpon is set to zero in Step F205. Then, in Step F207, the value of the pan execution flag Fpon is substituted into the determination execution flag Fdon. That is, even in this case, the determination execution flag Fdon=0 is set.

When the count value PanOnCnt is determined to reach the pan determination period Tpon in Step F203, the control unit 30 sets the pan execution flag Fpon=1 in Step F204. That is, during the pan determination period Tpon, it is confirmed that the detection signal Sg continuously exceeds the threshold value range Sth. Based on this confirmation, the pan is determined to be performed.

Then, in Step F207, the value of the pan execution flag Fpon is substituted into the determination execution flag Fdon. In this case, the determination execution flag Fdon=1 is set. That is, the main subject determination process starts during the pan operation.

While the pan continues, the process in which Steps F203→F204→F207 proceed is repeated and the state of the determination execution flag Fdon=1 is maintained.

Thereafter, when the pan operation ends, the process in which Steps F201→F206→F207 proceed is performed, and thus the determination execution flag Fdon=0 is set.

Figure 8:
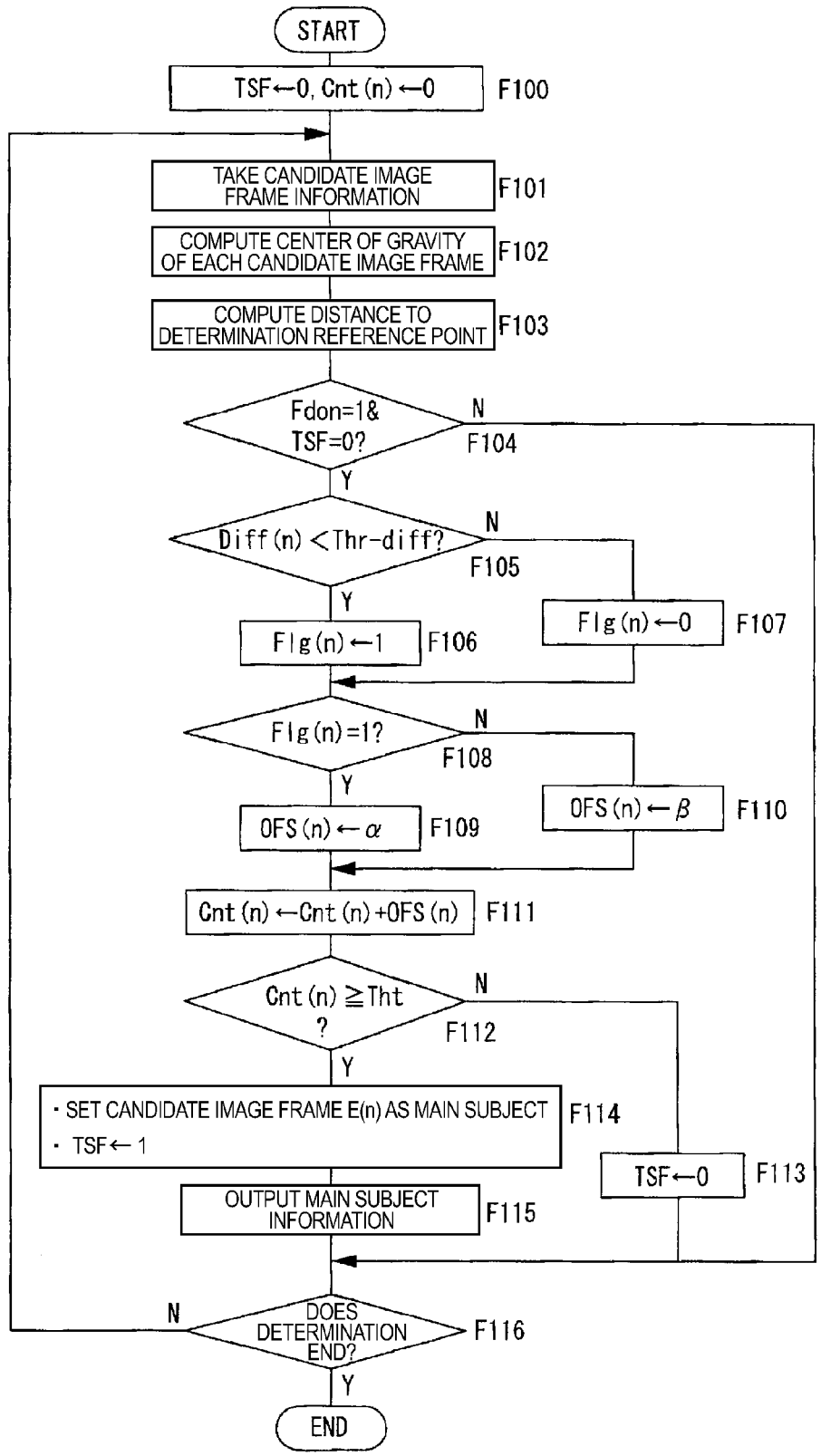
FIG. 8 is a flowchart of a main subject determination process applicable to each process example of the embodiment.

FIG. 8 shows the main subject determination process performed by the control unit 30 (the main subject determination unit 30a).

This example is a process example in which, in regard to the main subject determination, the control unit 30 continues to take the candidate image frame information and starts an actual determination process (Steps F105 to F115) according to the above-described setting of the determination execution flag Fdon=1.

The control unit 30 performs the processes of Steps F101 to F104 and F116 (Steps F101 to F116 during the period of the determination execution flag Fdon=1), for example, at each frame timing.

When the control unit 30 starts the main subject determination process, a variable TSF=0 is set in Step F100 and a count value Cnt(n)=0 is first set as an initial setting.

The variable TSF is a flag indicating whether the main subject setting ends. TSF="0" indicates that the main subject has not been determined.

The count value Cnt(n) is a value of a counter adding a value of a comparison determination result of the distance Diff and the distance threshold value Thr-diff described in FIG. 6.

Note that "n" indicates natural numbers of 1, 2, 3 ... and the count value Cnt (n) is set to be a count value corresponding to each detected candidate image frame E (n) like the candidate image frames E1, E2, and E3. When the three candidate image frames E1, E2, and E3 are detected, Cnt1, Cnt2, and Cnt3 are used as count values. For the sake of description of the flowchart, it is advised that a process with regard to the count value Cnt(n) be understood as, for example, a process targeting each of Cnt1, Cnt2, and Cnt3.

In addition, in the same manner, the distance Diff(n) collectively indicates the distances Diff1, Diff2, and Diff3 from the determination reference point SP to each of the three candidate image frames E1, E2, and E3, and a process with regard to the distance Diff(n) is used to mean, for example, a process with regard to each of the distances Diff1, Diff2, and Diff3.

The same also applies to a proximity flag Flg(n) and an offset value OFS(n).

In addition, a candidate image frame E(n) indicates each of the candidate image frames E1, E2, E3 . . . , but it is preferably distinguished for each subject over a plurality of frames. In an example in which the candidate detection unit 27 extracts a face, when a person A, a person B, and a person C are subjects, for example, the face image portion of the person A is set to be the candidate image frame E1, the face image portion of the person B to be the candidate image frame E2, and the face image portion of the person C to be the candidate image frame E3 common in each of the frames. If only a person D is interposed as a subject in a certain middle frame, the face image portion of the person D is set to be a candidate image frame E4. Thus, it is better for the candidate detection unit 27 to not only merely detect a "face" but also determine an entity (individual).

In Step F101, the control unit 30 takes candidate image frame information of a certain frame from the candidate detection unit 27. For example, with regard to each candidate image frame E(n), information including an x value and a y value of two-dimensional (x-y) coordinate values of image data as position information, and a width w and a height h of the candidate image frame as size information are acquired.

Note that the candidate image frame information may also include a subject distance (a relative distance of a subject to a camera position indicated by a value of a z axis direction orthogonal to the two-dimensional (x-y) coordinate plane; z value), the number of pixels, and the like.

In Step F102, the control unit 30 computes the coordinates of the center of gravity G with regard to each candidate image frame E(n).

For example, for the candidate image frame information, the coordinate values of an upper-left vertex of a square-shaped candidate image frame are given as x and y coordinate values of the candidate image frame. The x and y coordinate values are set to (E(n)_x, E(n)_y). In addition, as shown in FIG. 5A, the x and y coordinates have the upper-left portion of the screen plane as the origin O (where the x and y coordinate values are (0, 0)).

In addition, the width w of the candidate image frame E(n) is set to E(n)_w and the height h thereof is set to E(n)_h.

Then, if the coordinate values of the center of gravity G of the candidate image frame E(n) are set to (E(n)_cx, E(n)_cy), the coordinate values of the center of gravity G are obtained as follows.

$$E(n)\_cx = E(n)\_x + E(n)\_w/2$$

$$E(n)\_cy = E(n)\_y + E(n)\_h/2$$

In Step F103, the control unit 30 computes the distance Diff(n) from the center of gravity G of each candidate image frame E(n) to the determination reference point SP. With coordinate values (Cx, Cy) of the determination reference point SP, the distance is obtained as follows.

$$\text{Diff}(n) = \sqrt{\{(E(n)\_cx - Cx)^2 + (E(n)\_cy - Cy)^2\}}$$

In Step F104, the control unit 30 confirms the determination execution flag Fdon and the variable TSF. When the variable TSF=0 is set and the determination execution flag Fdon=1 is set, the process proceeds to Step F105. In other cases, the actual determination process (F105 to F115) is not performed and the process proceeds to Step F116.

For example, during a period in which the main subject determination process is not necessary after the main subject determination is performed or when an operation mode is set, the variable TSF=1 is set and the main subject determination process is not performed.

The process of Step F104 may be unnecessary, for example, when the main subject determination process of FIG. 6 is performed, as necessary, through a user's manipulation, automatic start determination, or the like.

Further, in this case, in order to perform the main subject determination during the pan operation, the main subject determination process is not performed when the determination execution flag Fdon=0 is set.

When the variable TSF=0 is set and the determination execution flag Fdon=1 is set, the control unit 30 confirms in Steps F105, F106, and F107 whether each candidate image frame E(n) satisfies a predetermined condition of the distance Diff(n).

That is, whether the distance Diff(n) up to the determination reference point SP is close or not close to the determination reference point SP is determined using the distance threshold value Thr-diff.

Therefore, in Step F105, the control unit 30 compares the distance Diff(n) up to the determination reference point SP of each candidate image frame E(n) to the distance threshold value Thr-diff. When Diff(n)<Thr-diff is satisfied, the proximity flag Flg(n)=1 (close) is set in Step F106. When Diff(m)<Thr-diff is not satisfied, the proximity flag Flg(n)=0 (not close) is set in Step F107. The proximity flag Flg(n) corresponds to the determination result of "1" or "0" described in FIG. 6C.

Subsequently, in Steps F108, F109, and F110, the control unit 30 sets the offset value OFS(n) for a count process depending on whether the proximity flag Flg(n) is "1" or "0."

For example, when the proximity flag Flg(g)=1 is set, the control unit 30 sets the offset value OFS(n)=α in Step F109. Here, α is a predetermined value for incrementing the counter. For example, α=1 is set.

When the proximity flag Flg(g)=0 is set, the control unit 30 sets the offset value OFS(n)=β in Step F110. Here, β is a predetermined value for keeping the count value or decrementing the count value. When the count value is kept, β=0 is set. When the counter is decremented, for example, β=−1 is set Then, in Step F111, the control unit 30 performs a process for the count value CNT(n) of the counter to determine whether the proximity state to the determination reference point SP is consistently observed. Specifically, CNT(n)= CNT(n)+OFS(n) is assumed.

When α=1 is considered in the foregoing Step F109 and the offset value OFS(n) is set, the count value CNT(n) is incremented.

When β=0 (or β=−1) is considered in Step F110 and the offset value OFS(n) is set, the count value CNT(n) is kept (or is decremented).

The count value CNT(n) is incremented when the proximity state is detected. Therefore, the count value CNT(n) becomes a value corresponding to the length of a period in which a state in which the subject of the candidate image frame E(n) is close to the determination reference point SP is detected. That is, the count value Cnt(n) becomes a value indicating a frequency of the state in which the candidate image frame E(m) is "close" to the determination reference point SP.

Next, in Step F112, the control unit 30 confirms whether the count value Cnt(n) of each candidate image frame E(n) reaches the count threshold value Tht.

When Cnt(n)≥Tht is not satisfied, that is, none of the count values Cnt(n) of the candidate image frames E(n) reaches the count threshold value Tht, the variable TSF=0 is set in Step F113, the end of the determination is not determined in Step F116, and the process returns to Step F101. In this case, the processes subsequent to Step F101 are performed in the above-described manner based on the candidate image frame information input in regard to a subsequent frame.

In Step F116, when the variable TSF=0 is set, the determination of the main subject is determined not to be completed and the determination process continues. When the variable TSF=1 is set, the main subject determination is assumed to be completed. When the variable TSF=1 is detected in the above-described Step F104, the determination ends directly.

Although the detailed description is omitted, for example, the user may be allowed to select the main subject through a manipulation of touching the main subject on the screen of the display unit 34 or a manipulation of half pressing the shutter button according to a predetermined position of a subject on the screen, in parallel to the automatic main subject determination of this example. When the user performs such a designation manipulation during the execution of the process of FIG. 8, it is desirable to give priority to the user's manipulation. Thus, when the main subject setting is performed through such a manual manipulation, the variable TSF=1 is set. In this case, the process of FIG. 8 may end (interruption end) through the determination of Steps F104 and F116.

Since the main subject determination is made for over a certain time length, if the process with regard to the candidate image frame information is not performed for a certain period of time (a number of frames), the process returns to Step F101 from Step F116 and processes are repeated as described above.

Here, for example, a certain candidate image frame E3 shown in FIG. 6B may be discontinuous, but a situation in which the frame is present in a position close to the determination reference point SP in a plurality of frames on a captured image with a high frequency is assumed. Thus, many opportunities in which the count value Cnt3 of the candidate image frame E3 is incremented in Step F111 are created as time goes by, and a count value Cnt3 is obtained more quickly than count values Cnt1 and Cnt2.

Then, the count value Cnt3 reaches the count threshold value Tht for the first at a certain time point.

In such a case, the control unit 30 causes the process to proceed from Step F112 to F114.

In Step F114, the control unit 30 determines that the candidate image frame E(n) for which the count value Cnt(n) reaches the count threshold value Tht is the main subject and sets the main subject. The variable TSF=1 is set. That is, during the pan operation, the subject of the candidate image that is consistently close to the determination reference point SP (for example, the center of an image) is set as the main subject.

In Step F115, the main subject information is output. For example, an application program or a control program using the main subject information is transmitted and received.

In this case, in Step F116, the determination is considered to end. That is, for example, the candidate image frame E1 is set as the main subject and the main subject determination process of FIG. 8 is completed.

In the process example, the process continues until the variable TSF=1. However, when the pan operation ends, the actual determination process (Steps F105 to F115) ends.

The camerawork determination process of FIG. 7A is continuously performed. When the pan operation ends, the pan execution flag Fpon=0 is set in Step F206 and the determination execution flag Fdon=0 is considered in Step F207. That is, when the normal period tnor comes after the pan as in FIG. 7B, the determination execution flag Fdon=0 is set. In this case, this is because the process of FIG. 8 proceeds from Step F104 to Step F116.

Therefore, when the candidate image frame E(n) for which the count value Cnt(n) reaches the count threshold value Tht is not observed by the end of the pan operation, the main subject determination may not be performed.

Although not illustrated in FIG. 8, when the pan operation ends and the determining of the determination execution flag Fdon=0 is not performed, the count value Cnt(n) may be reset to zero. This is because the count value is configured not to be carried over to a subsequent pan period. On the other hand, when individual correspondence of the candidate image frame E(n) can continue, it can be considered that the count value Cnt(n) is maintained and the count value is configured to be carried over to a subsequent pan period.

According to the above-described first process example, the subject close to the determination reference point SP during the pan operation is determined to be the main subject. In many cases, the user pans the imaging apparatus 10 while catching a subject desired to be imaged within a captured image. For example, the user can pursue a moving subject. Therefore, there is a high probability of the subject close to the determination reference point SP during the pan being a subject targeted by the user and it is possible to increase a probability of proper determination being performed as the main subject determination. The proper main subject determination is automatically performed for the photographer through such a process, thereby considerably improving operability at the time of imaging. Even a user unaccustomed to an imaging manipulation can capture a still image or a moving image with high quality, for example, when focus control or exposure control is automatically performed on the main subject through the main subject determination.

Various other specific process examples can be considered as the main subject determination process.

For example, when β=0 is set in Step F110 of FIG. 8, the count value CNT(n) corresponds to a cumulative value of the number of times the state cumulatively close to the determination reference point SP is detected.

When β=−1 is set in Step F110 of FIG. 8, the count value CNT(n) can be regarded as a value at which the state of being close to the determination reference point SP on average is detected.

That is, in this case, the determination of Step F112 is the determination in the state of being close to the determination reference point SP cumulatively or on average.

On the other hand, the state of being continuously close to the determination reference point SP during a period equal to or greater than a predetermined period may be set as a condition. For such occasions, the count value CNT(n) is incremented when the proximity flag Flg(n)=1 is considered in Step F108, and the count value CNT(n) is reset to zero when the proximity flag Flg(n)=0 is considered in Step F108. Then, when the state of the proximity flag Flg(n)=1 continuously reaches a predetermined time, the count value Cnt(n) reaches the count threshold value Tht in Step F112 and the candidate image frame E(n) is determined to be the main subject.

According to the setting of the subject continuously close to the determination reference point SP as the main subject, for example, a subject located temporarily at the center can be prevented from being determined to be the main subject. Accordingly, this determination is appropriate when the main subject determination is performed carefully. Conversely, when the determination of the main subject is desired to be performed in a short time or the main subject is desired to be set as easily as possible, the subject close to the determination reference point SP on average or cumulatively is appropriately determined as the main subject.

In the cases of the cumulative determination, the average determination, and the continuous determination described above, it is appropriate for specific determination values corresponding to the count threshold value Tht to be different.

Weighting may be performed in the calculation of the state of being close to the determination reference point SP. For example, a value of the closeness to the determination reference point SP is weighted more heavily for a time point later in an execution period of the main subject determination process.

In general, when a photographer aims at a subject and performs camerawork, the photographer does not catch a subject desired to be a main figure at a desired position such as an image center at first and gradually adjusts the direction of a camera. For example, the photographer gradually catches the subject in the center of an image in the course of the panning. In consideration of this, a subject which the photograph has in mind as a "main subject" at first is gradually caught at an image center as time passes.

Accordingly, by weighting the value of the closeness to the determination reference point SP during the execution of the main subject determination process as time passes, there is a high probability of the main subject determination consistent with the thoughts of the photographer being performed. Specifically, the value a substituted into the offset value OFS(n) in Step F109 is increased step by step. By doing so, there is a high probability of the main subject determination consistent with the thoughts of the photographer being performed.

In the above-described process example, the positional state of the candidate image frame has been a positional relation with the set determination reference point SP, but may be a positional relation with a determination reference region.

For example, a square or circular region at the image center or the like is set and this region is set as the determination reference region. A positional relation with the determination reference region of each candidate image frame E(n) is set as follows, for example:

whether the center is in the determination reference region;

whether the entirety is in the determination reference region;

whether at least a part is in the determination reference region; or whether a distance to the outer edge of the determination reference region is within a predetermined value.

The candidate image frame E(n) for which the condition of such a positional relation is satisfied on average, cumulatively, or continuously may be determined to be the main subject.

<5. Second Process Example Post-Pan Determination>

An example in which the main subject determination is performed after a pan operation will be described as a second process example. The same main subject determination process as the process described in FIG. 8 is performed for the subsequent second to eighth process examples, and thus the description thereof will be omitted and the camerawork determination process will be mainly described.

In the second process example, the control unit 30 (the camerawork determination unit 30b) determines that the pan operation in which the user moves the imaging apparatus 10 in the substantially horizontal direction ends. After the pan operation ends, the main subject determination unit 30a performs the main subject determination process.

Figure 9:
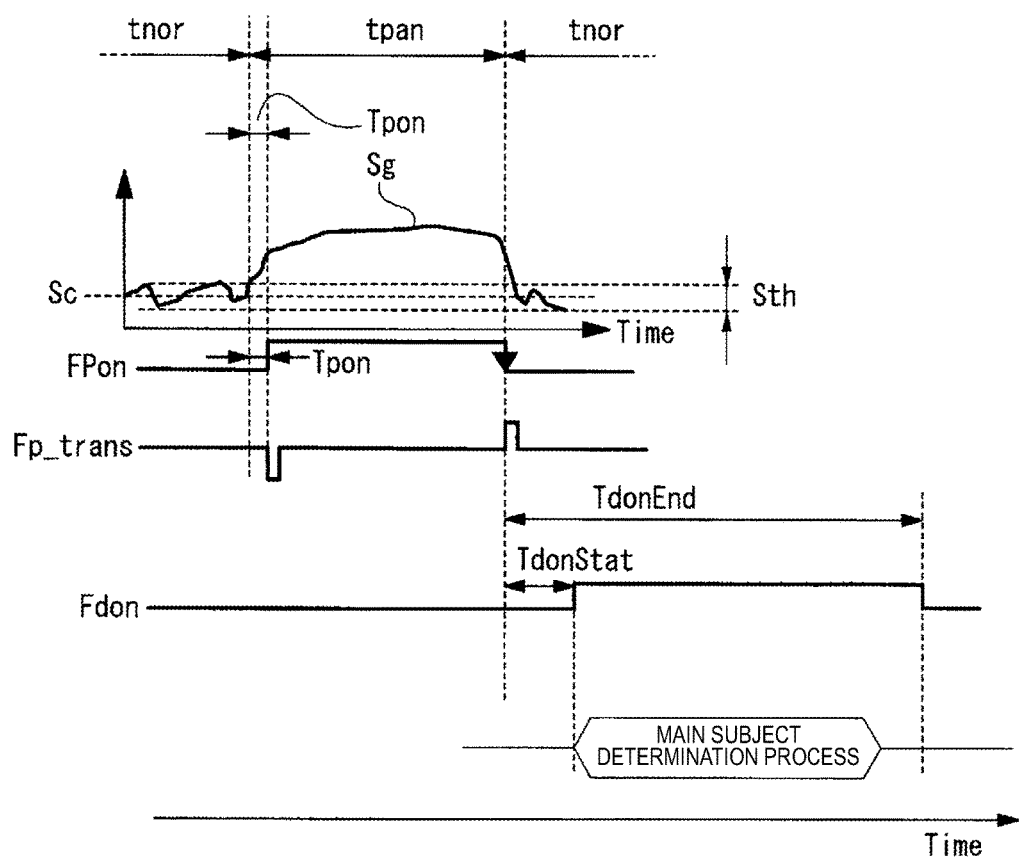
FIG. 9 is an explanatory diagram of a camerawork determination process of a second process example.

FIG. 9 shows the post-pan determination process.

The determination during the pan operation, that is, the pan execution flag Fpon, is set by comparing the detection signal Sg from the gyro sensor to the threshold value range Sth as in the first process example.

Here, for the pan execution flag Fpon, a pan transition flag Fp_trans is set by comparing (decreasing) a current value to an immediately previous value. The pan execution flag Fpon is "1" or "0." Therefore, when the current value is subtracted from the value at the immediately previous time point of the pan execution flag Fpon, one of "0," "+1," and "−1" is obtained. That is, at a time point at which the pan execution flag Fpon rises, the pan transition flag Fp_trans=−1 is set with 0-1. At a time point at which the pan execution flag Fpon falls, the pan transition flag Fp_trans=+1 is set with 1-0. In other cases, the pan transition flag Fp_trans=0 is set with 0-0 or 1-1.

That is, the pan transition flag Fp_trans serves as differential information of the pan execution flag Fpon and is specifically information detecting the start or end of the pan. In this case, the pan transition flag Fp_trans=+1 serves as information indicating a pan end time point.

The determination execution flag Fdon is considered to be "1" at a time point at which a determination start standby period TdonStart passes from a time point at which the pan transition flag Fp_trans=+1 is set. Thus, when the determination execution flag Fdon=1 is set, the actual main subject determination process starts.

An upper limit period TdonEnd is set and the determination execution flag Fdon is considered to be "0" at a time point at which the upper limit period TdonEnd passes from the time point at which the pan transition flag Fp_trans=+1 is set. Thus, when the determination execution flag Fdon=0 is set, a period in which the actual main subject determination process is performed is restricted.

The determination start standby period TdonStart and the upper limit period TdonEnd are considered to be, for example, fixed values.

Figure 10:
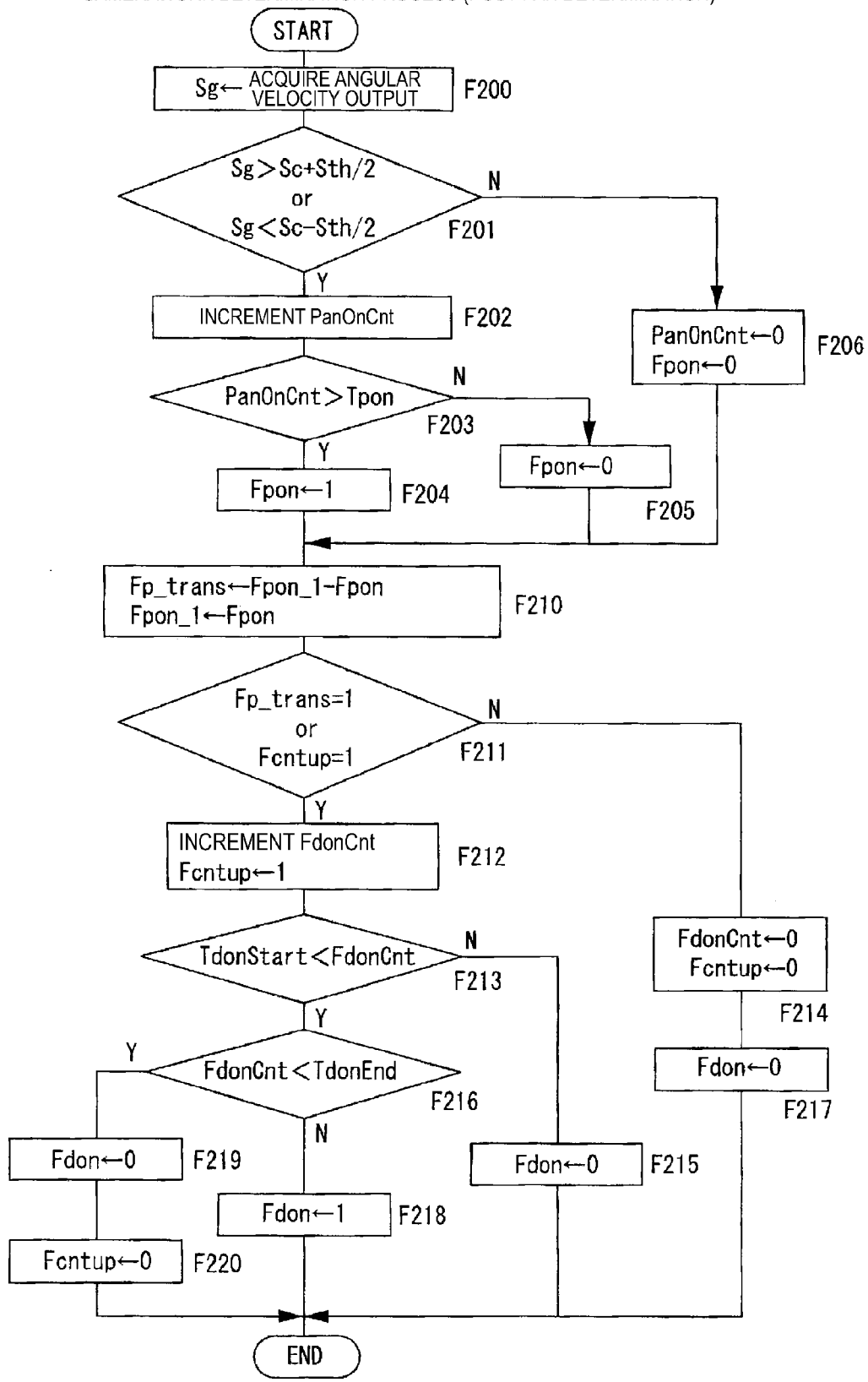
FIG. 10 is a flowchart of the camerawork determination process of the second process example.

The post-pan determination process is performed as in FIG. 10. The control unit 30 (the camerawork determination unit 30b) repeats the process of FIG. 10 and sets the determination execution flag Fdon.

In FIG. 10, Steps F200 to F206 are the same as Steps F200 to F206 of FIG. 7A. That is, the pan execution flag Fpon is set according to the detection signal Sg of the gyro sensor.

In Step F210, the pan transition flag Fp_trans is set. That is, the pan transition flag Fp_trans=(a previous pan execution flag Fpon 1)-(the pan execution flag Fpon) is set.

The previous pan execution flag Fpon_1 is a value of the pan execution flag Fpon at the time point of the previous Step F210. Accordingly, the pan transition flag Fp_trans is one of "0," "+1," and "−1" described in FIG. 9.

To use as the previous pan execution flag Fpon_1 in the subsequent Step F210, the value of the current pan execution flag Fpon is substituted into the previous pan execution flag Fpon_1.

In Step F211, the control unit 30 determines whether one of the pan transition flag Fp_trans=1 or a count flag Fcntup=1 is satisfied. The count flag Fcntup is a flag that is considered to be "1" in Step F212 and considered to be "0" in Step F220 and is used for process branch control.

The count flag Fcntup is "1" during only a period in which the pan transition flag Fp_trans becomes "1" and then reaches the upper limit period TdonEnd. Accordingly, the count flag Fcntup is "0" before the pan transition flag Fp_trans becomes "1."

When the count flag Fcntup=0 is set and the pan transition flag Fp_trans is "0" or "−1," the control unit 30 causes the process to proceed to Step F214, resets the count value Fdoncnt to zero, and sets the count flag Fcntup to "0." The count value Fdoncnt is a value of the counter for controlling a period in which the determination execution flag Fdon is "1."

Then, the control unit 30 sets the determination execution flag Fdon=0 in Step F217.

As shown in FIG. 9, the time point at which the pan transition flag Fp_trans=1 is set is a time point at which the pan execution flag Fpon falls, that is, the pan operation ends.

In this case, the pan transition flag Fp_trans=1 is set, and thus the control unit 30 causes the process to proceed from Step F211 to Step F212 and increments the count value Fdoncnt. The count flag Fcntup=1 is set.

In Step F213, the count value Fdoncnt is compared to the determination start standby period TdonStart shown in FIG. 9.

When the pan transition flag Fp_trans=1 is set at first, the count value Fdoncnt does not exceed the determination start standby period TdonStart. Therefore, the process proceeds to Step F215 and the determination execution flag Fdon=0 is considered.

In the process of FIG. 10 at a subsequent time point, the pan transition flag Fp_trans returns to "0." However, since the count flag Fcntup is "1," the control unit 30 causes the process to proceed from Step F211 to Step F212 as in the previous time, increments the count value Fdoncnt, and continuously sets the count flag Fcntup=1.

That is, after the pan transition flag Fp_trans=1 is set, the count flag Fcntup=1 is set, and thus the process is considered to continuously proceed to Step F212.

When the count value Fdoncnt exceeds the determination start standby period TdonStart in Step F213 of a certain time point, the control unit 30 causes the process to proceed to Step F216 and compares the count value Fdoncnt to the upper limit period TdonEnd. At first, since the count value Fdoncnt does not reach the upper limit period TdonEnd, the control unit 30 causes the process to proceed to Step F218 and sets the determination execution flag Fdon=1.

Thus, in the main subject determination process shown in FIG. 8, the actual determination process (Steps F105 to F115) starts.

Thereafter, since the count flag Fcntup=1 continues in the process of FIG. 10, the progress state of Steps F213→F216 is repeated while the count value Fdoncnt is incremented in Step F212. The determination execution flag Fdon=1 is maintained in Step F218 until the count value Fdoncnt reaches the upper limit period TdonEnd.

Thereafter, in Step F216 of a certain time point, the count value Fdoncnt exceeds the upper limit period TdonEnd. In this case, the control unit 30 causes the process to proceed to Step F219 and sets the determination execution flag Fdon=0. Accordingly, even when the main subject determination process is not completed in the process of FIG. 8, the actual determination process (Steps F105 to F115) ends at this time point.

In Step F220, the count flag Fcntup is assumed to be set to "0."

The determination execution flag Fdon shown in FIG. 9 is generated in such a process and the main subject determination process is performed based on the determination execution flag Fdon.

After the determination execution flag Fdon=0 is considered in Step F219, the processes of Steps F214 and F217 are performed and the state of the determination execution flag Fdon=0 continues until the pan transition flag Fp_trans=1 is subsequently set.

In the case of the second process example, the main subject is set during a post-pan period, but the post-pan period can be estimated to be a period immediately after the photographer catches a target subject through panning Thus, there is a high probability of the target subject being present in the image data. Accordingly, by determining a subject that has stabilized in the state close to the determination reference point SP as the main subject through the process of FIG. 8 during the post-pan period, the setting of the main subject with high accuracy is realized. An improvement in the operability of the user is realized through the automatic main subject determination.

According to the camerawork determination process of FIG. 10, the determination execution flag Fdon is considered to be "1" after the pan transition flag Fp_trans=1 is set and the determination start standby period TdonStart passes. This means that a captured image considerably sways immediately after the panning and thus the main subject determination is not performed during this period. By appropriately setting the determination start standby period TdonStart, it is possible to further improve the accuracy of the main subject determination.

In some cases, setting the determination start standby period TdonStart=0 can be considered. Thus, the main subject determination process is performed from a time point at which the pan transition flag Fp_trans=1 is set, that is, a time point at which the end of the pan is detected. For example, when the photographer pans the imaging apparatus 10 installed on a tripod or a platform and shaking of an image is considered to be small immediately after the pan, the main subject determination may be performed instantly in this way immediately after the pan.

According to the camerawork determination process of FIG. 10, the upper limit period TdonEnd is provided to restrict the period in which the main subject determination is performed. Performing the main subject determination process during a period that is too long after the pan may result in separation from an operation situation immediately after the tracking of the target subject through the pan, and there is a high probability of the main subject according to the intention of the user not being present in an image with the intention of the user. Accordingly, by restricting the period after the pan to some extent, there is a high probability of the subject tracked through the pan being determined to be the main subject.

Of course, a process example in which the state of the determination execution flag Fdon=1 is maintained without providing the upper limit until the main subject determination is performed can also be considered.

<6. Third Process Example Zoom Operation Determination>

The third process example will be described. This example is an example in which the main subject determination is performed during a zoom operation. That is, the camerawork determination unit 30b determines a situation in which the user performs the zoom operation of the imaging apparatus 10. During the zoom operation, the main subject determination unit 30a performs the main subject determination process.

Figure 11:
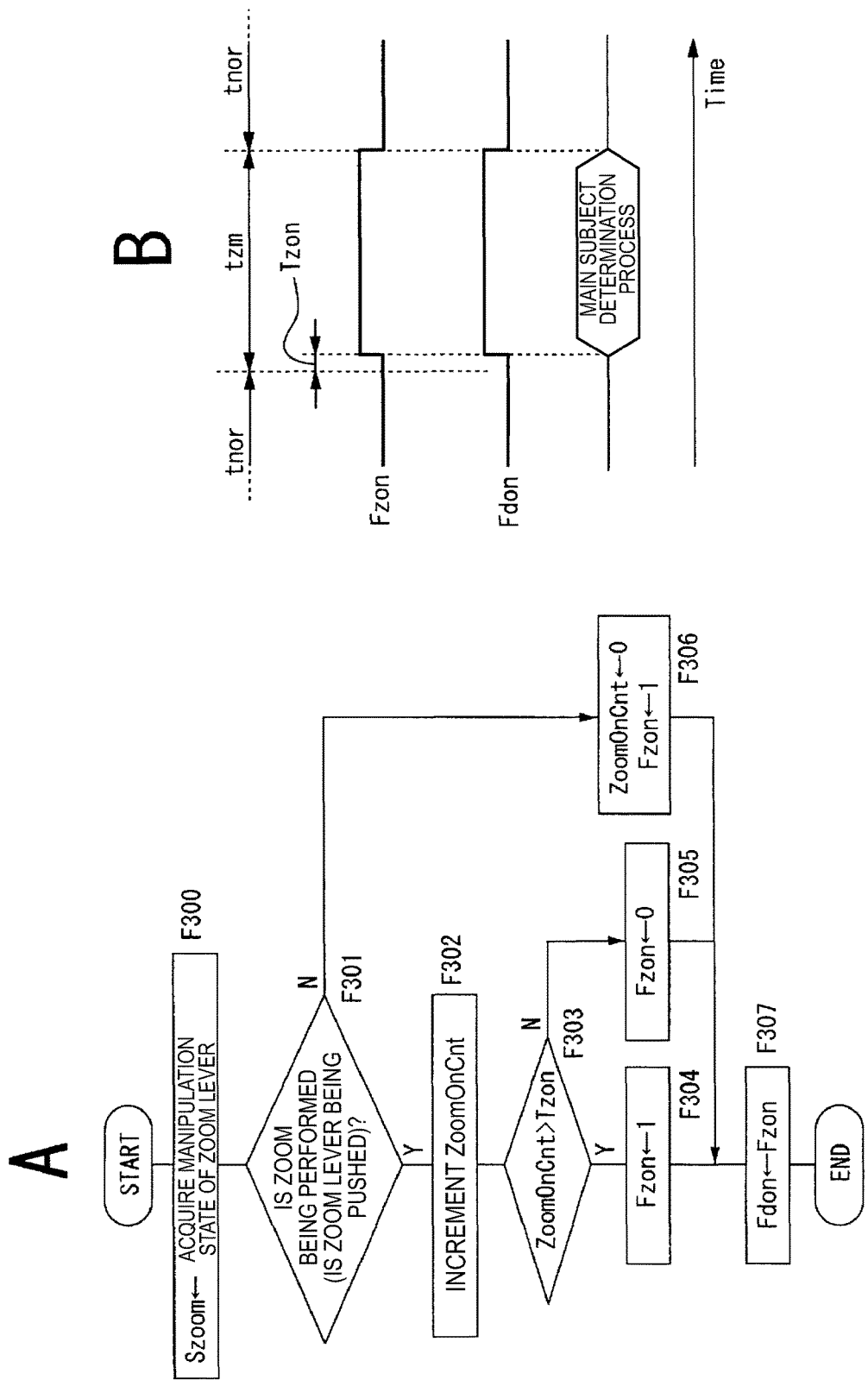
FIG. 11 is a flowchart and an explanatory diagram of a camerawork determination process of a third process example.

FIG. 11B shows an operation of detecting that the zoom operation is performed. The zoom operation can be detected when the user manipulates the zoom lever of the manipulation unit 35. When the user manipulates the zoom lever, the control unit 30 controls the optical system drive unit 13 to move the zoom lens. Thus, the control unit 30 determines that the zoom operation is being performed during a period in which the zoom lever is continuously manipulated.

When the user manipulates the zoom lever, the normal period tnor proceeds to a zoom period tzm of FIG. 11B in an operation of the imaging apparatus 10. That is, the zoom lens starts moving. When the state in which the manipulation of the zoom lever is detected continues for a time equal to or greater than a time set as a zoom determination period Tzon, the control unit 30 (the camerawork determination unit 30b) determines that the zoom is performed and sets a zoom execution flag Fzon to "1." Accordingly, the determination execution flag Fdon for controlling the start of the main subject determination is set to "1." When the determination execution flag Fdon=1 is set, the main subject determination process is performed.

The zoom determination period Tzon is a period provided to determine that a continuous zoom operation is performed. That is, the zoom determination period Tzon is a period provided to exclude a case in which the user manipulates the zoom lever for a short time.

To set the determination execution flag Fdon according to the zoom operation, the control unit 30 (the camerawork determination unit 30b) repeatedly performs the process of FIG. 11A.

The control unit 30 acquires the manipulation state of the zoom lever in Step F300 and sets a variable Szoom. For example, when the zoom lever is manipulated, the variable Szoom=1 is set. When the zoom lever is not manipulated, the variable Szoom=0 is set.

In Step F301, whether the zoom lever is currently pushed, that is, the zoom operation is performed, is determined with reference to the variable Szoom.

When the variable Szoom=0 is set and the zoom lever is currently not pushed, the control unit 30 causes the process to proceed to Step F306, sets a count value ZoomOnCnt to zero, and sets the zoom execution flag Fzon to zero. The count value ZoomOnCnt is a count value for determining whether the zoom determination period Tzon has passed.

Then, in Step F307, the value of the zoom execution flag Fzon is substituted to the determination execution flag Fdon. That is, in this case, the determination execution flag Fdon=0 is set.

When the variable Szoom=1 is set and the zoom lever is currently pushed, the control unit 30 causes the process to proceed from Step F301 to Step F302 and increments the count value ZoomOnCnt.

Then, in Step F303, the control unit 30 compares the count value ZoomOnCnt to the zoom determination period Tzon. When the count value ZoomOnCnt does not reach the zoom determination period Tzon, the zoom execution flag Fzon is set to zero in Step F305. Then, in Step F307, the value of the zoom execution flag Fzon is substituted into the determination execution flag Fdon. Even in this case, the determination execution flag Fdon=0 is set.

When it is determined in Step F303 that the count value ZoomOnCnt reaches the zoom determination period Tzon, the control unit 30 sets the zoom execution flag Fzon=1 in Step F304. That is, it is confirmed that the zoom is continuously being performed during the zoom determination period Tzon, and thus it is determined that the zoom is continuously performed.

Then, in Step F307, the value of the zoom execution flag Fzon is substituted into the determination execution flag Fdon. In this case, the determination execution flag Fdon=1 is set.

The determination execution flag Fdon is set in such a process and the main subject determination process is performed based on the determination execution flag Fdon.

While the zoom also continues thereafter, the process in which Steps F303→F304→F307 proceed is repeated and the state of the determination execution flag Fdon=1 is maintained. Thereafter, when the zoom operation ends, the process in which Steps F301→F306→F307 proceed is performed, and thus the determination execution flag Fdon=0 is set.

In the main subject determination process of FIG. 8, since the actual main subject determination is performed during the period of the determination execution flag Fdon=1 (see Step F104 of FIG. 8), the main subject determination is performed with a period in which the zoom continues set as a limit.

According to the above-described third process example, a subject close to the determination reference point SP during the zoom operation is determined to be the main subject. In many cases, the user performs the zoom operation while catching a subject desired to be imaged within a captured image. That is, the subject close to the determination reference point SP during the zoom is a subject targeted by the user in many cases, and thus it is possible to increase a probability of the main subject determination result desired by the user being obtained. The improvement in the operability of the user is realized through the automatic main subject determination.

<7. Fourth Process Example Post-Zoom Determination>

An example in which the main subject determination is performed after a zoom operation will be described as the fourth process example. In this case, the control unit 30 (the camerawork determination unit 30b) determines that the user ends the zoom operation of the imaging apparatus 10. Then, after the zoom operation ends, the main subject determination unit 30a performs the main subject determination process.

Figure 12:
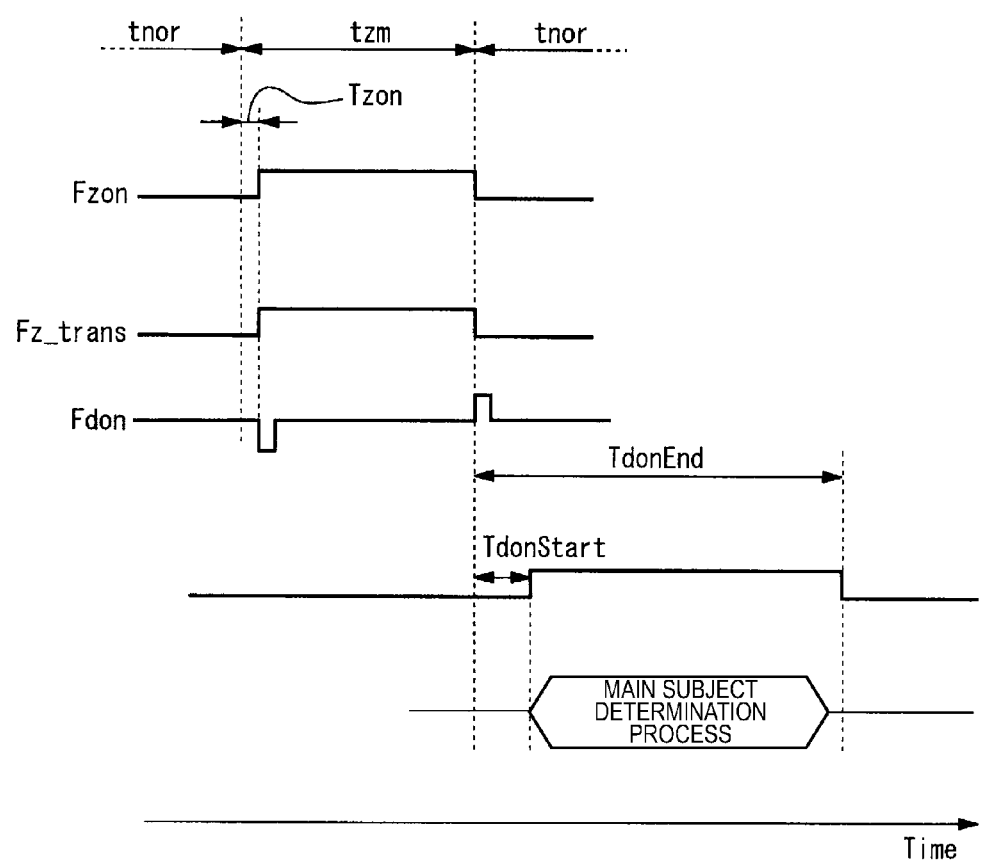
FIG. 12 is an explanatory diagram of a camerawork determination process of a fourth process example.

FIG. 12 shows a post-zoom determination operation.

The determination during the zoom operation, that is, the zoom execution flag Fzon is set by detecting that the user continuously manipulates the zoom lever, as in the above-described third process example.

Here, for the zoom execution flag Fzon, a zoom transition flag Fz_trans is set by comparing (subtracting) a current value to an immediately previous value. The zoom execution flag Fzon is "1" or "0." Therefore, when the current value is subtracted from the value at the immediately previous time point of the zoom execution flag Fzon, one of "0," "+1," and "−1" is obtained. That is, at a time point at which the zoom execution flag Fzon rises, the zoom transition flag Fz_trans=−1 is set with 0-1. At a time point at which the zoom execution flag Fzon falls, the zoom transition flag Fz_trans=+1 is set with 1-0. In other cases, the zoom transition flag Fz_trans=0 is set with 0-0 or 1-1.

That is, the zoom transition flag Fz_trans serves as differential information of the zoom execution flag Fzon and is specifically information detecting the start or end of the continuous zoom operation. In this case, the zoom transition flag Fz_trans=+1 serves as information indicating a zoom end time point.

The determination execution flag Fdon is considered to be "1" at a time point at which the determination start standby period TdonStart passes from a time point at which the zoom transition flag Fz_trans=+1 is set. Thus, when the determination execution flag Fdon=1 is set, the actual main subject determination process starts.

The upper limit period TdonEnd is set and the determination execution flag Fdon is considered to be "0" at a time point at which the upper limit period TdonEnd passes from the time point at which the zoom transition flag Fz_trans=+1 is set. Thus, when the determination execution flag Fdon=0 is set, a period in which the actual main subject determination process is performed is restricted. The determination start standby period TdonStart and the upper limit period TdonEnd are considered to be, for example, fixed values.

Figure 13:
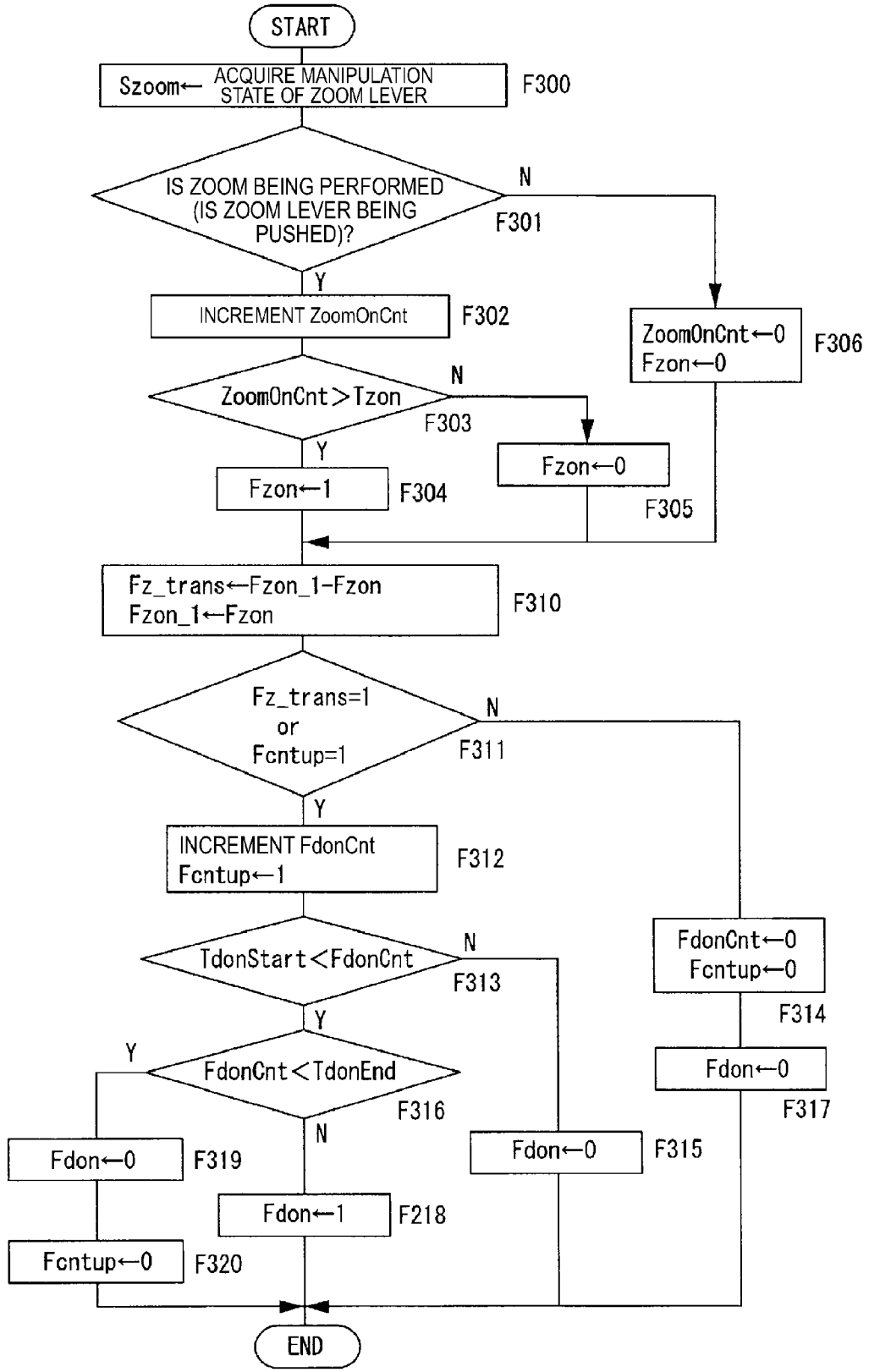
FIG. 13 is a flowchart of the camerawork determination process of the fourth process example.

The post-zoom determination process is performed as in FIG. 13. The control unit 30 (the camerawork determination unit 30b) repeats the process of FIG. 13 and sets the determination execution flag Fdon.

In FIG. 13, Steps F300 to F306 are the same as Steps F300 to F306 of FIG. 11A. That is, this process is a process of setting the zoom execution flag Fzon=1 at the time of detection of the continuous manipulation of the zoom lever during a period exceeding the zoom determination period Tzon and setting the zoom execution flag Fzon=0 before the detection and at the time of non-manipulation of the zoom lever.

In Step F310, the zoom transition flag Fz_trans is set. That is, "the zoom transition flag Fz_trans=(a previous zoom execution flag Fzon_1)−(the zoom execution flag Fzon)" is set.

The previous zoom execution flag Fzon_1 is a value of the zoom execution flag Fzon at the time point of the previous Step F310. Accordingly, the zoom transition flag Fz_trans is one of "0," "+1," and "−1" described in FIG. 12.

To use as the previous zoom execution flag Fzon_1 in the subsequent Step F310, the value of the current zoom execution flag Fzon is substituted into the previous zoom execution flag Fzon_1.

In Step F311, the control unit 30 determines whether one of the zoom transition flag Fz_trans=1 or the count flag Fcntup=1 is satisfied. The count flag Fcntup is a flag that is considered to be "1" in Step F312 and considered to be "0" in Step F320 and is used for process branch control.

The count flag Fcntup is "1" during only a period in which the zoom transition flag Fz_trans becomes "1" and then reaches the upper limit period TdonEnd. Accordingly, the count flag Fcntup is "0" before the zoom transition flag Fz_trans becomes "1."

When the count flag Fcntup=0 is set and the zoom transition flag Fz_trans is "0" or "−1," the control unit 30 causes the process to proceed to Step F314, resets the count value Fdoncnt to zero, and sets the count flag Fcntup to "0." The count value Fdoncnt is a value of the counter for controlling a period in which the determination execution flag Fdon is "1."

Then, the control unit 30 sets the determination execution flag Fdon=0 in Step F317.

As illustrated in FIG. 12, when the zoom operation ends and the zoom execution flag Fzon falls, the zoom transition flag Fz_trans=1 is set.

In this case, the zoom transition flag Fz_trans=1 is set, and thus the control unit 30 causes the process to proceed from Step F311 to Step F312 and increments the count value Fdoncnt. The count flag Fcntup=1 is set.

In Step F313, the count value Fdoncnt is compared to the determination start standby period TdonStart shown in FIG. 12.

When the zoom transition flag Fz_trans=1 is set at first, the count value Fdoncnt does not exceed the determination start standby period TdonStart. Therefore, the process proceeds to Step F315 and the determination execution flag Fdon=0 is set.

In the process of FIG. 13 at a subsequent time point, the zoom transition flag Fz_trans returns to "0." However, since the count flag Fcntup is "1," the control unit 30 causes the process to proceed from Step F311 to Step F312 as in the previous time, increments the count value Fdoncnt, and continuously sets the count flag Fcntup=1.

That is, after the zoom transition flag Fz_trans=1 is set, the count flag Fcntup=1 is set, and thus the process is considered to continuously proceed to Step F312.

When the count value Fdoncnt exceeds the determination start standby period TdonStart in Step F313 of a certain time point, the control unit 30 causes the process to proceed to Step F316 and compares the count value Fdoncnt to the upper limit period TdonEnd. At first, since the count value Fdoncnt does not reach the upper limit period TdonEnd, the control unit 30 causes the process to proceed to Step F318 and sets the determination execution flag Fdon=1.

Thus, in the main subject determination process shown in FIG. 8, the actual determination process (Steps F105 to F115) starts.

Thereafter, since the count flag Fcntup=1 continues in the process of FIG. 13, the progress state of Steps F313→F316 is repeated while the count value Fdoncnt is incremented in Step F312. The determination execution flag Fdon=1 is maintained in Step F318 until the count value Fdoncnt reaches the upper limit period TdonEnd.

Thereafter, in Step F316 of a certain time point, the count value Fdoncnt exceeds the upper limit period TdonEnd. In this case, the control unit 30 causes the process to proceed to Step F319 and sets the determination execution flag Fdon=0. Accordingly, even when the main subject determination process is not completed in the process of FIG. 8, the actual determination process (Steps F105 to F115) ends at this time point.

In Step F320, the count flag Fcntup is assumed to be set to "0."

The determination execution flag Fdon shown in FIG. 12 is generated in such a process and the main subject determination process is performed based on the determination execution flag Fdon.

After the determination execution flag Fdon=0 is considered in Step F319, the processes of Steps F314 and F317 are performed and the state of the determination execution flag Fdon=0 continues until the zoom transition flag Fz_trans=1 is subsequently set.

In the case of the third process example, the main subject is set during a post-zoom period, but the post-zoom period can be estimated to be a period immediately after a target subject targeted by the photographer is zoomed in on and an angle of view is set. Thus, there is a high probability of the target subject being present in the image data. Accordingly, by determining a subject stabilized in the state close to the determination reference point SP as the main subject through the process of FIG. 8 during the post-zoom period, the setting of the main subject with high accuracy is realized. The improvement in the operability of the user is realized through the automatic main subject determination.

According to the camerawork determination process of FIG. 13, the determination execution flag Fdon is considered to be "1" after the zoom transition flag Fz_trans=1 is set and the determination start standby period TdonStart passes. This means that the main subject determination is not performed during this period in consideration of the fact that a captured image slightly sways immediately after the zooming manipulation of the user (camera-shake by the manipulation).

By appropriately setting the determination start standby period TdonStart, it is possible to further improve the accuracy of the main subject determination. In the above-described second process example, the determination start standby period TdonStart has been used even after the pan transition flag Fp_trans=1, but the swaying of the captured image after the zoom is considered to be less than the swaying of the captured image after the pan. Accordingly, the determination start standby period TdonStart in the case of the fourth process example is preferably set to be shorter than the determination start standby period TdonStart of the second process example.

In some cases, setting the determination start standby period TdonStart=0 can be considered. Thus, the main subject determination process is performed from a time point at which the zoom transition flag Fz_trans=1 is set, that is, a time point at which the end of the zoom is detected. This is appropriate for a case in which the main subject is desired to be performed quickly.

According to the camerawork determination process of FIG. 13, the upper limit period TdonEnd is provided to restrict the period in which the main subject determination is performed. Performing the main subject determination process during a period that is too long after the zoom may result in separation from an operation situation in the adjusting of a zoom angle of view on the target subject through the zooming, and the accuracy of the presence of the main subject at a position close to the determination reference point SP is lowered. Accordingly, by restricting the period after the zoom to some extent, it is possible to increase the accuracy of the main subject determination.

Of course, a process example in which the state of the determination execution flag Fdon=1 is maintained without providing the upper limit until the main subject determination is performed can also be considered.

<8. Fifth Process Example Post-Pan Zoom Operation Determination>

An example in which the main subject determination is performed during a zoom operation when the zoom operation is performed continuously after a pan operation will be described as a fifth process example.

Figure 14:
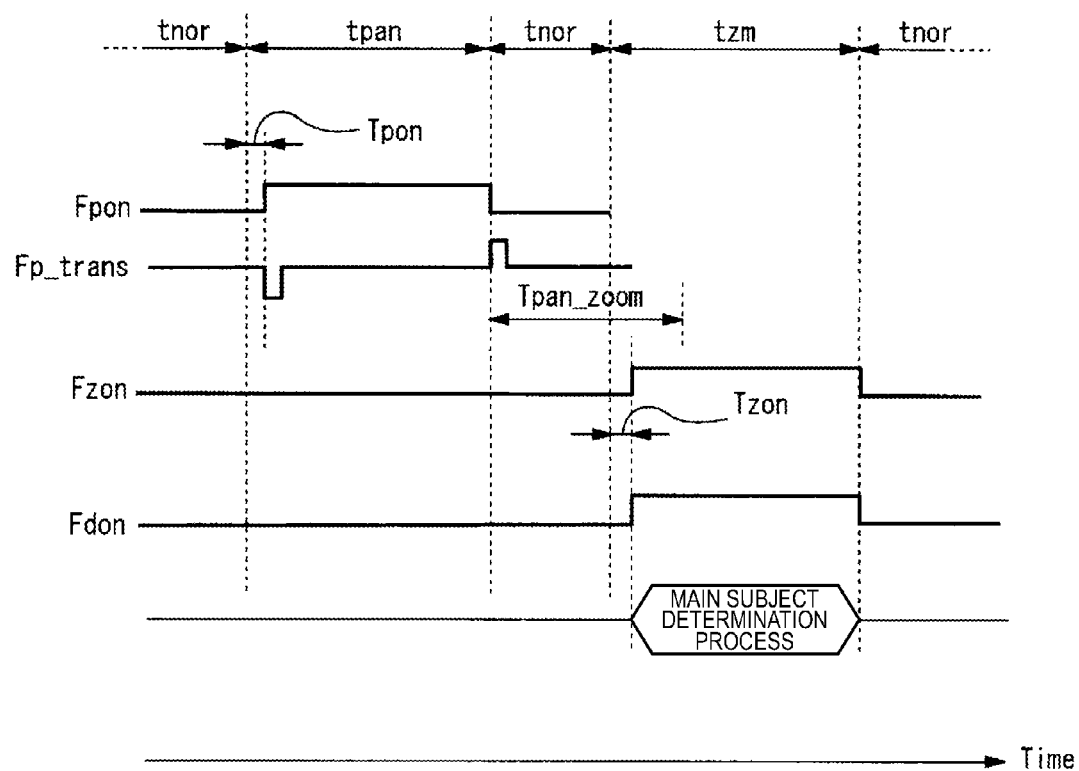
FIG. 14 is an explanatory diagram of a camerawork determination process of a fifth process example.

FIG. 14 shows a post-pan zoom operation determination process.

First, for determination of the end of the pan operation, the idea described in the second process example is used. That is, the pan execution flag Fpon is set based on a comparison result obtained by comparing the detection signal Sg from the gyro sensor to the threshold value range Sth, as in the first process example. Then, for the pan execution flag Fpon, the pan transition flag Fp_trans is set by comparing (subtracting) a current value to an immediately previous value. The pan transition flag Fp_trans=+1 serves as information indicating a pan end time point.

Next, for example, it is determined whether a zoom operation is detected within a transition limit period Tpan_zoom considered to be a fixed value from the pan end time point. When the zoom operation is not detected within the transition limit period Tpan_zoom, it is determined that a continuous operation from the pan to the zoom is not performed and the determination execution flag Fdon is not set to "1." That is, the main subject determination is not performed.

For detection of the zoom operation, the idea described in the third process example is used. That is, when the state in which the manipulation of the zoom lever is detected continues for a time equal to or greater than a time set as the zoom determination period Tzon, the zoom is determined to be performed and the zoom execution flag Fzon is assumed to be set to "1." Accordingly, the determination execution flag Fdon for controlling the start of the main subject determination is set to "1." When the determination execution flag Fdon=1 is set, the main subject determination process is performed.

Figure 15:
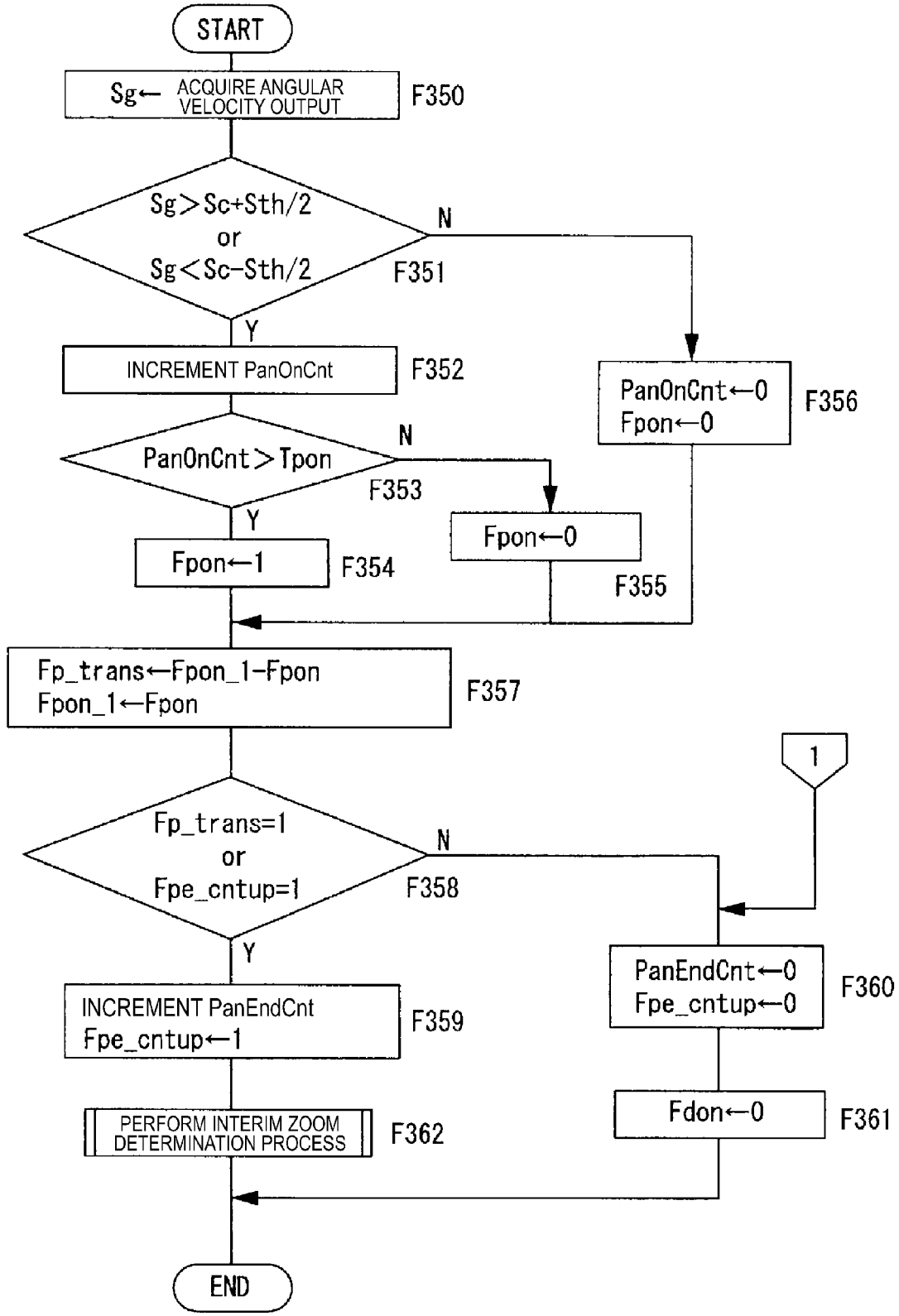
FIG. 15 is a flowchart of the camerawork determination process of the fifth process example.
Figure 16:
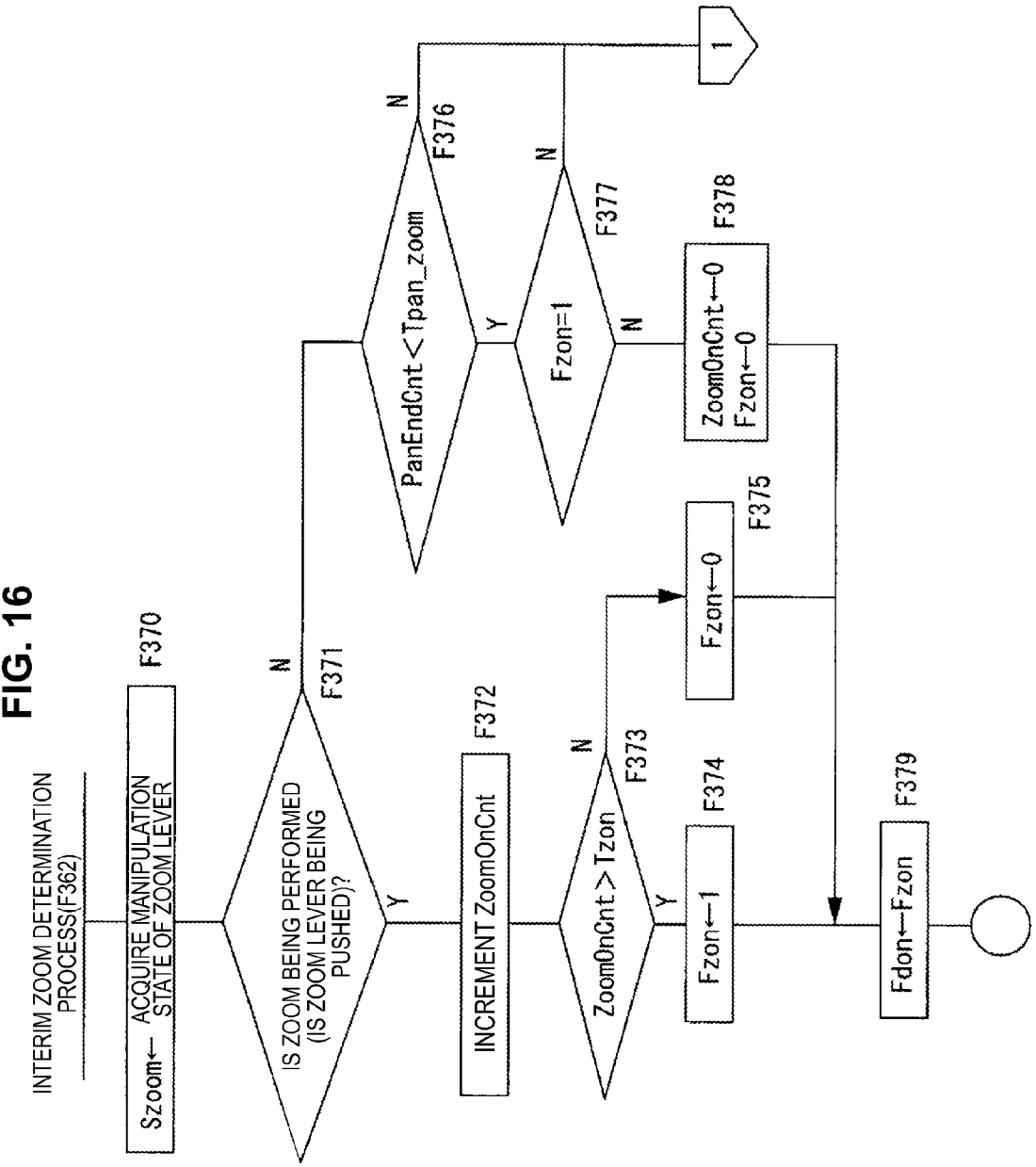
FIG. 16 is a flowchart of an interim zoom determination process of the fifth process example.

To set the determination execution flag Fdon through the post-pan zoom operation determination, the control unit 30 (the camerawork determination unit 30b) repeatedly performs the processes of FIGS. 15 and 16.

Since Steps F350 to F357 of FIG. 15 are the same as Steps F200 to F206 of FIG. 10, the repeated description will be omitted. The processes are processes of setting the pan transition flag Fp_trans and detecting the pan end time point at which the pan transition flag Fp_trans=+1 is set.

In Step F358, the control unit 30 determines whether one of the pan transition flag Fp_trans=1 and a count flag Fpe_cntup=1 is satisfied. The count flag Fpe_cntup is a flag that is considered to be "1" in Step F359 and is used for process branch control. Specifically, the count flag Fpe_cntup is a flag that is considered to be "1" at the pan end time point and is subsequently configured such that Steps F359 and F362 are performed.

When the count flag Fpe_cntup=0 is set and the pan transition flag Fp_trans is "0" or "−1," that is, until the end of the pan is detected, the control unit 30 causes the process to proceed Step F358 to Step F360, resets the count value PanEndCnt to zero, and sets the count flag Fpe_cntup to "0."

The count value PanEndCnt is a value of the counter counting the transition limit period Tpan_zoom shown in FIG. 14.

Then, the control unit 30 sets the determination execution flag Fdon=0 in Step F361.

As shown in FIG. 14, the pan transition flag Fp_trans=1 is set at a time point at which the pan operation ends. In this case, the control unit 30 causes the process to proceed from Step F358 to Step F359 and increments the count value PanEndCnt. That is, the transition limit period Tpan_zoom starts to be counted. The count flag Fpe_cntup=1 is set.

Then, in Step F362, the control unit 30 performs an interim zoom determination process. The interim zoom determination process is shown in FIG. 16.

In the process of FIG. 15 at a subsequent time point, the pan transition flag Fp_trans returns to "0." However, since the count flag Fpe_cntup is set to "1," the control unit 30 causes the process to proceed from Step F358 to Steps F359 and F362 as in the previous time. When the count flag Fpe_cntup is considered to be "0" when the zoom operation is not detected within the transition limit period Tpan_zoom or the zoom operation ends. However, until then, Steps F359 (the increment in the count value PanEndCnt) and F362 (the interim zoom determination process) are repeatedly performed.

In the interim zoom determination process (F362) of FIG. 16, the idea of the third process example is basically used.

The control unit 30 acquires the manipulation state of the zoom lever in Step F370 of FIG. 16 and sets a variable Szoom. For example, when the zoom lever is manipulated, the variable Szoom=1 is set. When the zoom lever is not manipulated, the variable Szoom=0 is set. In Step F371, whether the zoom lever is currently pushed is determined with reference to the variable Szoom.

Immediately after the end of the pan, the control unit 30 causes the process to proceed from Step F371 to Step F376 during a period in which the zoom is not yet performed and confirms whether the count value PanEndCnt does not reach the transition limit period Tpan_zoom.

When the count value does not reach the transition limit period Tpan_zoom immediately after the pan, the process proceeds from Step F376 to Step F377. However, at this time point, since the zoom execution flag Fzon=0 is set, the process proceeds to Step F378, the count value ZoomOnCnt is set to zero, and the zoom execution flag Fzon is set to zero. The count value ZoomOnCnt is a count value for determining whether the zoom determination period Tzon has passed from the detection of the zoom manipulation of the user (for determining a continuous zoom manipulation).

Then, in Step F379, the value of the zoom execution flag Fzon is substituted into the determination execution flag Fdon. That is, in this case, the determination execution flag Fdon=0 is set.

When the count value PanEndCnt starting to be counted after the pan reaches the transition limit period Tpan_zoom, that is, the zoom manipulation of the user is not detected within the transition limit period Tpan_zoom, the process proceeds from Step F376 to Step F360 of FIG. 15. In this case, the post-pan zoom operation is not detected. The determination execution flag Fdon remains "0."

When the variable Szoom=1 is set and the zoom lever is currently pushed, the control unit 30 causes the process to proceed from Step F371 to Step F372 and increments the count value ZoomOnCnt. Then, in Step F373, the control unit 30 compares the count value ZoomOnCnt to the zoom determination period Tzon. When the count value ZoomOnCnt does not reach the zoom determination period Tzon, the zoom execution flag Fzon is set to zero in Step F375. Then, in Step F379, the value of the zoom execution flag Fzon is substituted into the determination execution flag Fdon. Even in this case, the determination execution flag Fdon=0 is set.

When the zoom determination period Tzon does not come and the zoom manipulation ends despite the fact that the zoom manipulation is instantly detected within the transition limit period Tpan_zom, the process proceeds to Step F371→Step F376 after the end of the instant manipulation. Accordingly, when the zoom manipulation is not performed and the transition limit period Tpan_zoom comes, the process proceeds to Step F360 of FIG. 15 and the post-pan zoom operation is not detected (the determination execution flag Fdon=0).

When it is determined in Step F373 that the count value ZoomOnCnt reaches the zoom determination period Tzon, the control unit 30 sets the zoom execution flag Fzon=1 in Step F374. That is, it is confirmed that the zoom is continuously being performed during the zoom determination period Tzon, and thus it is determined that the zoom is continuously performed. Then, in Step F379, the value of the zoom execution flag Fzon is substituted into the determination execution flag Fdon. Accordingly, the determination execution flag Fdon=1 is set. Accordingly, the main subject determination is performed in the process of FIG. 8 based on the determination execution flag Fdon.

While the zoom also continues thereafter, the process in which Steps F373→F374→F379 proceed is repeated and the state of the determination execution flag Fdon=1 is maintained.

Thereafter, when the zoom operation ends, the process in which Steps F371→F376 proceed is performed. In this case, even when the count value PanEndCnt is equal to or greater than the transition limit period Tpan_zoom or does not reach the transition limit period Tpan_zoom, the zoom execution flag Fzon=1 is set. Therefore, the process proceeds to Step F376 or F377 to Steps F360 and F361 of FIG. 15. Accordingly, the count value PanEndCnt is reset to zero, the count flag Fpe_cntup=0 is considered, and the determination execution flag Fdon=0 is further considered. That is, the main subject determination is performed setting a period in which the zoom continues as a limit.

According to the above-described fifth process example, a subject close to the determination reference point SP during the post-pan zoom operation is determined to be the main subject. In many cases, when the user searches for a target subject through panning and catches the target subject, the user performs zooming to adjust the angle of view. Accordingly, the subject close to the determination reference point SP during the post-pan zoom is a subject targeted by the user in many cases, and thus it is possible to increase a probability of the main subject determination result desired by the user being obtained. The improvement in the operability for the user is realized through the automatic main subject determination.

In the above-described process example, since the transition limit period Tpan_zoom from the pan to the zoom is provided, it is possible to accurately determine continuous operations of the pan→the zoom.

<9. Sixth Process Example Post-Pan Post-Zoom Determination>

An example in which the main subject determination is performed after the end of a zoom operation when the zoom operation is performed continuously after a pan operation will be described as a sixth process example.

Figure 17:
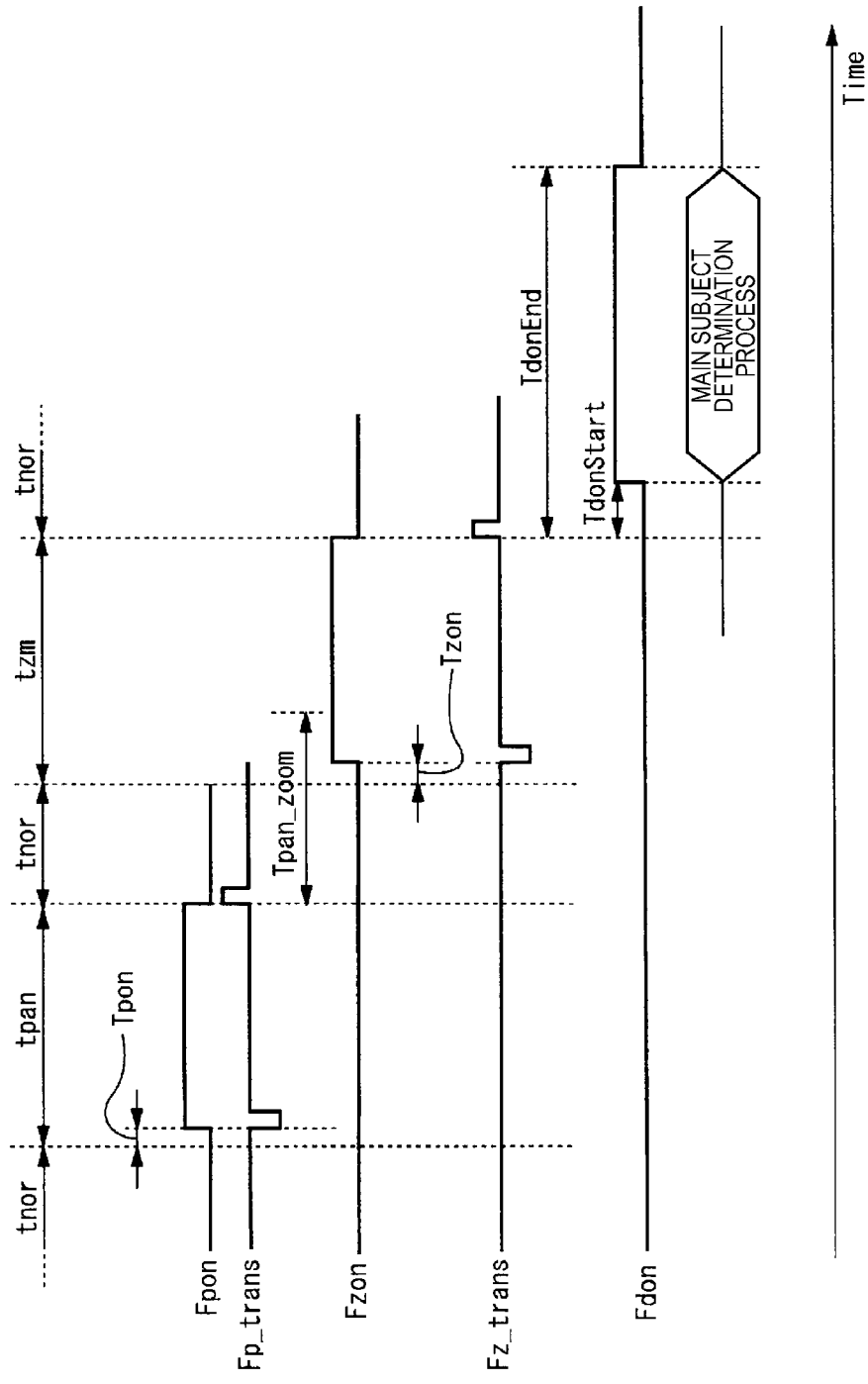
FIG. 17 is an explanatory diagram of a camerawork determination process of a sixth process example.

FIG. 17 shows an operation of the post-pan post-zoom determination process.

First, determination (the processes of the pan execution flag Fpon and the pan transition flag Fp_trans) of the end of the pan operation and determination (the process of the zoom execution flag Fzon) of the zoom operation within the transition limit period Tpan_zoom from the end of the pan are the same as those of the fifth process example.

To detect the end of the post-pan zoom operation, the idea described in the fourth process example is used. That is, for the zoom execution flag Fzon, the zoom transition flag Fz_trans is set by comparing (subtracting) a current value to an immediately previous value. The zoom transition flag Fz_trans=+1 serves as information indicating a zoom end time point.

The determination execution flag Fdon is considered to be "1" at a time point at which the determination start standby period TdonStart passes from a time point at which the zoom transition flag Fz_trans=+1 is set. Thus, when the determination execution flag Fdon=1 is set, the actual main subject determination process starts. The upper limit period TdonEnd is set and the determination execution flag Fdon is considered to be "0" at a time point at which the upper limit period TdonEnd passes from the time point at which the zoom transition flag Fz_trans=+1 is set. Thus, when the determination execution flag Fdon=0 is considered, a period in which the actual main subject determination process is performed is restricted.

Figure 18:
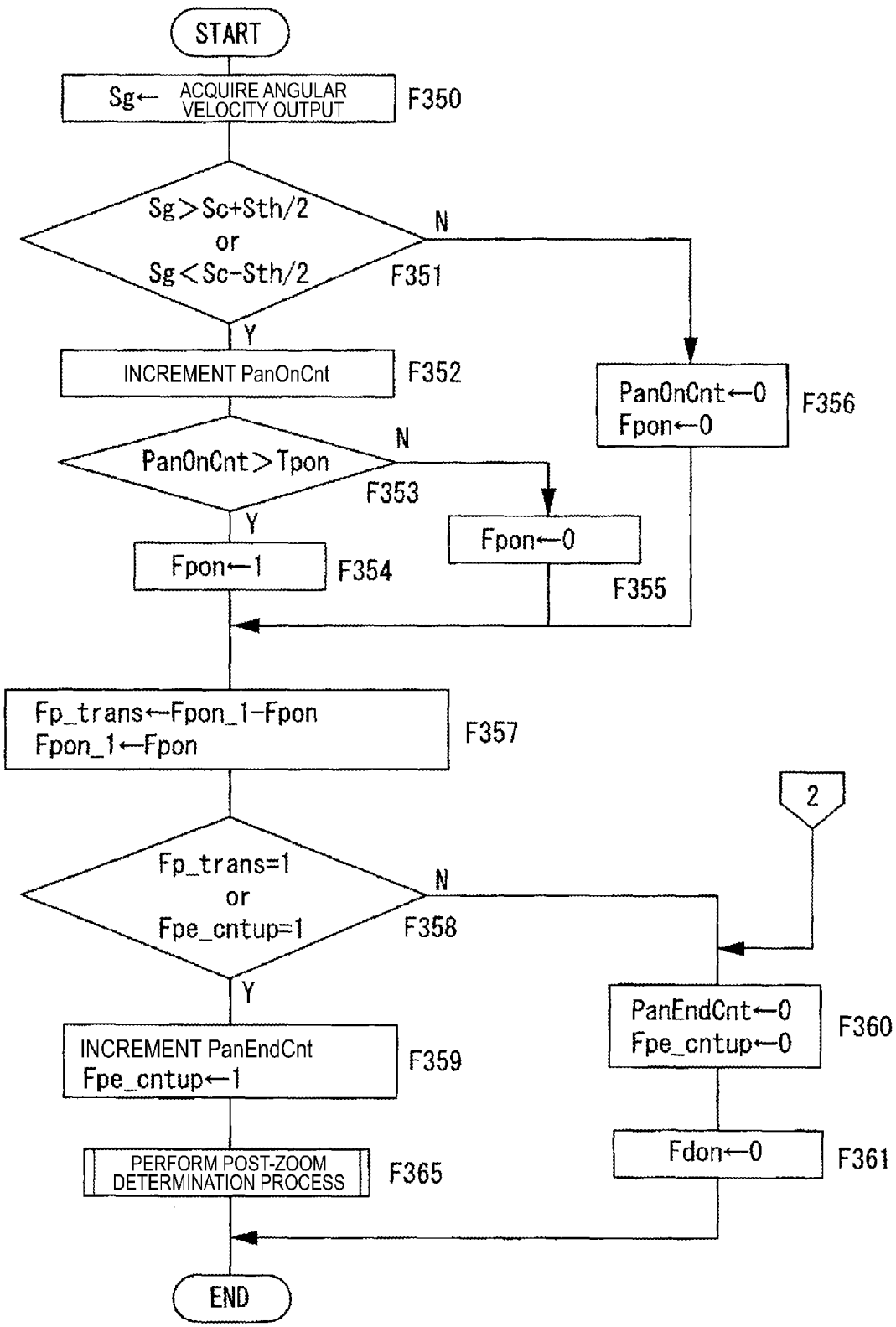
FIG. 18 is a flowchart of the camerawork determination process of the sixth process example.
Figure 19:
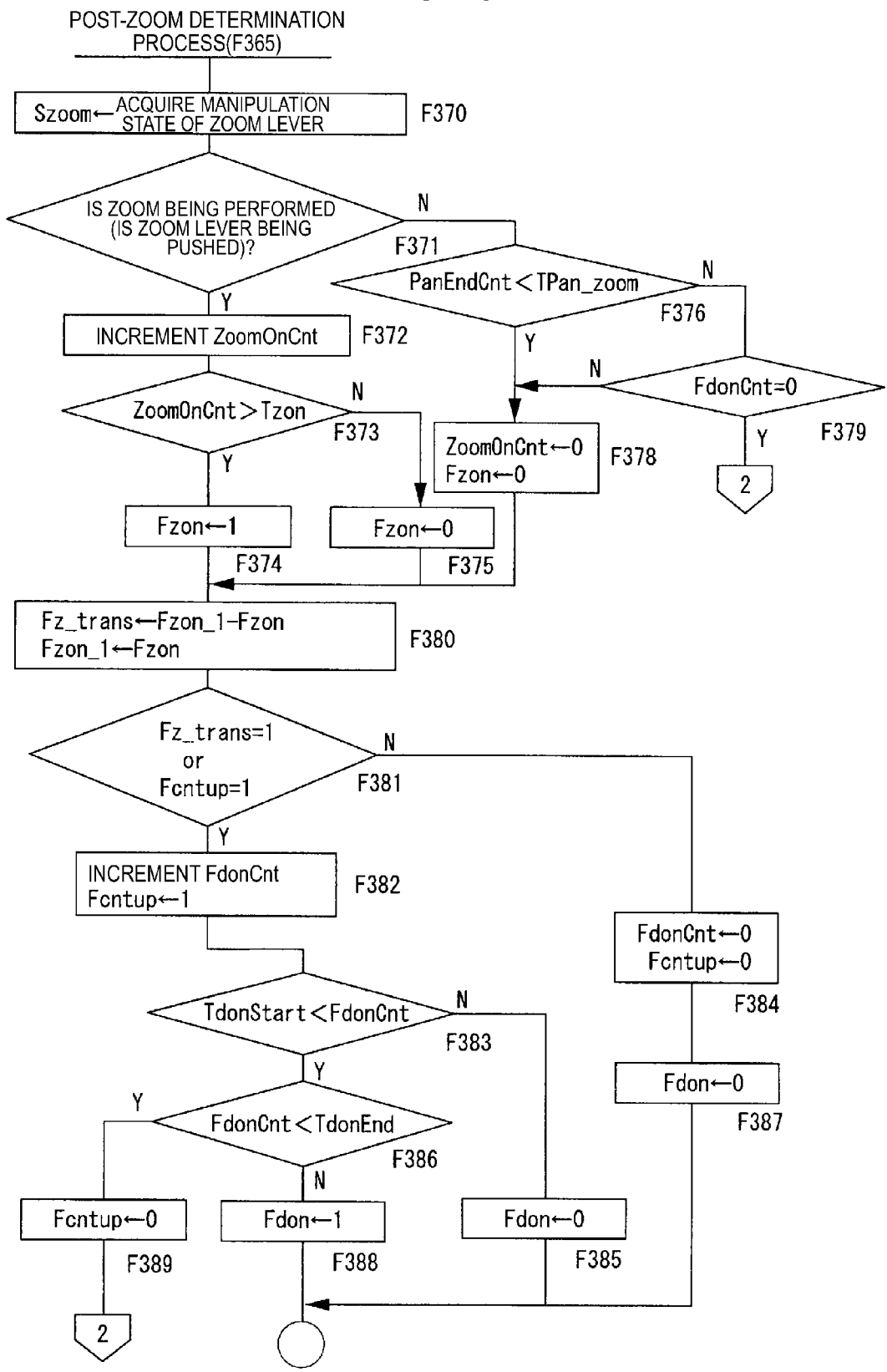
FIG. 19 is a flowchart of a post-zoom determination process of the sixth process example.

The post-pan post-zoom determination process is performed as in FIGS. 18 and 19. The control unit 30 (the camerawork determination unit 30b) repeats the processes of FIGS. 18 and 19 and sets the determination execution flag Fdon.

Steps F350 to F361 of FIG. 18 are the same as those of FIG. 15 and the same step numbers are given. That is, the control unit 30 sets the pan transition flag Fp_trans in Steps F350 to F357 and detects the pan end time point. Until the end of the pan is detected, Steps F358→F360→F361 proceed and the determination execution flag Fdon=0 is set.

In FIG. 18, after the end of the pan is detected, Steps F358→F359→F365 proceed and the control unit 30 performs the post-zoom determination process of FIG. 19 in Step F365.

In the post-zoom determination process (F365) of FIG. 19, the idea of the fourth process example is basically used. Steps F370 to F376 and F378 are the same as the processes of the same step numbers of FIG. 16. That is, Steps F370 to F376 and F378 are a process of detecting that a continuous zoom operation is performed within the transition limit period Tpan_zoom after the pan. Since the process after the end of the zoom is performed after Step F380, there is no process corresponding to Step F377 of FIG. 16.

When the zoom is not performed within the transition limit period Tpan_zoom after the pan, the process proceeds from Step F376 to Step F379. At this time point, the count value FdonCnt=0 is set. This is because the count value FdonCnt is counted up in Step F382 from the zoom end time point. Therefore, at this time point, the process proceeds from Step F379 to Step F360 of FIG. 18. In this case, the post-pan zoom operation is not detected. The determination execution flag Fdon remains "0."

Steps F380 to F388 are the same processes as Steps F310 to F318 of FIG. 13. Accordingly, the following processes are performed.

Before the start of the zoom and during the operation, the control unit 30 causes the process to proceed to Steps F381→F384→F387 and sets the count value Fdoncnt=0 and the count flag Fcntup=0, and the determination execution flag Fdon=0.

At the zoom end time point, the zoom transition flag Fz_trans=1 is set, and thus the control unit 30 causes the process to proceed to Step F381 to Step F382, increments the count value Fdoncnt, and sets the count flag Fcntup=1. Thereafter, the count flag Fcntup=1 is set, and thus the control unit 30 causes the process to proceed from Step F381 to Step F382 and continuously increments the count value Fdoncnt. Here, until the determination start standby period TdonStart passes, the process proceeds from Step F383 to Step F385 and the determination execution flag Fdon=0 is considered.

After the zoom end time point, the process of FIG. 19 proceeds to Step F371→F376 and the count value PanEnd-Cnt exceeds the transition limit period Tpan_zoom in many cases. However, since increment of the count value Fdoncnt has already started, the processes of Steps F379→F378→F380→F381→F382 are performed.

When the count value Fdoncnt exceeds the determination start standby period TdonStart in Step F383 of a certain time point, the control unit 30 causes the process to proceed to Step F386 and compares the count value Fdoncnt to the upper limit period TdonEnd. Then, until the upper limit period TdonEnd comes, the control unit 30 allows the process to proceed to Step F388 and sets the determination execution flag Fdon=1. Thus, in the post-pan post-zoom, the actual determination process (Steps F105 to F115) is performed in the main subject determination process shown in FIG. 8.

Thereafter, when the count value Fdoncnt exceeds the upper limit period TdonEnd, the control unit 30 set the count flag Fcntup=0 in Step F389. Further, the process proceeds to Steps F360 and F361 of FIG. 18, the count value PanEnd-Cnt=0 and the count flag Fpe_cntup=0 are considered and the determination execution flag Fdon=0 is further considered. That is, the main subject determination is performed setting the upper limit period TdonEnd in the post-pan post-zoom as a limit.

According to the above-described sixth process example, a subject close to the determination reference point SP in the post-pan post-zoom is determined to be the main subject. In many cases, when the user searches for a target subject and catches the target subject through panning, the user performs zooming to adjust the angle of view. Accordingly, after the zoom is performed after the pan, the subject close to the determination reference point SP is a subject targeted by the user in many cases, and thus it is possible to increase a probability of the main subject determination result desired by the user being obtained. The improvement in the operability of the user is realized through the automatic main subject determination.

In the above-described process example, since the transition limit period Tpan_zoom from the pan to the zoom is provided, it is possible to accurately determine continuous operations of the pan→the zoom.

Setting the determination start standby period TdonStart=0 can also be considered. In this case, the main subject determination process is performed instantly from a time point at which the end of the post-pan zoom is detected.

The upper limit period TdonEnd may not be provided and the state of the determination execution flag Fdon=1 may remain until the main subject determination is performed.

<10. Seventh Process Example Post-Zoom Pan Operation Determination>

An example in which the main subject determination is performed during a pan operation when the pan operation is performed continuously after a zoom operation will be described as a seventh process example.

Figure 20:
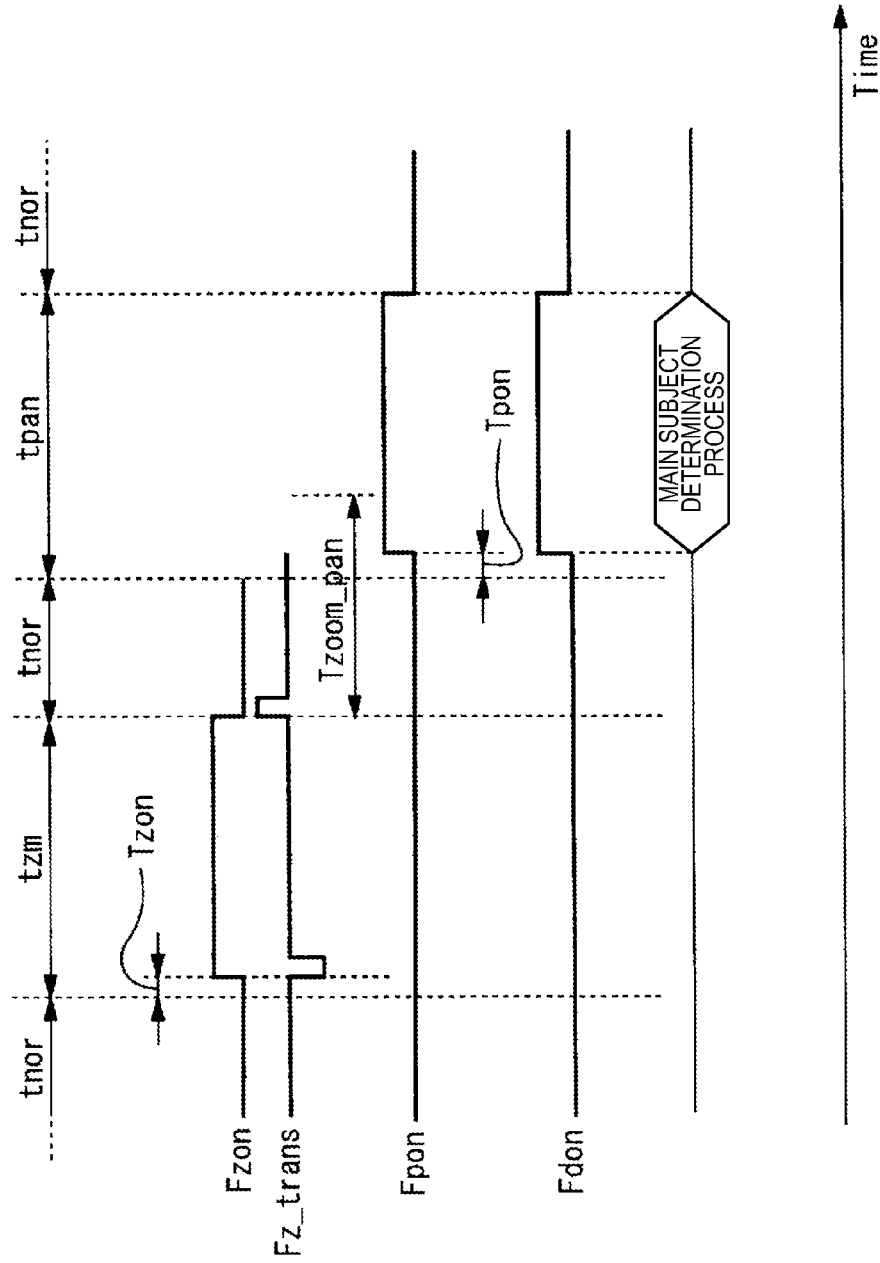
FIG. 20 is an explanatory diagram of a camerawork determination process of a seventh process example.

FIG. 20 shows a post-zoom pan operation determination process.

First, in determination of the end of the zoom operation, the idea described in the fourth process example is used. That is, the zoom execution flag Fzon is set by determining whether the user continues a zoom lever manipulation. Further, for the zoom execution flag Fzon, the zoom transition flag Fz_trans is set by comparing (subtracting) a current value to an immediately previous value. The zoom transition flag Fz_trans=+1 serves as information indicating a pan end time point.

Next, for example, it is determined whether a pan operation is detected within a transition limit period Tzoom_pan considered to be a fixed value from the zoom end time point. When the pan operation is not detected within the transition limit period Tzoom_pan, it is determined that a continuous operation from the zoom to the pan is not performed and the determination execution flag Fdon is not set to "1." That is, the main subject determination is not performed.

For detection of the pan operation, the idea described in the first process example is used. That is, the pan execution flag Fpon is set based on a comparison result obtained by comparing the detection signal Sg from the gyro sensor to the threshold value range Sth. When the detection signal Sg exceeds the threshold value range Sth continuously for a time equal to or greater than a certain time set as the pan determination period Tpon, the pan is determined to be performed and the pan execution flag Fpon is set to "1." Accordingly, the determination execution flag Fdon for controlling the start of the main subject determination is set to "1." When the determination execution flag Fdon=1 is set, the main subject determination process is performed.

Figure 21:
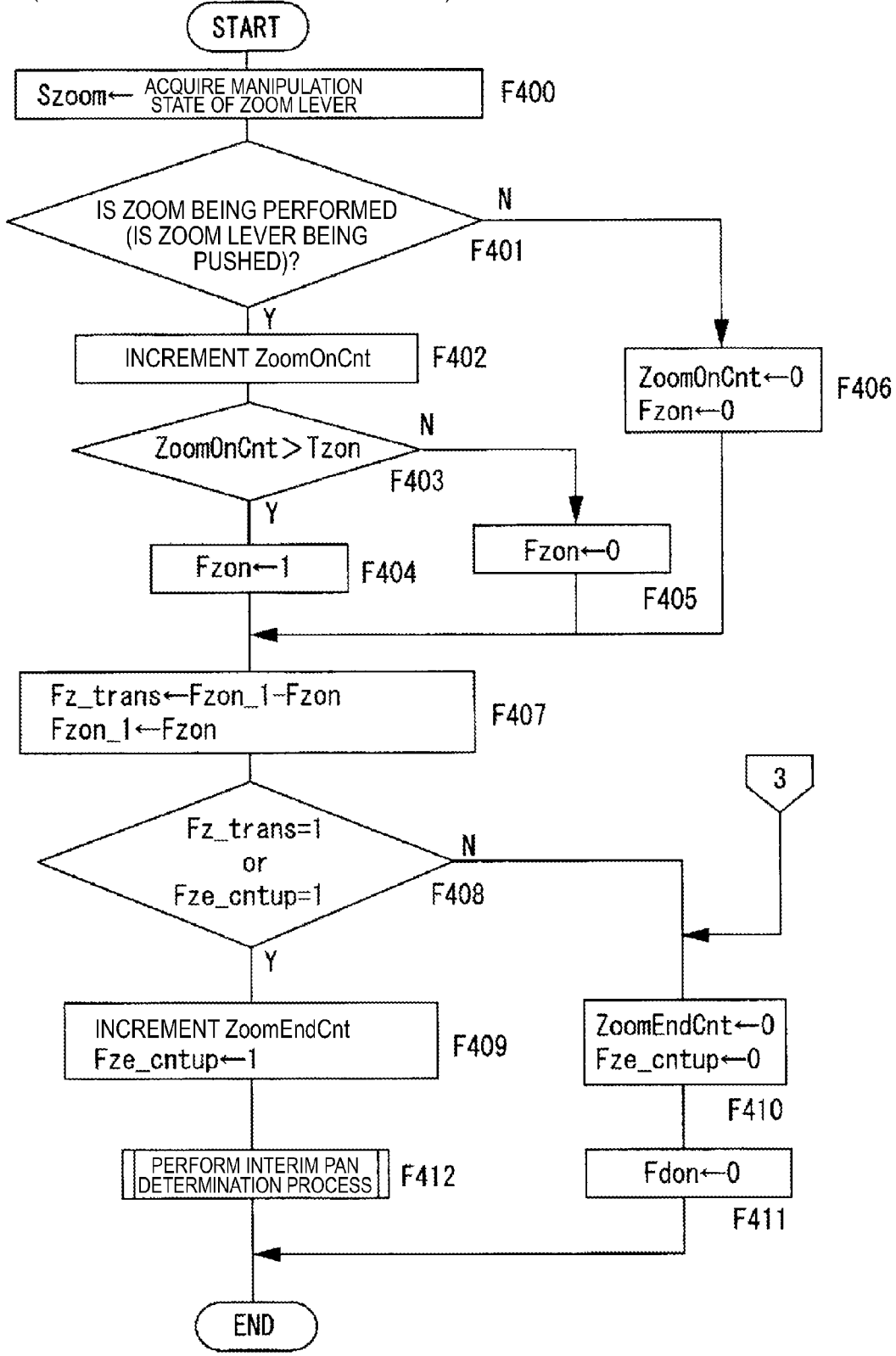
FIG. 21 is a flowchart of the camerawork determination process of the seventh process example.
Figure 22:
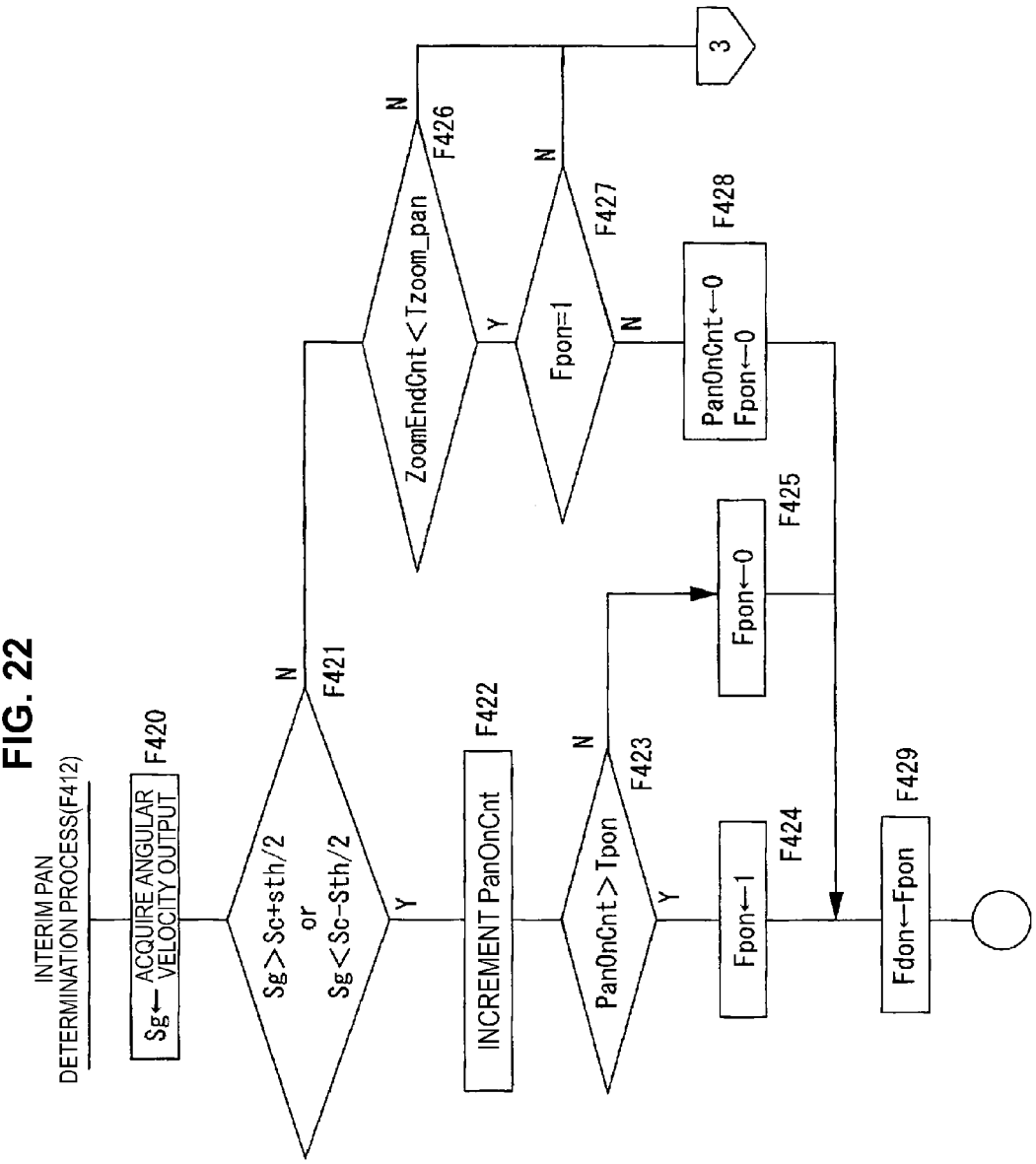
FIG. 22 is a flowchart of an interim pan determination process of the seventh process example.

To set the determination execution flag Fdon through the post-zoom pan operation determination, the control unit 30 (the camerawork determination unit 30b) repeatedly performs the processes of FIGS. 21 and 22.

Since Steps F400 to F407 of FIG. 21 are the same as Steps F300 to F306 and F310 of FIG. 13, the repeated description will be omitted. The processes are processes of setting the zoom transition flag Fz_trans and detecting the zoom end time point at which the zoom transition flag Fz_trans=+1 is set.

In Step F408, the control unit 30 determines whether one of the zoom transition flag Fz_trans=1 and a count flag Fze_cntup=1 is satisfied. The count flag Fze_cntup is a flag that is considered to be "1" in Step F409 and is used for process branch control. Specifically, the count flag Fze_cntup is a flag that is considered to be "1" at the zoom end time point and is subsequently configured such that Steps F409 and F412 are performed.

When the count flag Fze_cntup=0 is set and the zoom transition flag Fz_trans is "0" or "−1," that is, until the end of the zoom is detected, the control unit 30 causes the process to proceed Step F408 to Step F410, resets the count value ZoomEndCnt to zero, and sets the count flag Fze_cntup to "0." The count value ZoomEndCnt is a value of the counter counting the transition limit period Tzoom_pan shown in FIG. 20.

Then, the control unit 30 sets the determination execution flag Fdon=0 in Step F411.

As shown in FIG. 20, the zoom transition flag Fz_trans=1 is set at a time point at which the zoom operation ends. In this case, the control unit 30 causes the process to proceed from Step F408 to Step F409 and increments the count value ZoomEndCnt. That is, the transition limit period Tzoom_pan starts to be counted. The count flag Fze_cntup=1 is set.

Then, in Step F412, the control unit 30 performs an interim pan determination process. The interim pan determination process is shown in FIG. 22.

In the process of FIG. 21 at a subsequent time point, the zoom transition flag Fz_trans returns to "0." However, since the count flag Fze_cntup is set to "1," the control unit 30 causes the process to proceed from Step F408 to Steps F409 and F412 as in the previous time. When the count flag Fze_cntup is considered to be "0" when the pan operation is not detected within the transition limit period Tzoom_pan or the pan operation ends. However, until then, Steps F409 (the increment in the count value ZoomEndCnt) and F412 (the interim pan determination process) are repeatedly performed.

In the interim zoom determination process (F412) of FIG. 22, the idea of the first process example is basically used.

In Step F420 of FIG. 22, the control unit 30 acquires angular velocity information detected by the gyro sensor of the sensor unit 14 as the detection signal Sg. In Step F421, the control unit 30 determines whether one of "Sg>Sc+Sth/2" and "Sg<Sc−Sth/2" is established. That is, this process is a process of determining whether the detection signal Sg is changed to a positive or negative value and exceeds the threshold value range Sth using the values of the reference level Sc and the threshold value range Sth illustrated in FIG. 7B.

Immediately after the end of the zoom, since the detection signal Sg is not a value exceeding the threshold value range Sth, the control unit 30 causes the process to proceed from Step F421 to Step F426 during a period in which the pan is not yet performed and confirms whether the count value ZoomEndCnt does not reach the transition limit period Tzoom_pan.

When the count value does not reach the transition limit period Tzoom_pan immediately after the pan, the process proceeds from Step F426 to Step F427. However, at this time point, since the pan execution flag Fpon=0 is set, the process proceeds to Step F428, the count value PanOnCnt is set to zero, and the pan execution flag Fpon is set to zero. The count value PanOnCnt is a count value for determining whether the pan determination period Tpon has passed from the detection of the pan operation.

Then, in Step F429, the value of the pan execution flag Fpon is substituted to the determination execution flag Fdon. That is, in this case, the determination execution flag Fdon=0 is set.

When the count value ZoomEndCnt starting to be counted after the zoom reaches the transition limit period Tzoom_pan, that is, the pan operation is not detected within the transition limit period Tzoom_pan, the process proceeds from Step F426 to Step F410 of FIG. 21. In this case, the post-zoom pan operation is not detected. The determination execution flag Fdon remains "0."

When the detection signal Sg becomes a value exceeding the threshold value range Sth after the end of the zoom, the control unit 30 causes the process to proceed from Step F421 to Step F422 and increments the count value PanOnCnt. Then, in Step F423, the control unit 30 compares the count value PanOnCnt to the pan determination period Tpon. When the count value PanOnCnt does not reach the pan determination period Tpon, the pan execution flag Fpon is set to zero in Step F425. Then, in Step F429, the value of the pan execution flag Fpon is substituted into the determination execution flag Fdon. Accordingly, the determination execution flag Fdon=0 is set.

When the pan determination period Tpon does not come and a motion of the pan ends despite the fact that the detection signal Sg instantly exceeds the threshold value range Sth within the transition limit period Tzoom_pan, the process proceeds to Step F421→Step F426 after the end of the instant pan operation. Accordingly, when the pan operation is not performed and the transition limit period Tzoom_pan comes, the process proceeds to Step F410 of FIG. 21 and the post-zoom pan operation is not detected (the determination execution flag Fdon=0).

When it is determined in Step F423 that the count value PanOnCnt reaches the pan determination period Tpon, the control unit 30 sets the pan execution flag Fpon=1 in Step F424. That is, the pan operation is continuously confirmed during the pan determination period Tpon, and thus it is determined that the pan operation is performed. Then, in Step F429, the value of the pan execution flag Fpon is substituted into the determination execution flag Fdon. In this case, the determination execution flag Fdon=1 is set. Accordingly, the main subject determination is performed in the process of FIG. 8 based on the determination execution flag Fdon.

While the pan also continues thereafter, the process in which Steps F423→F424→F429 proceed is repeated and the state of the determination execution flag Fdon=1 is maintained.

Thereafter, when the pan operation ends, the process in which Steps F421→F426 proceed is performed. In this case, even when the count value ZoomEndCnt is equal to or greater than the transition limit period Tzoom_pan or does not reach the transition limit period Tzoom_pan, the pan execution flag Fpon=1 is set. Therefore, the process proceeds to Step F426 or F427 to Steps F410 and F411 of FIG. 21. Accordingly, the count value ZoomEndCnt is reset to zero, the count flag Fze_cntup=0 is considered, and the determination execution flag Fdon=0 is further considered. That is, the main subject determination is performed with a period in which the pan continues set as a limit.

According to the above-described seventh process example, a subject close to the determination reference point SP during the post-zoom pan operation is determined to be the main subject. In some cases, the user performs an operation of searching for a target subject through panning after an angle of view is adjusted through zooming. Accordingly, the subject close to the determination reference point SP during the post-zoom pan operation is a subject targeted by the user in many cases, and thus it is possible to increase a probability of the main subject determination result desired by the user being obtained. The improvement in the operability of the user is realized through the automatic main subject determination.

In the above-described process example, since the transition limit period Tzoom_pan from the zoom to the pan is provided, it is possible to accurately determine continuous operations of the zoom→the pan.

<11. Eighth Process Example Post-Zoom Post-Pan Determination>

An example in which the main subject determination is performed after end of a pan operation when the pan operation is performed continuously after a zoom operation will be described as the eighth process example.

Figure 23:
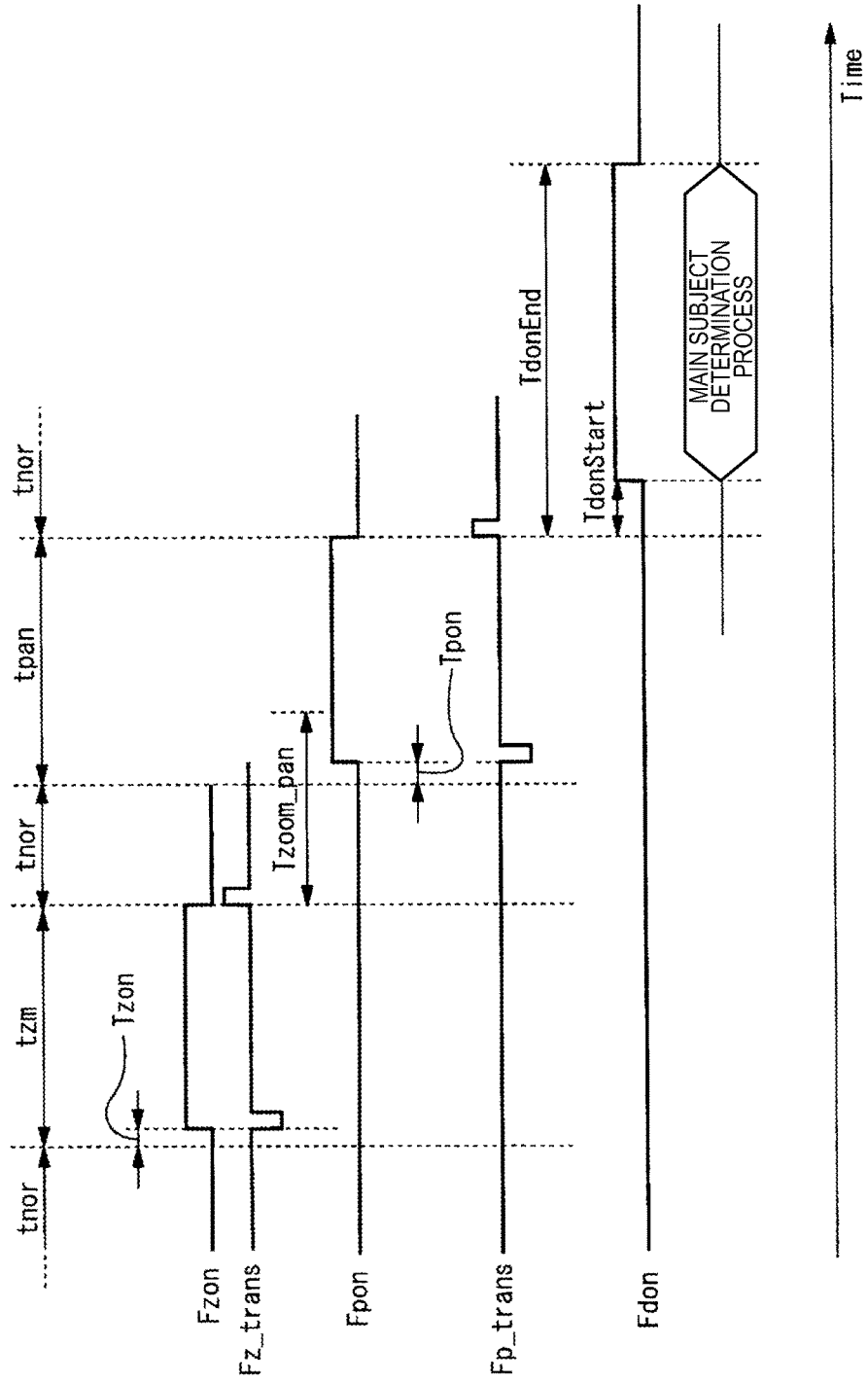
FIG. 23 is an explanatory diagram of a camerawork determination process of an eighth process example.

FIG. 23 shows an operation of the post-zoom post-pan determination process.

Determination (the processes of the zoom execution flag Fzon and the zoom transition flag Fz_trans) of the end of the zoom operation and determination (the process of the pan execution flag Fpon) of the pan operation within the transition limit period Tzoom_pan from the end of the zoom are the same as those of the seventh process example.

To detect the end of the post-zoom pan operation, the idea described in the second process example is used. That is, for the pan execution flag Fpon, the pan transition flag Fp_trans is set by comparing (subtracting) a current value to an immediately previous value. The pan transition flag Fp_trans=+1 serves as information indicating a pan end time point.

The determination execution flag Fdon is considered to be "1" at a time point at which the determination start standby period TdonStart passes from a time point at which the pan transition flag Fp_trans=+1 is set. Thus, when the determination execution flag Fdon=1 is set, the actual main subject determination process starts. The upper limit period TdonEnd is set and the determination execution flag Fdon is considered to be "0" at a time point at which the upper limit period TdonEnd passes from the time point at which the zoom transition flag Fz_trans=+1 is set. Thus, when the determination execution flag Fdon=0 is considered, a period in which the actual main subject determination process is performed is restricted.

Figure 24:
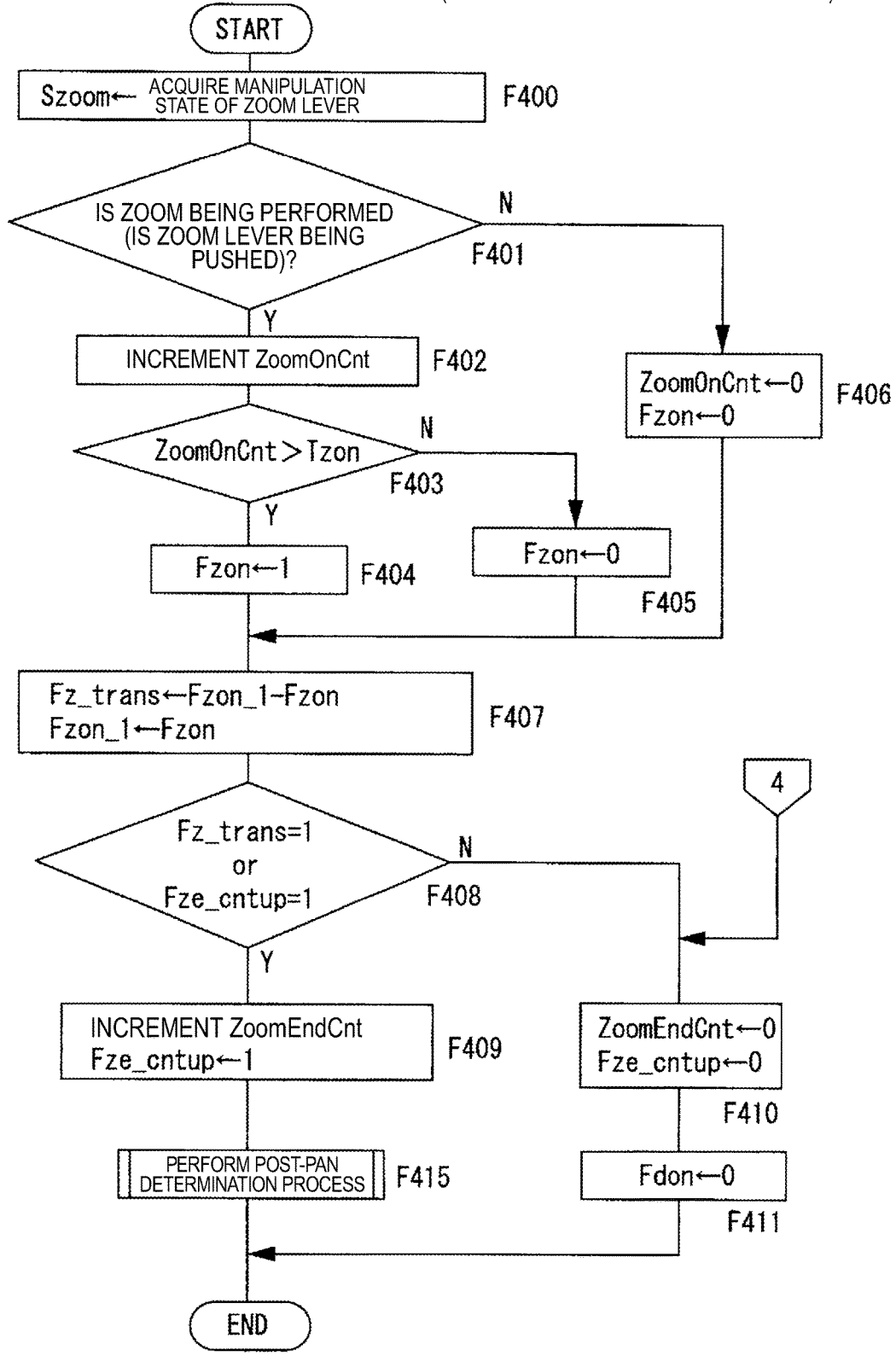
FIG. 24 is a flowchart of the camerawork determination process of the eighth process example.
Figure 25:
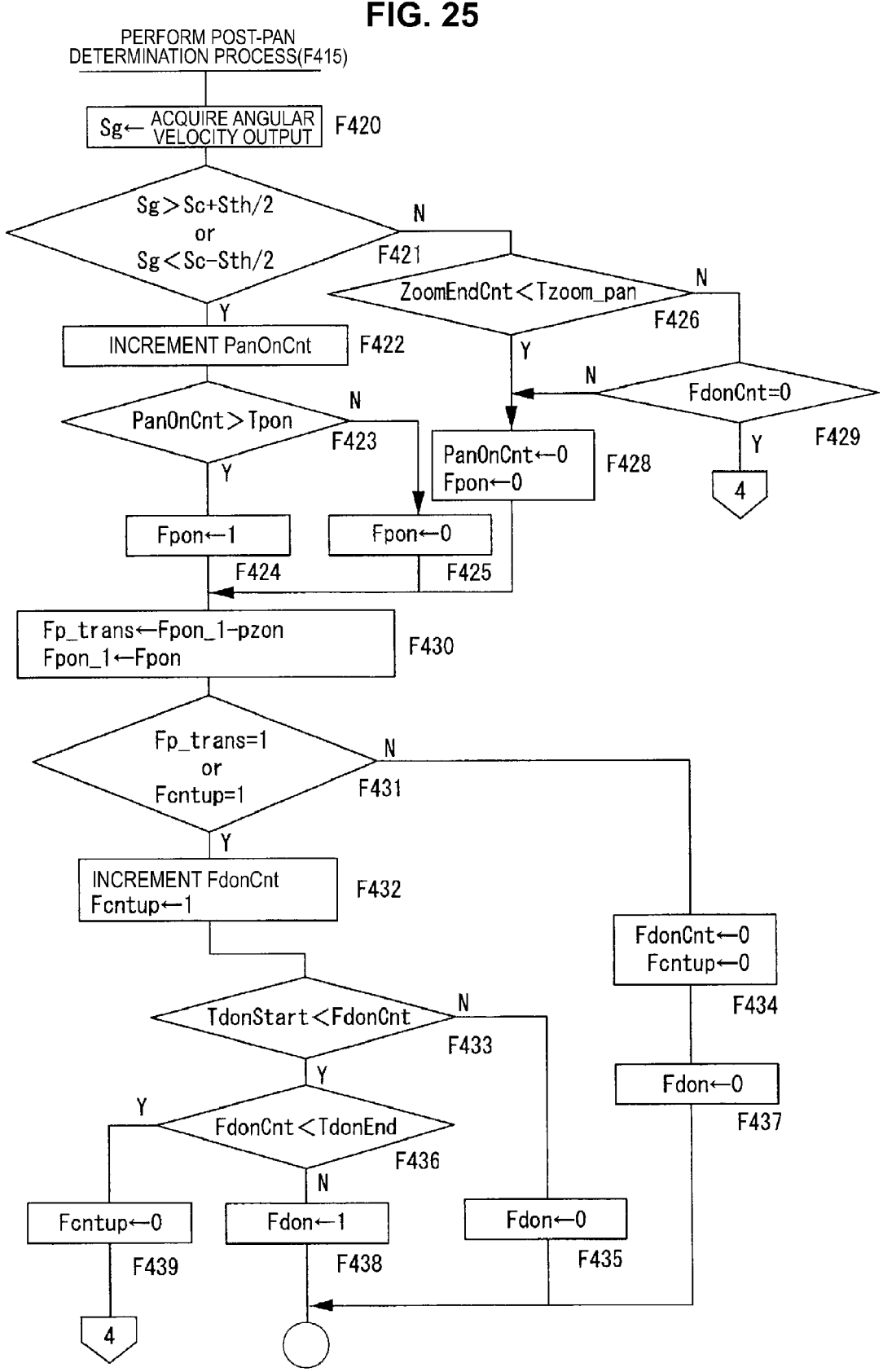
FIG. 25 is a flowchart illustrating a post-pan determination process of the eighth process example.

The post-zoom post-pan determination process is performed as in FIGS. 24 and 25. The control unit 30 (the camerawork determination unit 30b) repeats the processes of FIGS. 24 and 25 and sets the determination execution flag Fdon.

Steps F400 to F411 of FIG. 24 are the same as those of FIG. 21 and the same step numbers are given. That is, the control unit 30 sets the zoom transition flag Fz_trans in Steps F400 to F407 and detects the zoom end time point. Until the end of the zoom is detected, Steps F408→F410→F411 proceed and the determination execution flag Fdon=0 is set.

In FIG. 24, after the end of the zoom is detected, Steps F408→F409→F415 proceed and the control unit 30 performs the post-pan determination process of FIG. 25 in Step F415.

In the post-pan determination process (F415) of FIG. 25, the idea of the second process example is basically used. Steps F420 to F426 and F428 are the same as the processes of the same step numbers of FIG. 22. That is, Steps F420 to F426 and F428 are a process of detecting that a pan operation is performed within the transition limit period Tzoom_pan after the zoom. Since the process after the end of the pan is performed after Step F430, there is no process corresponding to Step F427 of FIG. 22.

When the pan is not performed within the transition limit period Tzoom_pan after the zoom, the process proceeds from Step F426 to Step F429. At this time point, the count value FdonCnt=0 is set. This is because the count value FdonCnt is counted up in Step F432 from the pan end time point. Therefore, at this time point, the process proceeds from Step F429 to Step F410 of FIG. 24. In this case, the post-zoom pan operation is not detected. The determination execution flag Fdon remains "0."

Steps F430 to F438 are the same processes as Steps F210 to F218 of FIG. 10. Accordingly, the following processes are performed.

Before the start of the pan and during the operation, the control unit 30 causes the process to proceed to Steps F431→F434→F437 and sets the count value Fdoncnt=0 and the count flag Fcntup=0, and the determination execution flag Fdon=0.

At the pan end time point, the pan transition flag Fp_trans=1 is set, and thus the control unit 30 causes the process to proceed to Step F431 to Step F432, increments the count value Fdoncnt, and sets the count flag Fcntup=1. Thereafter, the count flag Fcntup=1 is set, and thus the control unit 30 causes the process to proceed from Step F431 to Step F432 and continuously increments the count value Fdoncnt. Here, until the determination start standby period TdonStart passes, the process proceeds from Step F433 to Step F435 and the determination execution flag Fdon=0 is considered.

After the pan end time point, the process of FIG. 25 proceeds to Step F421→F426 and the count value ZoomEndCnt exceeds the transition limit period Tzoom_pan in many cases. However, since increment of the count value Fdoncnt has already started, the processes of Steps F429→F428→F430→F431→F432 are performed.

When the count value Fdoncnt exceeds the determination start standby period TdonStart in Step F433 of a certain time point, the control unit 30 causes the process to proceed to Step F436 and compares the count value Fdoncnt to the upper limit period TdonEnd. Then, until the upper limit period TdonEnd comes, the control unit 30 allows the process to proceed to Step F438 and sets the determination execution flag Fdon=1. Thus, in the post-zoom post-pan, the actual determination process (Steps F105 to F115) is performed in the main subject determination process shown in FIG. 8.

Thereafter, when the count value Fdoncnt exceeds the upper limit period TdonEnd, the control unit 30 set the count flag Fcntup=0 in Step F439. Further, the process proceeds to Steps F410 and F411 of FIG. 24, the count value ZoomEndCnt=0 and the count flag Fze_cntup=0 are considered and the determination execution flag Fdon=0 is further considered. That is, the main subject determination is performed setting the upper limit period TdonEnd in the post-zoom post-pan as a limit.

According to the above-described eighth process example, a subject close to the determination reference point SP in the post-zoom post-pan is determined to be the main subject. In some cases, the user performs an operation of adjusting the angle of view by zooming and searching for a target subject by panning. Accordingly, the subject close to the determination reference point SP after the post-zoom pan operation is a subject targeted by the user in many cases, and thus it is possible to increase a probability of the main subject determination result desired by the user being obtained. The improvement in the operability of the user is realized through the automatic main subject determination.

In the above-described process example, since the transition limit period Tzoom_pan from the zoom to the pan is provided, it is possible to accurately determine continuous operations of the zoom→the pan.

Setting the determination start standby period TdonStart=0 can also be considered. In this case, the main subject determination process is performed instantly from a time point at which the end of the post-zoom pan is detected.

The upper limit period TdonEnd may not be provided and the state of the determination execution flag Fdon=1 may be maintained until the main subject determination is performed.

<12. Ninth Process Example Focusing Determination>

The camerawork determination and the main subject determination will be described as the ninth process example. In this example, the control unit 30 (the camerawork determination unit 30*b*) sets a determination start timing according to detection of the end of a manual focus operation of the imaging apparatus 10.

The control unit 30 (the main subject determination unit 30*a*) observes a focus state of a subject in image data of at least one frame from the determination start timing and determines the main subject among the subjects conforming to a specific focusing condition.

For example, the subjects conforming to the specific focusing condition are subjects located at division regions in which focusing degree data measured in the division regions of the image data is equal to or greater than a predetermined value.

Further, the main subject may also be determined among the subjects conforming to a specific position condition in addition to the focusing condition.

Figure 26:
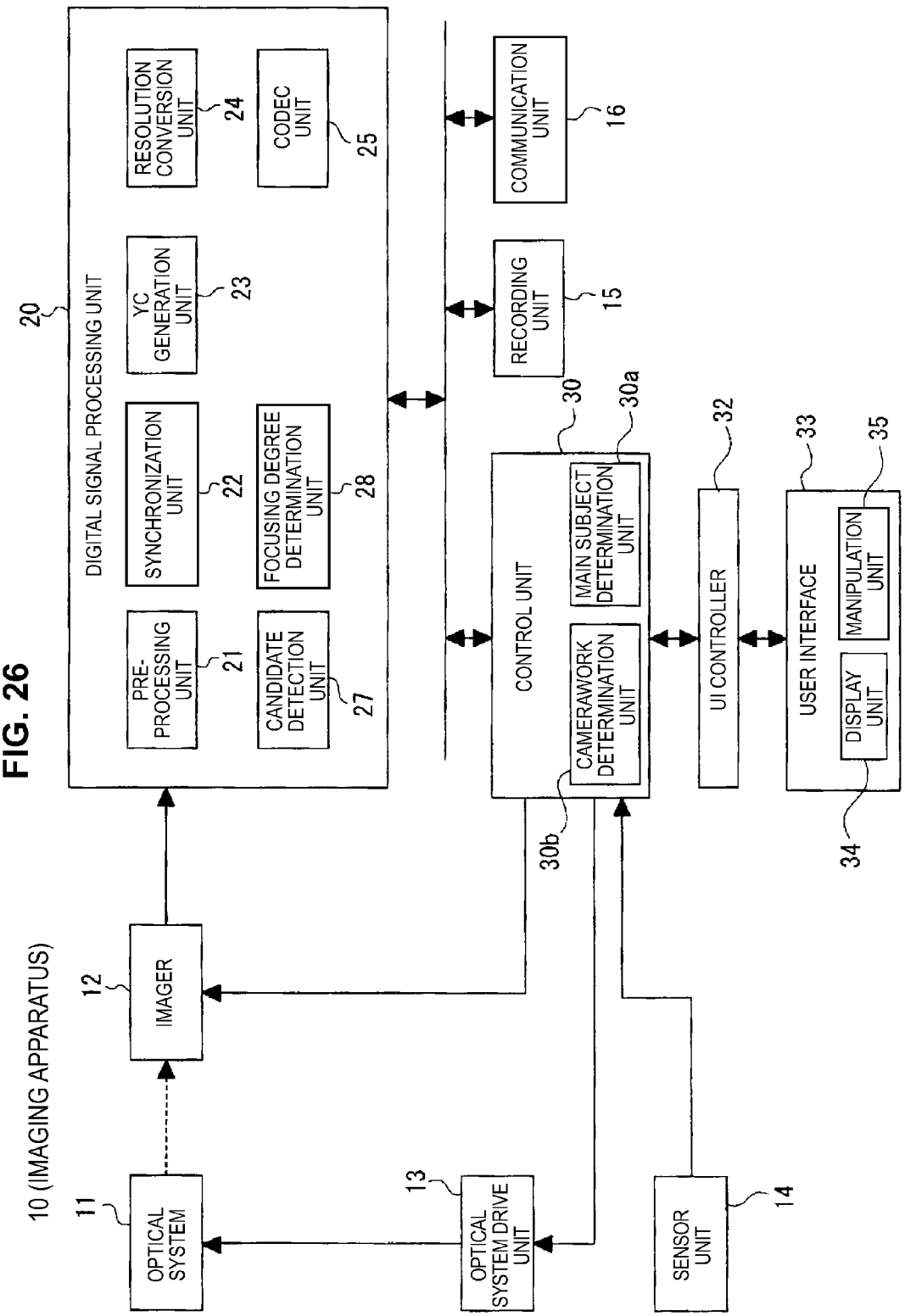
FIG. 26 is a block diagram of the configuration of another imaging device of the embodiment.

In the case of the ninth process example, the configuration of the imaging apparatus 10 is shown in FIG. 26. In FIG. 26, the same reference numerals are given to the same portions as those of FIG. 3 and the description thereof will be omitted.

The imaging apparatus 10 in FIG. 26 includes a focusing degree determination unit 28 in addition to the configuration in FIG. 3. The focusing degree determination unit 28 determines a focusing degree of each of the division regions (blocks) into which a captured image is divided.

As a technology for determining a focusing degree, for example, a known technology for autofocus detection can be used. For example, by detecting an edge component of a luminance signal and performing an integration process or the like on the edge component, a value which is a numerical value higher in a focus state, that is, a value according to a focusing degree, can be obtained.

In the configuration of FIG. 26, the candidate detection unit 27 is configured as in FIG. 3 to extract a candidate image frame.

The functions of the candidate detection unit 27 and the focusing degree determination unit 28 may be mounted on the control unit 30 by software.

An overview of the main subject determination process performed in the ninth process example by the imaging apparatus 10 will be described with reference to FIGS. 27 and 28.

Figure 27:
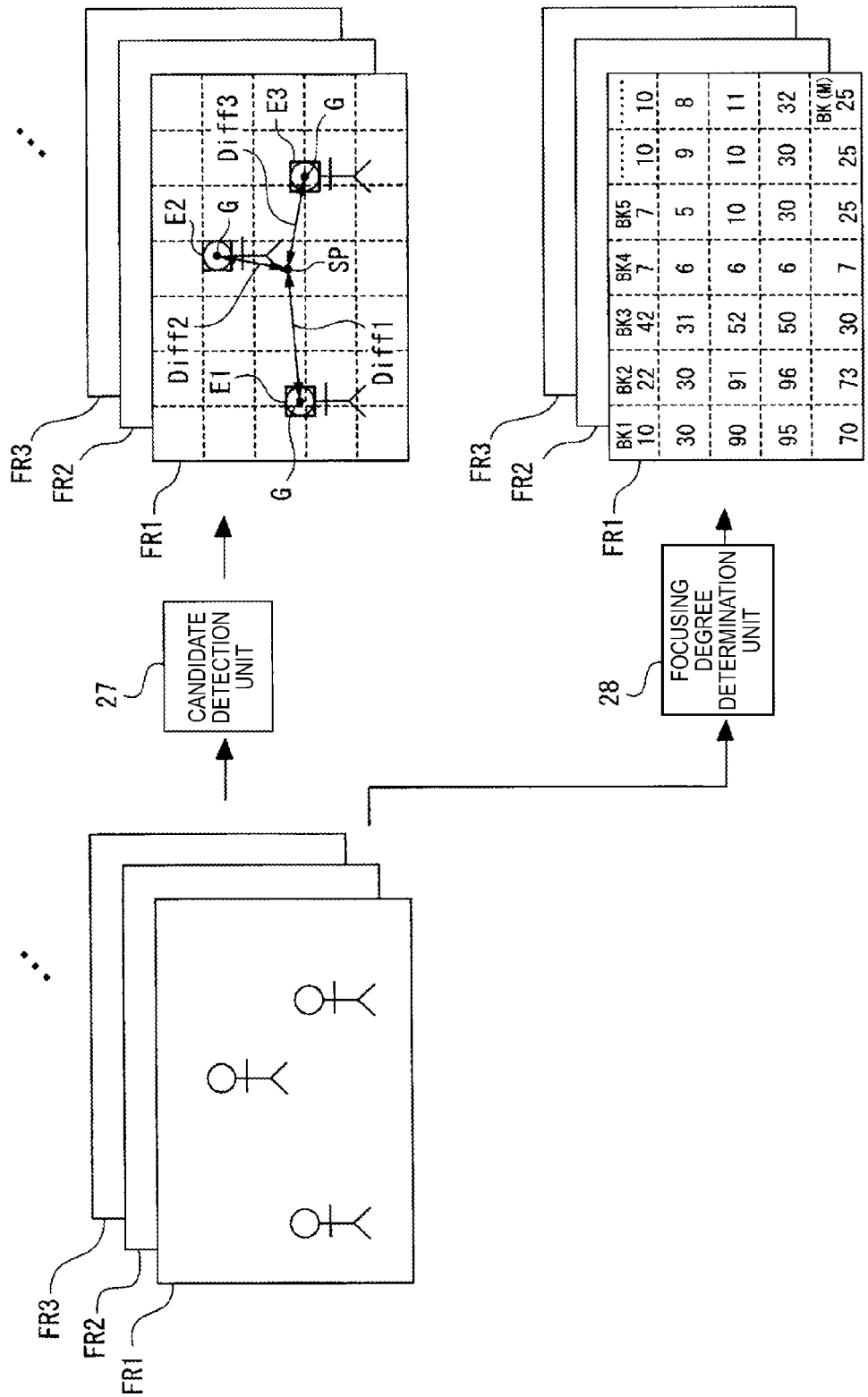
FIG. 27 is an explanatory diagram of overviews of candidate image extraction and focusing degree determination of a ninth process example.

FIG. 27 shows frames FR1, FR2, FR3 . . . of captured image signals input to the digital signal processing unit 20 through an operation of the optical system 11 and the imager 12 of the imaging apparatus 10.

As described in the first process example, the candidate detection unit 27 performs detection of candidate images (for example, candidate image frames E1, E2, and E3) from such sequentially input continuous frames (or intermittent frames). Then, the candidate image frame information is transmitted to and received from the control unit 30 (the main subject determination unit 30*a*). For example, the control unit 30 computes distances Diff1, Diff2, and Diff3 from the centers of gravity G of the candidate image frames E1, E2, and E3 to the determination reference point SP at the time of the main subject determination process.

The focusing degree determination unit 28 calculates a focusing degree of each block in each of the continuous frames (or the intermittent frames) sequentially input in parallel to the process of the candidate detection unit 27.

The drawing shows an example of the blocks which are division regions. One piece of image data is divided into a plurality of blocks, as indicated by dotted lines. The blocks are referred to as blocks BK (BK1, BK2 . . . BK(M)) for description.

The focusing degree determination unit 28 obtains the focusing degree of each of the blocks BK1, BK2 . . . BK(M) as, for example, numerical value information. As shown in the drawing, for example, a focusing degree "10" is obtained for the block BK1 and a focusing degree "22" is obtained for the block BK2. In this example, "100" is assumed to be the largest value of the focusing degree. For example, when the focusing degree is equal to or greater than "80," a focusing state is determined.

For example, the focusing degree determination unit 28 obtains the focusing degree of each block BK for each frame in this way, and then transmits and receives the focusing degree to and from the control unit 30.

Figure 28:
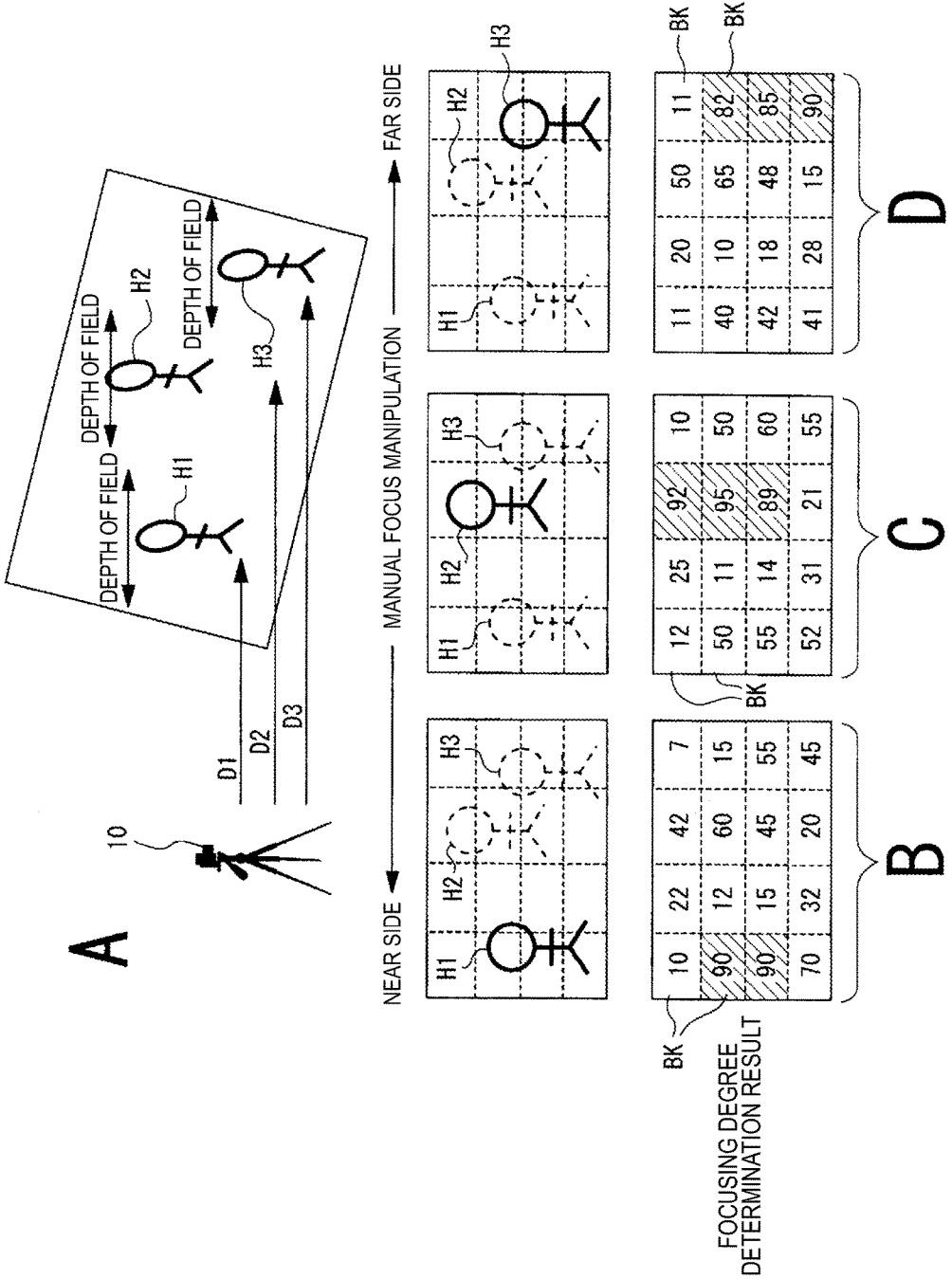
FIG. 28 is an explanatory diagram of the focusing degree determination of the ninth process example.

FIG. 28 shows a change in the focusing degree of each block BK for each frame.

Here, as in FIG. 28A, human figures H1, H2, and H3 who are subjects are assumed to be located at positions of distances D1, D2, and D3 which are the distances from the imaging apparatus 10. In this case, a photographer is assumed to perform a manual focus manipulation and change a position of focus between a near side and a far side.

When focusing is performed on the near side, as shown in the upper drawing of FIG. 28B, the human figure H1 is brought into focus and the other human figures H2 and H3 are out of focus (as indicated by dotted lines in the drawing). In the frame of the captured image at this time, as shown in the lower drawing of FIG. 28B, the focusing degrees of the blocks BK (which are blocks indicated by diagonal lines) located at the human figure H1 become higher.

When the focusing is performed at an intermediate distance through a manual focus manipulation, as shown in the upper drawing of FIG. 28C, the human figure H2 is brought into focus and the human figures H1 and H3 are out of focus. In the frame of the captured image at this time, as shown in the lower drawing of FIG. 28C, the focusing degrees of the blocks BK (which are blocks indicated by diagonal lines) located at the human figure H2 become higher.

When focusing is further performed on the far side, as shown in the upper drawing of FIG. 28D, the human figure H3 is brought into focus and the other human figures H1 and H2 are out of focus (as indicated by dotted lines in the drawing). In the frame of the captured image at this time, as shown in the lower drawing of FIG. 28D, the focusing degrees of the blocks BK (which are blocks indicated by diagonal lines) located at the human figure H3 become higher.

For example, when the photographer is assumed to intend to image the human figure H3, the focusing is performed on the far side, as in FIG. 28D. In other words, a subject having the high focusing degree after a manual focus manipulation is performed can be estimated to be a subject targeted by the photographer.

Accordingly, in the ninth process example, the camerawork determination unit 30b first detects the manual focus manipulation and notifies the main subject determination unit 30a of a timing of the end of the manual focus. The main subject determination unit 30a determines, as the main subject, a candidate image located at the blocks BK having the high focusing degrees among candidate images in the frame image data at this timing.

A specific process example will be described with reference to FIGS. 29, 30, and 31.

Figure 29:
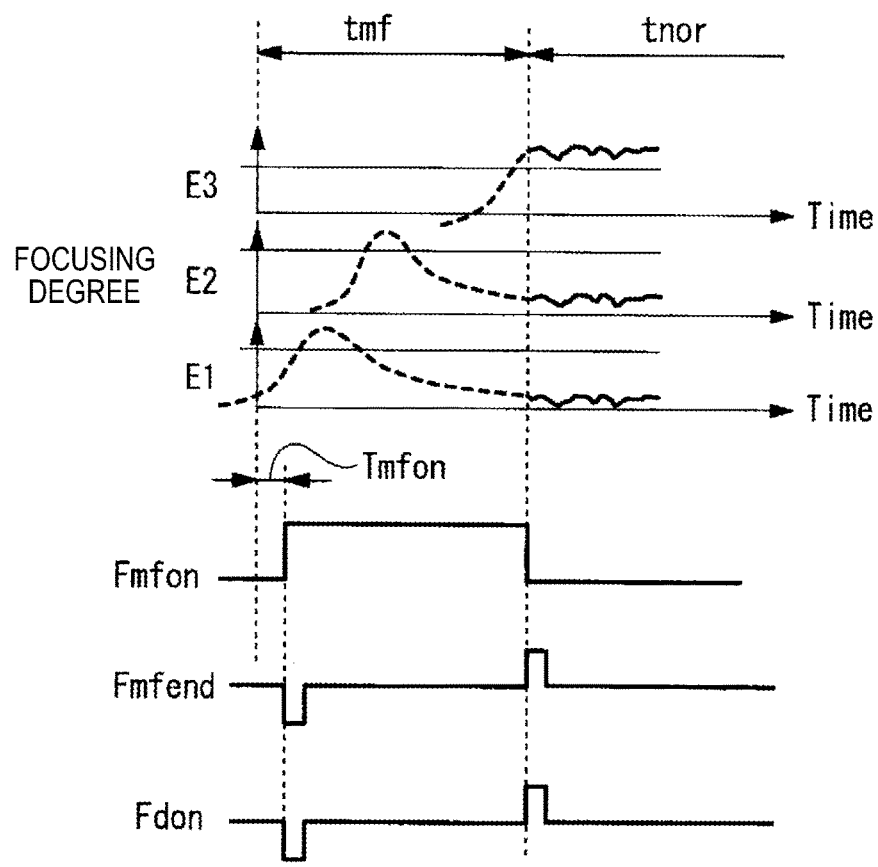
FIG. 29 is an explanatory diagram of a camerawork determination process of the ninth process example.

FIG. 29 shows a case in which the manual focus is performed from the near side to the far side in the example of FIG. 28. The human figures H1, H2, and H3 are assumed to be the candidate image frames E1, E2, and E3 and the focusing degrees of the portions of the candidate image frames are exemplified.

As the focus lens is moved from the near side to the far side during a manual focus period tmf, the subject with the high focusing degree transitions in order of the candidate image frames E1→E2→E3.

At a time point at which the continuous manual focus manipulation is detected over a manual focus determination period Tmfon, a manual focus execution flag Fmfon is considered to be "1."

Thereafter, it is assumed that the focus manipulation ends and the periods transitions to the normal period tnor. In this case, the camerawork determination unit 30b generates a timing after the manual focus as a focus end flag Fmfend=+1. Accordingly, the determination execution flag Fdon=1 is set. According to the determination execution flag Fon=1, the main subject determination unit 30a performs the main subject determination.

Figure 30:
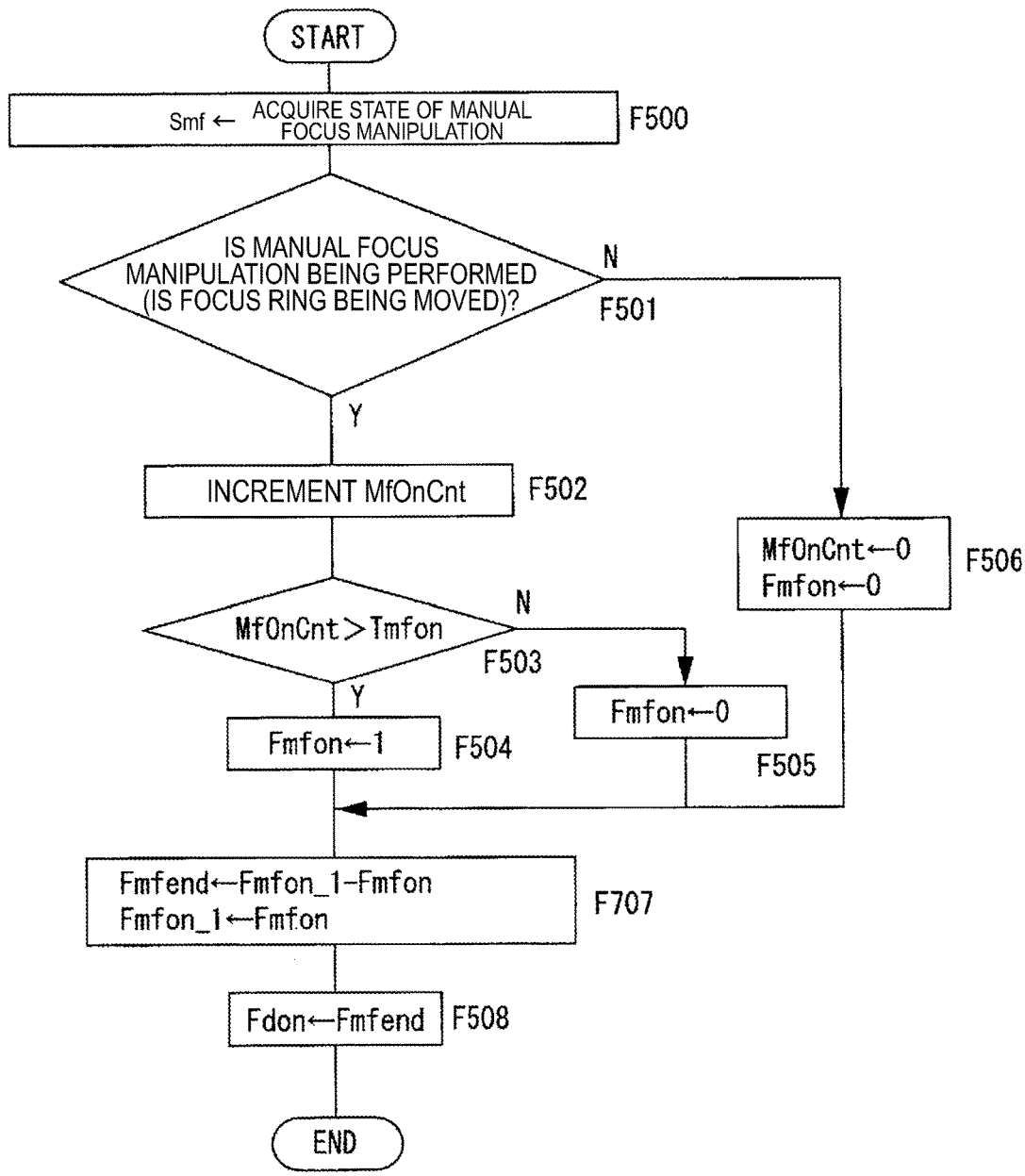
FIG. 30 is a flowchart of the camerawork determination process of the ninth process example.

FIG. 30 shows an example of a post-manual-focus determination process performed by the control unit 30 (the camerawork determination unit 30b).

In Step F500, for example, the control unit 30 acquires information from a sensor detecting a manual manipulation (manipulation of the lens barrel ring) of the focus lens or information from a focus lens position sensor in the sensor unit 14, acquires a state of the manual focus manipulation based on a user's manipulation, and sets a variable Smf. For example, when the manual focus manipulation is performed, the variable Smf=1 is set. When the manual focus manipulation is not performed, the variable Smf=0 is set.

In Step F501, referring to the variable Smf, the control unit 30 determines whether the manual focus manipulation is currently performed.

When the manual focus manipulation is currently not performed with the variable Smf=0, the control unit 30 causes the process to proceed to Step F506, sets a count value MfOnCnt to zero, and sets the manual focus execution flag Fmfon to zero. The count value MfOnCnt is a count value for determining whether the manual focus determination period Tmfon has passed.

Subsequently, in Step F507, the focus end flag Fmfend is set. That is, "the focus end flag Fmfend=(a previous manual focus execution flag Fmfon_1)−(the manual focus execution flag Fmfon)" is set. The previous manual focus execution flag Fmfon_1 is a value of the manual focus execution flag Fmfon at the time point of the previous Step F507. Accordingly, the focus end flag Fmfend is one of "0," "+1," and "−1" shown in FIG. 29.

To use as the previous manual focus execution flag Fmfon_1 in subsequent Step F507, the value of the current manual focus execution flag Fmfon is substituted into the previous manual focus execution flag Fmfon_1.

In Step F508, the value of the focus end flag Fmfend is substituted into the determination execution flag Fdon. Accordingly, at a time point before the manual focus manipulation is performed, the determination execution flag Fdon=0 is set.

When the manual focus manipulation is currently performed with the variable Smf=1, the control unit 30 causes the process to proceed from Step F501 to Step F502 and increments the count value MfOnCnt.

Then, in Step F503, the control unit 30 compares the count value MfOnCnt to the manual focus determination period Tmfon. When the count value MfOnCnt does not reach the manual focus determination period Tmfon, the manual focus execution flag Fmfon is set to zero in Step F505. Then, the focus end flag Fmfend is set in Step F507 and is substituted into the determination execution flag Fdon in Step F508. The determination execution flag Fdon=0 is set.

When the count value MfOnCnt reaches the manual focus determination period Tmfon in Step F503, the control unit 30 sets the manual focus execution flag Fmfon=1 in Step F504. That is, during the manual focus determination period Tmfon, it is confirmed that the manual focus manipulation is continuously performed, and thus the manual focus manipulation is determined to be performed.

Then, the focus end flag Fmfend is set in Step F507 and is substituted to the determination execution flag Fdon in Step F508. The determination execution flag Fdon is set to "−1" at a time point at which the manual focus execution flag Fmfon=1 is considered and is set to "0" subsequently when the manual focus execution flag Fmfon=1 continues.

When the manual focus manipulation ends, the control unit 30 causes the process to proceed to Steps F501 to F506, the count value MfOnCnt=0 is set, and the manual focus execution flag Fmfon=0 is set.

In this case, the focus end flag Fmfend=1 is considered in Step F507 and the determination execution flag Fdon=1 is set in Step F508.

Thus, the actual main subject determination (Steps F605 to F610) in FIG. 31 to be described below is performed.

Thereafter, since the manual focus execution flag Fmfon=0 continues, the focus end flag Fmfend=0 is considered in Step F507 of a subsequent time point and the determination execution flag Fdon=0 is set in Step F508.

Figure 31:
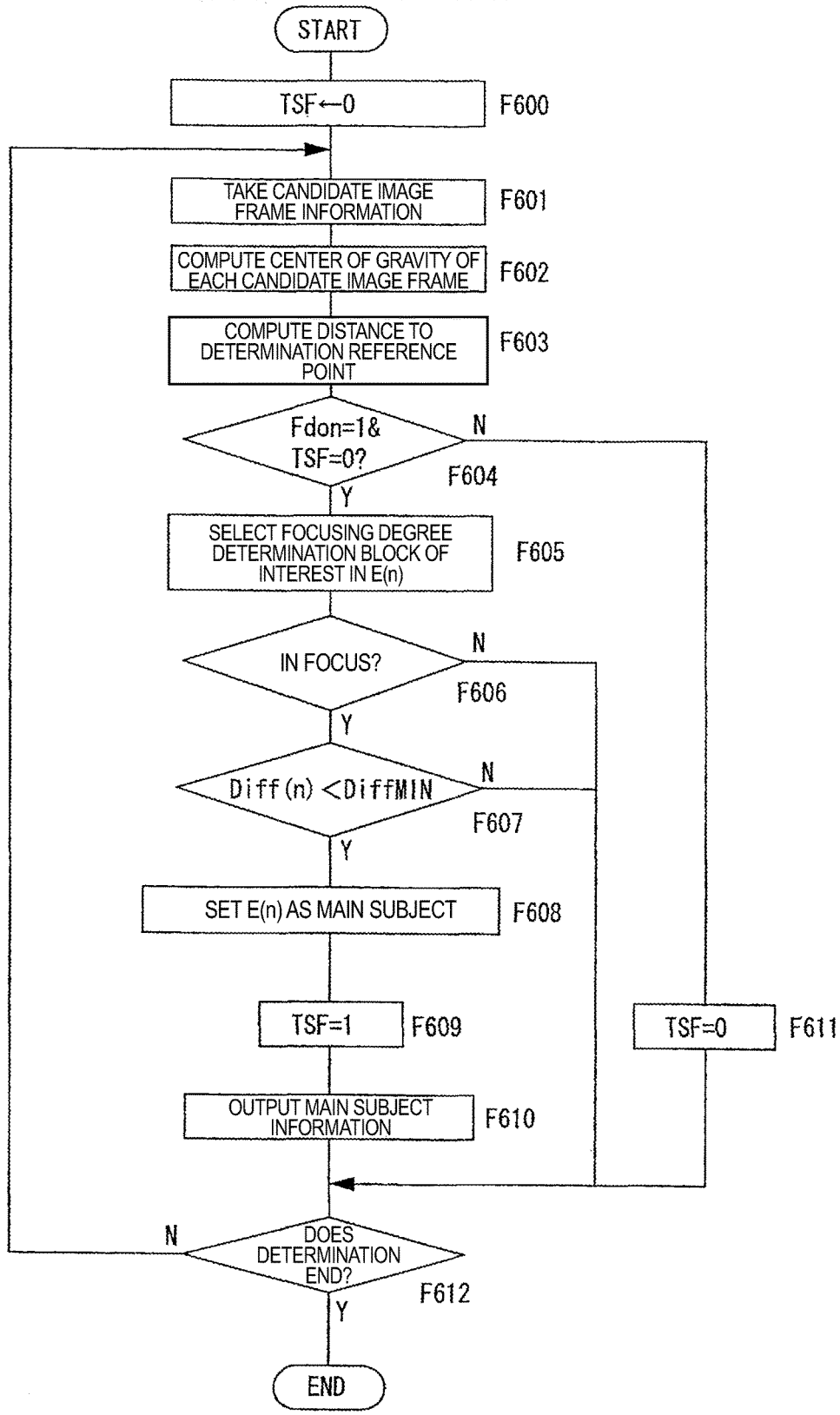
FIG. 31 is a flowchart of a main subject determination process applicable to the ninth process example of the embodiment.

FIG. 31 shows the main subject determination process by the control unit 30 (the main subject determination unit 30a).

This example is the same as that of FIG. 8 in that the control unit 30 continuously takes the candidate image frame information from the candidate detection unit 27 in the main subject determination. In this process example, the actual determination process (Steps F605 to F611) performed using information regarding the focusing degree by the focusing degree determination unit 28 starts according to the above-described setting of the determination execution flag Fdon=1.

For example, the control unit 30 performs the processes of Steps F601 to F604 and F612 (Steps F601 to F612 during the period of the determination execution flag Fdon=1) for each frame timing.

When the control unit 30 starts the main subject determination process, the variable TSF=0 which is a flag indicating whether the main subject setting ends is first set as an initial setting in Step F600.

In Steps F601, F602, and F603, as in Steps F101, F102, and F103 of FIG. 8, the candidate image frame information regarding a certain frame is taken, the coordinates of the center of gravity G of each candidate image frame E(n) are computed, and the distance Diff(n) from the center of gravity G of each candidate image frame E(n) to the determination reference point SP is further computed.

In Step F604, the control unit 30 confirms the determination execution flag Fdon and the variable TSF. When the variable TSF=0 is set and the determination execution flag Fdon=1 is set, the process proceeds to Step F605. In other cases, the actual determination process (F605 to F611) is not performed and the process of Step F612→F601 proceeds.

When the variable TSF=0 is set and the determination execution flag Fdon=1 is set, the control unit 30 selects a focusing degree determination block of interest in each candidate image frame E(n) in Step F605.

As described above, the focusing degree determination unit 28 calculates the value of the focusing degree of each block BK. A region serving as each block BK in which the focusing degree is obtained does not necessarily match a region of the candidate image frame E(n). Thus, the block BK to which each candidate image frame E(n) corresponds and the block BK which is used to obtain the focusing degree of each candidate image frame E(n) are selected.

Figure 32:
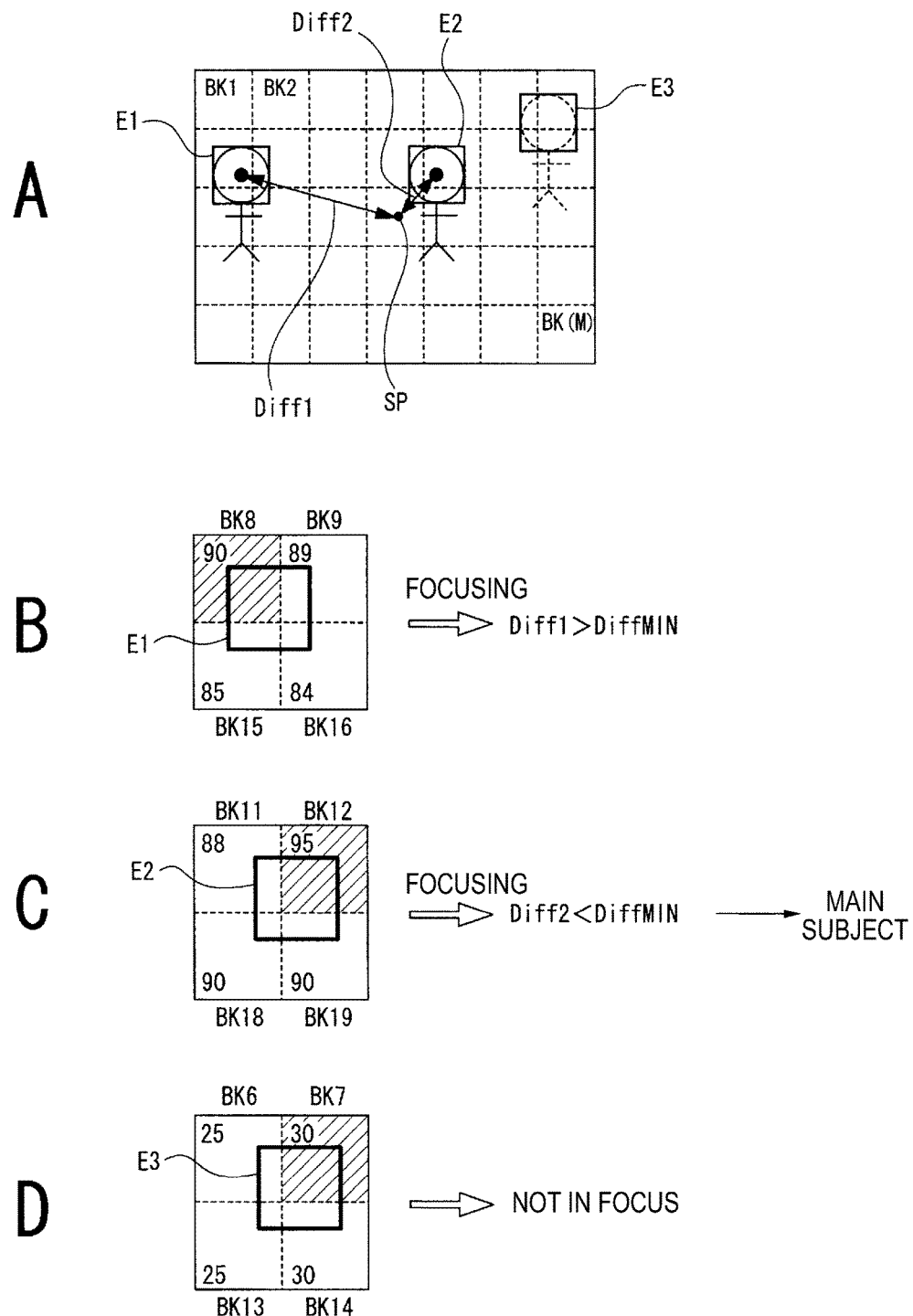
FIG. 32 is an explanatory diagram of main subject determination of the ninth process example.

The description will proceed with reference to FIG. 32. FIG. 32A shows a relation between the block BK and each of the candidate image frames E1, E2, and E3.

Here, in a current frame, the candidate image frame E1 is assumed to be present over blocks BK8, BK9, BK15, and BK16, as in FIG. 32B. Likewise, the candidate image frame E2 is assumed to be present in blocks BK11, BK12, BK18, and BK19 as in FIG. 32C. The candidate image frame E3 is assumed to be present in blocks BK6, BK7, BK13, and BK14 as in FIG. 32D. FIGS. 32B, 32C, and 32D show the values of the focusing degrees of the blocks BK as numerical values inside the respective blocks BK.

Selecting the focusing degree determination block in Step F605 refers to a process of selecting the blocks BK8, BK12, and BK7 indicated by diagonal lines in FIGS. 32B, 32C, and 32D in the candidate image frames E1, E2, and E3.

The candidate image frame E1 in FIG. 32B will be described. First, the blocks BK8, BK9, BK15, and BK16 in which the candidate image frame E1 is contained are selected. Of the blocks, the block BK (in this example, the block BK8) of which an area occupation ratio of the candidate image frame E1 is the largest is set as the focusing degree determination block. Since the blocks BK are divided fixedly from an image, the ranges of the blocks BK are known in the control unit 30. For each candidate image frame E(n), information regarding the x and y values serving as 2-dimensional (x-y) coordinate values and information regarding the width w and the height h of the candidate image frame are supplied as candidate image frame information from the candidate detection unit 27. Accordingly, the control unit 30 can determine the block BK with the largest area occupation ratio in each candidate image frame E(n).

In Step F606, the control unit 30 determines whether each candidate image frame E(n) is in focus with reference to the value of the focusing degree of the selected focusing degree determination block. For example, when the value of the focusing degree is equal to or greater than "80," the candidate image frame is determined to be in focus.

In Step F607, the control unit 30 determines whether the distance Diff(n) from the center of gravity G of each candidate image frame E(n) to the determination reference point SP, as calculated in Step F603, is less than a determination reference distance DiffMIN. That is, it is determined whether each candidate image frame E(n) is close to, for example, a screen center point or the like and the set determination reference point SP.

Then, the control unit 30 determines the candidate image frame E(n) satisfying both of the focusing condition determined in Step F606 and the position condition determined in Step F607 as the main subject in Step F608 and generates main subject information. Then, the variable TSF=1 is set in Step F609 and the main subject information is output in Step F610. Thus, the main subject information is transmitted to and received from an application program or a control program using the main subject information.

Conversely, the candidate image frame E(n) that fails to satisfy either of the focusing condition determined in Step F606 and the position condition determined in Step F607 is not subjected to the process of Step F608, that is, is not determined as the main subject.

As a result, in the main subject determination process of FIG. 31, the candidate image frame E(n) which is in the focus state at the time point at which the manual focus manipulation ends and in which the distance Diff(n) is less than the determination reference distance DiffMIN with respect to the determination reference point SP is determined as the main subject.

For example, the candidate image frame E1 in FIG. 32B is determined to be in focus because the focusing degree of the focusing degree determination block BK8 is "90," but is not determined to be the main subject because the distance Diff(n) is greater than the determination reference distance DiffMIN.

The candidate image frame E2 in FIG. 32C is determined to be in focus because the focusing degree of the focusing degree determination block BK12 is "95" and is determined to be the main subject because the distance Diff(n) is less than the determination reference distance DiffMIN.

The candidate image frame E3 in FIG. 32D is determined not to be in focus because the focusing degree of the focusing degree determination block BK7 is "30," and thus is not determined to be the main subject.

The time of the end of the manual focus manipulation is a time point at which the photographer focuses on a target subject and the subject is estimated to be caught near the screen center in many situations. Accordingly, through the camerawork determination process and the main subject determination process described above, it is possible to improve accuracy of the determination of the subject targeted by the user as the main subject. When focus control or exposure control is automatically performed on the main subject through the main subject determination, a still image or a moving image with high quality can be captured. Even in this case, of course, the appropriate main subject determination is automatically performed for the photographer, and thus operability at the time of imaging is considerably improved.

The following various modification examples of the ninth process example are considered.

First, one focusing degree determination block in the candidate image frame E(n) has been selected with the occupation ratio in Step F605, but other selection methods can also be used.

For example, the center of the candidate image frame E(n) or a block located at the center thereof may be set as the focusing degree determination block.

According to an extraction condition of the candidate image frame, a block located at a specific portion in a candidate image may be set as the focusing degree determination block. For example, when a human body image is extracted as a candidate image, a block located at a face image is set.

Of the plurality of blocks BK in which the candidate image frame E(n) is contained, a block with the largest value of the focusing degree (or a block with the smallest value of the focusing degree) may be set as the focusing degree determination block.

Of the plurality of blocks BK in which the candidate image frame E(n) is contained, the focusing degree determination block such as a block which is the closest to the determination reference point SP (or a block which is the farthest from the determination reference point SP) may be selected with the position condition.

All of the plurality of blocks in which the candidate image frame E(n) is located may be set as the focusing degree determination blocks. In this case, in the focusing determination of Step F606, an average value of the values of the focusing degrees of the plurality of focusing degree determination blocks, the largest value thereof, or the smallest value thereof may be used.

In this case, since an arithmetic operation for the occupation ratio used to set one block as the focusing degree determination block is not necessary, an arithmetic operation load can be lowered.

The AND condition of the focusing condition and the position condition for the main subject determination has been described, but the determination may be performed using only the focusing condition excluding the position condition.

That is, the entire candidate image frame E(n) determined to be in focus in Step F606 may be determined to be the main subject.

Alternatively, when the plurality of candidate image frames E(n) are determined to be in focus in Step F606, one candidate image frame E(n) with the highest focusing degree among the plurality of candidate image frames E(n) may be determined as the main subject.

The determination of the focusing condition may be performed using the values of the focusing degrees in a plurality of frames. For example, an average value of the values of the focusing degrees in a plurality of continuous frames in the focusing degree determination blocks, the largest value thereof, or the smallest value thereof are calculated. When the average value, the largest value, or the smallest value is equal to or greater than "80," the frames are determined to be in focus.

When the determination is performed in addition to the position condition, for example, a region at the screen center may be set as a determination reference region and the candidate image frame E(n) containing the entire region, the candidate image frame E(n) containing the center of the region, the candidate image frame E(n) containing half or more of the region, or the like may be set as the position condition rather than the condition of the closeness to the determination reference point SP.

The position condition may be set with the candidate image frame E(n) not located at an edge portion on an image and the candidate image frame E(n) in a specific block range.

In the foregoing process example, the candidate image frame E(n) has been extracted concurrently, but the candidate image frame E(n) may be extracted after the block in focus is determined. For example, candidate detection is performed within a range of the block BK in focus or a nearby block and an extracted candidate image is determined as the main subject.

The calculation and determination of the focusing degree may not be performed on all of the blocks BK1 to BK(M). However, for example, the calculation and determination of the focusing degree may be performed on some of the blocks BK such as only the blocks BK in the vicinity of the center portion of image data. For example, when the photographer desires to set a subject as the main subject, the photographer is considered to adjust an imaging direction to catch the desired subject in the vicinity of the center portion of an image as much as possible. Thus, even when the focusing degree determination unit 28 performs the focusing degree determination only on the blocks BK in the vicinity of the center portion, the main subject can be set with high accuracy and the processing load of the focusing degree determination unit 28 or the control unit 30 can also be reduced.

Various manners of performing the dividing of the blocks BK can be considered.

In the foregoing example, the blocks BK1 to BK(M) have been described, but various numbers of divisions such as division into 4, 6, 8, 9 . . . 30, or 40 can be considered.

As the number of blocks increases, the processing load of the focusing degree calculation, the selection of the focusing degree determination block, or the like increases. However, even when a candidate image is small due to a zoom state, a small subject, or the like, the main subject can be determined with high accuracy. In contrast, as the number of blocks decreases, the processing load decreases.

All of each block BK to be divided do not have to have the same sizes or the same area shape. It is also considered that, for example, one block BK of the end parts of an image is set as a wide range and the center part of the screen is divided into fine block BKs. Considering that a main subject is highly likely to be positioned in the periphery of the center of the screen, dividing the center of the screen into small areas is appropriate.

<13. Application to a Program and a Computer Device>

Hereinabove, the embodiments of the image processing device 1 and the imaging apparatus 10 have been described, and the above-described main subject determination process can be executed by hardware, or by software.

A program according to an embodiment is a program causing, for example, an arithmetic processing device such as a central processing unit (CPU) or a digital signal processor (DSP) to execute the process described in the above-described embodiment.

That is, the program is a program causing an arithmetic processing device to execute a process of determining camerawork at the time of imaging and setting a determination start timing of a main subject in image data based on the determination and a process of determining the main subject among subjects included in the image data from the image data from the determination start timing.

Specifically, the program according to the embodiment may be a program causing an arithmetic processing device to execute the processes described in FIG. 2 or the first to ninth process examples.

According to the program, the device performing the above-described main subject determination can be realized using an arithmetic processing device.

Such a program can be recorded in advance on an HDD as a recording medium embedded in an appliance such as a computer device, a ROM in a microcomputer having a CPU, and the like.

Alternatively, the program can be temporarily or permanently stored (recorded) in a removable recording medium such as a flexible disk, a CD-ROM (Compact Disc Read Only Memory), a MO (Magnet optical) disc, a DVD (Digital Versatile Disc), a Blu-ray Disc(registered trademark), a magnetic disk, a semiconductor memory, or a memory card. Such a removable recording medium can be provided as so-called package software.

Furthermore, such a program can be downloaded from a download site through a network such as a LAN (Local Area Network) or the Internet, in addition to the installation from the removable recording medium to a personal computer and the like.

Furthermore, such a program is suitable for the image processing device of the embodiment to be extensively provided. For example, the program is downloaded to a personal computer, a portable information processing apparatus, a cellular phone, a game device, a video player, a PDA (Personal Digital Assistant) and the like, so that the portable information processing device and the like are available as the image processing device according to an embodiment of the present disclosure.

Figure 33:
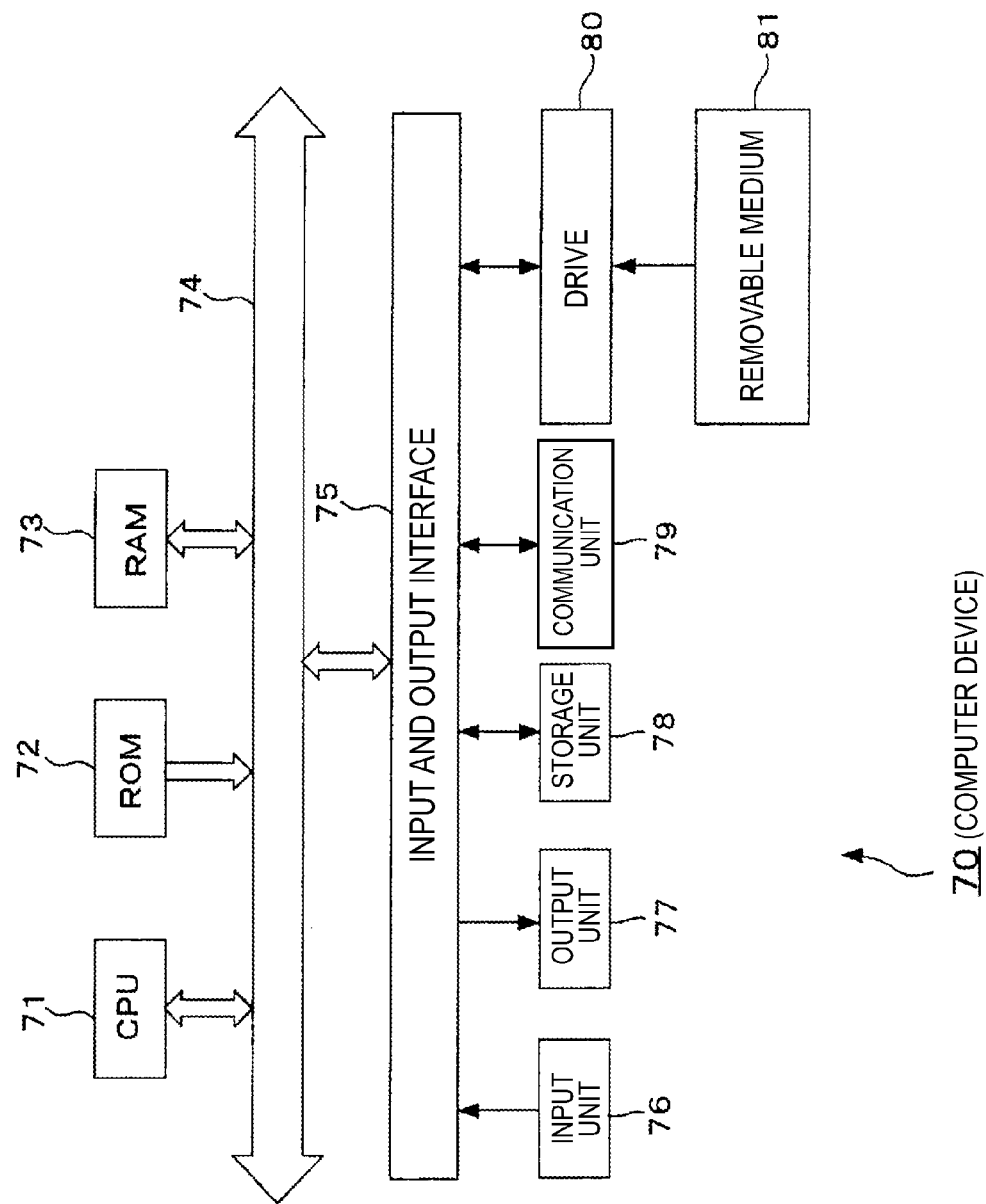
FIG. 33 is a block diagram when an embodiment is applied to a computer device.

For example, in the computer device as illustrated in FIG. 33, the same process as the main subject determination process can be performed in the image processing device 1 of FIG. 1, and the imaging apparatus 10.

In FIG. 33, a CPU 71 of a computer device 70 performs various processes according to a program stored in a ROM 72 or a program loaded from a storage unit 78 to a RAM 73. Furthermore, the RAM 73 appropriately stores data and the like which are necessary when the CPU 71 performs the various processes.

The CPU 71, the ROM 72, and the RAM 73 are connected to one another through a bus 74. Furthermore, an input and output interface 75 is also connected to the bus 74.

The input and output interface 75 is connected to an input unit 76 including a keyboard, a mouse and the like, an output unit 77 including a display such as a CRT (Cathode Ray Tube), an LCD, or an organic EL panel, and a speaker, the storage unit 78 including a hard disk, and a communication unit 79 including a modem and the like. The communication unit 79 performs a communication process through a network including the Internet.

Furthermore, a drive 80 is connected to the input and output interface 75 according to necessity, a removable medium 81 such as a magnetic disk, an optical disc, a magneto optical disc, or a semiconductor memory is appropriately mounted thereon, and a computer program read from the drive is installed in the storage unit 78 according to necessity.

When the aforementioned main subject determination process is performed by software, a program constituting the software is installed from a network or a recording medium.

The recording medium, for example, as illustrated in FIG. 33, is configured by the removable medium 81 including a magnetic disk (including a flexible disk), an optical disc (including a Blu-ray disc, a CD-ROM, and a DVD), a magneto optical disc (including a MD (Mini Disc)), a semiconductor memory and the like which are distributed to deliver a program to a user, separately from an apparatus body with the program recorded therein. Alternatively, the recording medium is also configured by the ROM 72, a hard disk included in the storage unit 78, and the like, which are delivered to a user in the state of being incorporated in advance into the apparatus body with the program recorded therein.

In the computer device 70, when moving image data is input through, for example, a reception operation by the communication unit 79 or a reproducing operation with the drive 80 (the removable medium 81) or the recording unit 78, the CPU 71 is configured to have the functions of the camerawork determination unit 3 and the main subject determination unit 2 described above based on the program so that the CPU 71 can automatically perform the main subject determination on the input image data by executing the processes described in FIG. 2 or the first to ninth process examples.

In this case, it is necessary to determine the camerawork performed previously at the time of the imaging. The CPU 71 can detect the pan, the zoom, and the focus (a change in the position of focus) through analysis of the frame image data. For example, a period in which the pan, the zoom, or the manual focus is performed at the time of the imaging in the input data can be determined from a motion, a size, and a focus state change of an image between mutual frames.

Alternatively, when information regarding camerawork is added as metadata corresponding to each piece of frame image data at the time of the imaging, the CPU 71 can determine the camerawork with reference to the metadata.

<14. Modification Examples>

Various modification examples of the above-described embodiment can be considered.

In the examples of the image processing device 1, the imaging apparatus 10, and the computer device 70, a tilt operation can, of course, be determined in all cases. The determination of the tilt operation (determination during the tilt operation or determination after the tilt) can be performed in substantially the same manner as the above-described pan operation determination. Detection of an angular velocity by a gyro sensor or the like may be performed to correspond to a tilt direction. Accordingly, as camerawork determination processes, for example, a tilt operation, a post-tilt, a post-tilt zoom operation, a post-tilt post-zoom, a post-zoom tilt operation, a post-zoom post-tilt, a post-tilt pan operation, a post-tilt post-pan, a post-pan tilt operation, and a post-pan post-tilt can also be determined. In these cases, the main subject determination can be performed.

Combining the post-manual-focus determination in the ninth process example with a pan, a tilt, or a zoom can also be considered.

For example, a post-zoom manual focus can be determined and the main subject determination can be performed after the manual focus using the focusing condition.

In the examples in which the main subject determination is performed during the pan operation or during the zoom operation (the first, third, fifth, and seventh process examples), the period in which this operation continues has been set as the main subject determination period. However, when the main subject determination is not completed, the main subject determination may be configured to continue even after the end of the pan operation or the zoom operation.

The position condition determined with the distance Diff (n) and the focusing condition have been exemplified as the conditions for the main subject determination in FIGS. 8 and 31, but various conditions can be considered.

For example, a size condition in which the size of a candidate image is equal to or greater than predetermined pixels and a distance condition in which a subject distance (a relative distance between the imaging apparatus 10 and a subject) is within a predetermined range may be used solely or multiply to perform the main subject determination.

The main subject determination may be determined according to an image size or a temporal change in a subject distance.

The attribute of a candidate image may be used as a condition of the main subject determination condition. For example, the attribute of a child, an adult, a man, a woman, a dog, or a cat is determined on a subject image. For example, the fact that the main subject is a child is set as a condition of the main subject. The attribute condition may be selected according to an imaging purpose of the user.

The position condition, the focusing condition, the size condition, the distance condition, and the attribute condition are not absolute conditions for the main subject determination, but may be preferential conditions. For example, when a plurality of candidate images conform under a certain condition, the main subject may be determined among the candidate images according to the preferential condition.

In addition, the main subject information has been described as also being used in an image effect process and an image editing process, however, it is also preferable to perform the main subject determination process targeting a reproduced image to this end.

The main subject determination process targeting a reproduced image is of course assumed in the image processing device of FIG. 1, the information processing device of FIG. 20, and the like.

In addition, a result of the main subject determination process may be added to still image data or dynamic image data imaged and recorded thereafter as metadata. In other words, information representing a main subject is added to a still image file, or the like.

The main subject determination process targeting a reproduced image is of course assumed in the image processing device of FIG. 1, the information processing device of FIG. 20, and the like.

Furthermore, the process of determining a main subject has been described mainly on the assumption of capturing still images in the embodiments, however, the process of the embodiments described above can be applied as a process of performing main subject determination on a plurality of captured frames during standby for capturing a dynamic image, and capturing and execution of recording of a dynamic image.

Additionally, the present technology may also be configured as below.

(1)

An image processing device including:

a camerawork determination unit configured to determine camerawork at a time of imaging and set a determination start timing of a main subject in image data on the basis of the determination; and a main subject determination unit configured to determine the main subject among subjects contained in the image data from the image data from the determination start timing.

(2)

The image processing device according to (1), wherein the main subject determination unit observes a subject position state in the image data of a plurality of frames from the determination start timing and determines the main subject among the subjects conforming to a specific position condition.

(3)

The image processing device according to (2), wherein the specific position condition is a condition in which a situation satisfying a predetermined position state on an image is obtainable on average, cumulatively, or continuously in the plurality of frames.

(4)

The image processing device according to (1), wherein the main subject determination unit observes focus states of the subjects in the image data from the determination start timing and determines the main subject among the subjects conforming to a specific focusing condition.

(5)

The image processing device according to (4), wherein the subjects conforming to the specific focusing condition are subjects located at division regions in which focusing degree data measured in the division regions of the image data is equal to or greater than a predetermined value.

(6)

The image processing device according to (4) or (5), wherein the main subject determination unit determines the main subject among the subjects conforming to the specific focusing condition and further conforming to the specific position condition.

(7)

The image processing device according to any one of (1) to (3), wherein the camerawork determination unit sets the determination start timing according to detection of a pan or tilt operation of an imaging apparatus.

(8)

The image processing device according to any one of (1) to (3), wherein the camerawork determination unit sets the determination start timing according to detection of end of a pan or tilt operation of an imaging apparatus.

(9)

The image processing device according to any one of (1) to (3), wherein the camerawork determination unit sets the determination start timing according to detection of a zoom operation of an imaging apparatus.

(10)

The image processing device according to any one of (1) to (3), wherein the camerawork determination unit sets the determination start timing according to detection of end of a zoom operation of an imaging apparatus.

(11)

The image processing device according to any one of (1) to (3), wherein the camerawork determination unit sets the determination start timing according to detection of transition from a pan operation of an imaging apparatus to a zoom operation of the imaging apparatus or according to detection of end of the zoom operation.

(12)

The image processing device according to any one of (1) to (3), wherein the camerawork determination unit sets the determination start timing according to detection of transition from a zoom operation of an imaging apparatus to a pan operation of the imaging apparatus or according to detection of end of the pan operation.

(13)

The image processing device according to (1), (4), (5), or (6), wherein the camerawork determination unit sets the determination start timing according to detection of end of a manual focus operation of an imaging apparatus.

REFERENCE SIGNS LIST 1 image processing device
2 main subject determination unit
3 local motion detection unit
4 global motion detection unit
10 imaging apparatus
11 optical system
12 imager
13 optical system drive unit
14 sensor unit
15 recording unit
16 communication unit
17 distance sensor
20 digital signal processing unit
21 pre-processing unit
22 synchronization unit
23 YC generation unit
24 resolution conversion unit
25 codec unit
27 candidate detection unit
28 focusing degree determination unit
30 control unit
30a main subject determination unit
30b camerawork determination unit
32 UI controller
33 user interface
34 display unit
35 manipulation unit
70 computer device
71 CPU

The invention claimed is:

1. An image processing device comprising:
a camerawork determination unit configured to
determine a start of a camerawork that is operated by a user to apply changes to image data at a time of imaging,
responsive to determining the start of the camerawork that is operated by the user, set a first determination start flag of a main subject in the image data,
determine an end of the camerawork that is operated by the user to apply the changes to the image data at the time of imaging, and
responsive to determining the end of the camerawork that is operated by the user, set a second determination start flag of the main subject in the image data; and
a main subject determination circuitry configured to
determine whether the first determination start flag of the main subject in the image data is set by the camerawork determination circuitry,
responsive to determining that the first determination start flag of the main subject in the image data is set, determine a first main subject among a plurality of subjects contained in the image data while the camerawork is being performed,
determine whether the second determination start flag of the main subject in the image data is set by the camerawork determination circuitry, and
responsive to determining that the second determination start flag of the main subject in the image data is set, determine a second main subject among a second plurality of subjects contained in the image data after the camerawork has been performed.

2. The image processing device according to claim 1, wherein the main subject determination circuitry in configured to
observes a subject position state in the image data of a plurality of frames in response to determining that the first determination start flag of the main subject in the image data is set, and
determine the first main subject among subjects of the plurality of subjects that conform to a specific position condition.

3. The image processing device according to claim 2, wherein the specific position condition is a condition in which a situation satisfying a predetermined position state on an image is obtainable on average, cumulatively, or continuously in the plurality of frames.

4. The image processing device according to claim 1, wherein the main subject determination circuitry is configured to
observe focus states of the plurality of subjects in the image data in response to determining that the first determination start flag of the main subject in the image data is set, and
determine the first main subject among subjects of the plurality of subjects that conform to a specific focusing condition.

5. The image processing device according to claim 4, wherein the plurality of subjects conforming to the specific focusing condition are subjects located at division regions in which focusing degree data measured in the division regions of the image data is equal to or greater than a predetermined value.

6. The image processing device according to claim 4, wherein the main subject determination circuitry is further configured to determine the first main subject among the subjects of the plurality of subjects that conform to the specific focusing condition and to a specific position condition.

7. The image processing device according to claim 1, wherein the camerawork is a pan or tilt operation of an imaging apparatus.

8. The image processing device according to claim 1, wherein the camerawork is a zoom operation of an imaging apparatus.

9. The image processing device according to claim 1, wherein the camerawork is a manual focus operation of an imaging apparatus.

10. An image processing method comprising:
   determining, with a camerawork determination circuitry, a start of a camerawork that is operated by a user to apply changes to image data at a time of imaging;
   responsive to determining the start of the camerawork that is operated by the user, setting a first determination start flag of a main subject in the image data;
   determining whether the first determination start flag of the main subject in the image data is set;
   determining a first main subject among a plurality of subjects contained in the image data while the camerawork is being performed in response to determining that the first determination start flag of the main subject in the image data is set;
   determining an end of the camerawork that is operated by the user to apply the changes to the image data at the time of imaging;
   responsive to determining the end of the camerawork that is operated by the user, setting a second determination start flag of the main subject in the image data;
   determining whether the second determination start flag of the main subject in the image data is set; and
   determining a second main subject among a second plurality of subjects contained in the image data after the camerawork has been performed in response to determining that the second determination start flag of the main subject in the image data is set.

11. A non-transitory computer-readable medium comprising a program that,
   when executed by an arithmetic processing device, causes the arithmetic processing device to perform a set of operations, the set of operations comprising:
      determining a start of a camerawork that is operated by a user to apply changes to image data at a time of imaging;
      responsive to determining the start of the camerawork that is operated by the user, setting a first determination start flag of a main subject in the image data;
      determining whether the first determination start flag of the main subject in the image data is set; and
      determining a first main subject among a plurality of subjects contained in the image data while the camerawork is being performed in response to determining that the first determination start flag of the main subject in the image data is set;
      determining an end of the camerawork that is operated by the user to apply the changes to the image data at the time of imaging;
      responsive to determining the end of the camerawork that is operated by the user, setting a second determination start flag of the main subject in the image data;
      determining whether the second determination start flag of the main subject in the image data is set; and
      determining a second main subject among a second plurality of subjects contained in the image data after the camerawork has been performed in response to determining that the second determination start flag of the main subject in the image data is set.

12. The image processing method according to claim 11, further comprising:
   responsive to determining that the first determination start flag of the main subject in the image data is set, observing a subject position state in the image data of a plurality of frames; and
   determining the first main subject among subjects of the plurality of subjects that conform to a specific position condition.

13. The image processing method according to claim 12, wherein the specific position condition is a condition in which a situation satisfying a predetermined position state on an image is obtainable on average, cumulatively, or continuously in the plurality of frames.

14. The image processing method according to claim 10, further comprising:
   responsive to determining that the first determination start flag of the main subject in the image data is set, observing focus states of the plurality of subjects in the image data; and
   determining the first main subject among subjects of the plurality of subjects that conform to a specific focusing condition.

15. The image processing method according to claim 14, wherein determining the first main subject among the subjects of the plurality of subjects that conform to the specific focusing condition further includes determining the first main subject among the subjects of the plurality of subjects that conform to the specific focusing condition and a specific position condition.

16. The image processing device according to claim 1, wherein the camerawork changes a field-of-view of the image data.

17. The image processing device according to claim 1, wherein the camerawork determination circuitry is further configured to
   determine a start of a second camerawork that is operated by the user to apply the changes to the image data at the time of imaging, and
   responsive to determining the start of the second camerawork that is operated by the user, set a third determination start flag of the main subject in the image data, and wherein the main subject determination circuitry is further configured to
   determine whether the third determination start flag of the main subject in the image data is set by the camerawork determination circuitry, and
   responsive to determining that the third determination start flag of the main subject in the image data is set, determine a third main subject among a third plurality of subjects contained in the image data while the second camerawork is being performed.

18. The image processing device according to claim 17, wherein the camerawork determination circuitry is further configured to
   determine an end of the second camerawork that is operated by the user to apply the changes to the image data at the time of imaging, and
   responsive to determining the end of the second camerawork that is operated by the user, set a fourth determination start flag of the main subject in the image data, and wherein the main subject determination circuitry is further configured to determine whether the fourth determination start flag of the main subject in the image data is set by the camerawork determination circuitry, and responsive to determining that the fourth determination start flag of the main subject in the image data is set, determine a fourth main subject among a fourth plurality of subjects contained in the image data after the second camerawork has been performed.

19. The image processing device according to claim 18, wherein at least two of the first main subject, the second main subject, the third main subject, or the fourth main subject are the same.

20. The image processing device according to claim 18, wherein the first main subject, the second main subject, the third main subject, and the fourth main subject are different from each other.

21. The non-transitory computer-readable medium according to claim 11, wherein the set of operations further includes determining a start of a second camerawork that is operated by the user to apply the changes to the image data at the time of imaging;

responsive to determining the start of the second camerawork that is operated by the user, setting a third determination start flag of the main subject in the image data;

determining whether the third determination start flag of the main subject in the image data is set; and responsive to determining that the third determination start flag of the main subject in the image data is set, determining a third main subject among a third plurality of subjects contained in the image data while the second camerawork is being performed.

* * * * *